United States Patent
Yu et al.

(10) Patent No.: US 12,204,565 B1
(45) Date of Patent: Jan. 21, 2025

(54) ARTIFICIAL INTELLIGENCE SANDBOX FOR AUTOMATING DEVELOPMENT OF AI MODELS

(71) Applicant: Citibank, N.A., New York, NY (US)

(72) Inventors: Linfeng Yu, New York, NY (US); Vaibhav Kumar, New York, NY (US); Ashutosh Pandey, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/888,088

(22) Filed: Sep. 17, 2024

Related U.S. Application Data

(63) Continuation-in-part of application No. 18/627,332, filed on Apr. 4, 2024, now Pat. No. 12,135,740, which is a continuation-in-part of application No. 18/390,916, filed on Dec. 20, 2023, now Pat. No. 11,971,891.

(51) Int. Cl.
*G06F 17/00* (2019.01)
*G06F 16/28* (2019.01)
*G06F 21/62* (2013.01)

(52) U.S. Cl.
CPC ........ *G06F 16/289* (2019.01); *G06F 21/6245* (2013.01)

(58) Field of Classification Search
CPC ..... G06F 16/289; G06F 21/6245; G06N 5/04; G16B 20/00
See application file for complete search history.

(56) References Cited

U.S. PATENT DOCUMENTS

| | | | |
|---|---|---|---|
| 9,043,372 B2 | 5/2015 | Makkar et al. |
| 10,303,688 B1 | 5/2019 | Sirin et al. |
| 10,445,170 B1 | 10/2019 | Subramanian et al. |
| 11,138,206 B2 | 10/2021 | Siebeking et al. |
| 11,734,365 B1 | 8/2023 | Gottlob et al. |
| 11,816,154 B2 | 11/2023 | Ericson |
| 12,034,801 B1 | 7/2024 | Nair et al. |

(Continued)

OTHER PUBLICATIONS

Ed Seabolt et al., Contextual Intelligence for Unified Data Governance. In Proceedings of the First International Workshop on Exploiting Artificial Intelligence Techniques for Data Management. Association for Computing Machinery, Article 2, 1-9. <https://doi.org/10.1145/3211954.3211955>, Jun. 2018.*

(Continued)

*Primary Examiner* — Greta L Robinson
(74) *Attorney, Agent, or Firm* — Perkins Coie LLP

(57) ABSTRACT

A system facilitates a process for automatically generating artificial intelligence (AI) models. The system receives a first natural language input from a user that includes a set of phrases and an instruction to analyze data associated with the set of phrases using an AI model. The system accesses a metadata graph to determine a node corresponding to the set of phrases, where nodes in the metadata graph indicate internal data objects stored in data silos. The system processes the internal data objects indicated by the determined node to generate a first set of application data. The AI model is applied to the first set of application data to generate one or more outputs. Additional user inputs can be received to modify the first set of application data and apply the AI model to the modified data, until a desired data pipeline for the model has been constructed.

20 Claims, 27 Drawing Sheets

(56) References Cited

U.S. PATENT DOCUMENTS

| | | |
|---|---|---|
| 12,045,610 B1 | 7/2024 | Myers et al. |
| 2010/0198804 A1 | 8/2010 | Yaskin et al. |
| 2017/0091020 A1 | 3/2017 | Rat et al. |
| 2020/0341754 A1 | 10/2020 | Kunjuramanpillai et al. |
| 2020/0356725 A1* | 11/2020 | Okonkwo .............. G06N 3/042 |
| 2021/0344745 A1 | 11/2021 | Mermoud et al. |
| 2022/0327119 A1 | 10/2022 | Gasper et al. |
| 2022/0398498 A1 | 12/2022 | Vogeti et al. |
| 2023/0350929 A1* | 11/2023 | Hasan ................... G06N 5/022 |

OTHER PUBLICATIONS

Zhihan Lv, Liang Qiao, Sahil Verma, and Kavita. 2021. AI-enabled IoT-Edge Data Analytics for Connected Living. ACM Trans. Internet Technol. 21,4, Article 104,20 pages, <https://doi.org/10.1145/3421510>, Jun. 2021.

* cited by examiner

ARTIFICIAL INTELLIGENCE SANDBOX FOR AUTOMATING DEVELOPMENT OF AI MODELS

CROSS-REFERENCE TO RELATED APPLICATION(S)

This application is a continuation-in-part of U.S. patent application Ser. No. 18/627,332, entitled "GENERATING A UNIFIED METADATA GRAPH VIA A RETRIEVAL-AUGMENTED GENERATION (RAG) FRAMEWORK SYSTEMS AND METHODS" and filed Apr. 4, 2024, which is a continuation-in-part of U.S. patent application Ser. No. 18/390,916 entitled "ACCESSING SILOED DATA ACROSS DISPARATE LOCATIONS VIA A UNIFIED METADATA GRAPH SYSTEMS AND METHODS" and filed Dec. 20, 2023. The content of the foregoing applications is incorporated herein by reference in its entirety.

BACKGROUND

As computing systems become more and more complex, data used by such computing systems often require their own data silos (Database, Datawarehouse or DataLake) to efficiently process data. However, due to each computing system having its own data silo, copies of the data may exist between different silos for different computing systems. As a result, a large amount of compute capacity is required in reading and maintaining a single version of truth amongst copies of data residing in differing data silos distributed across one or more computer systems. Moreover, data in one data silo may be similar to data in another data silo. For instance, as each computing system may require its own unique variable names, sequencing keys and integrity constraints, while the variable names and technical implementation may differ from one data silo to another, the underlying data is the same. While new applications are built using latest technologies and techniques, these quickly become obsolete with the advent of newer and better performing systems. These new and emerging silos compound with time and complexity in business process, and building a coordinated and consolidated silo, which can replace all existing silos, requires a massive effort to build and verify. When left unchecked this results in similar data residing in a plurality of data silos that could otherwise be used to store new information, further causing a large amount of wasted compute resources.

Figure 1:
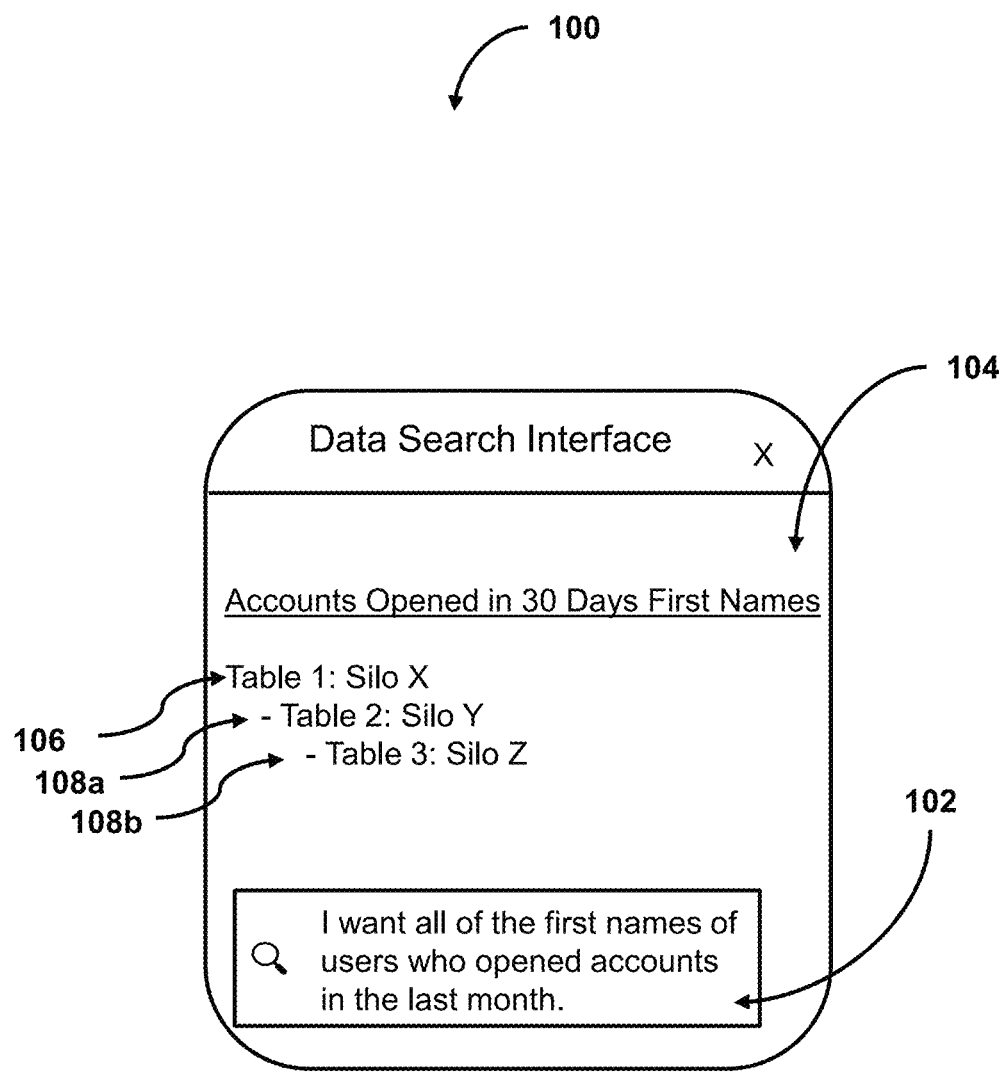
FIG. 1 is an illustrative representation of a Graphical User Interface (GUI) for reducing usage of computational resources when accessing siloed data across disparate locations via a unified metadata graph, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims

DETAILED DESCRIPTION

To preserve data integrity among computing systems, modern computing systems can have a data silo that is created to store data for a given computing system or software application. For example, each data silo may be configured with unique variable names, access protocols (e.g., SQL, AMQP, etc.), data formatting (e.g., relational, non-relational, etc.), or other unique characteristics. Having a data silo that is specifically configured for a given computing system or software application may allow the computing system/software application to not only communicate with the given data silo, but also preserves data integrity of the data within the given data silo as only the data within the silo may be modified, thereby protecting data stored in other data silos.

While data silos provide such benefits, they also result in many drawbacks. For example, one such drawback is that data silos prevent computing systems/software applications that are not configured for communicating with a given data silo to obtain or receive data from that data silo. As each data silo may be configured for a particular software application or computing system, when a new software application is built or when a computing system is scaled, data scientists must either reconfigure the data silo or the software application/computing system. Another drawback is that data silos may store the same or similar information with respect to other data silos. For example, due to the configuration of such data silos (e.g., variable names, access protocols, data formatting, or other characteristics), one data silo may store information that is associated with a first variable name, and another data silo may store the same information that is associated with a second variable name, where the first variable and the second variable names are different. Although the variable names are different, the underlying data may be the same (or similar). This causes a large amount of computer memory to be wasted across computing systems as various copies of the data exist among differing data silos. Yet another drawback is that searching for data that may be stored within the data silos is often difficult due to their configuration. For example, as each data silo is separated from other data silos, there is no common interface to search all available data silos at once, thereby causing users to manually search each and every data silo iteratively until the user finds the data they are needing to obtain. Not only is it time consuming, but such iterative searching causes a large amount of wasted computational resources to be expended due to the hundreds, if not thousands, of queries required to be provided to each and every data silo. Data retrieval from a distributed silo becomes increasingly complex, if it is not known where the data is stored.

Existing systems have previously attempted to resolve such drawbacks by utilizing computer and data scientists to create new data silos that (i) may eliminate copies of data and (ii) are able to communicate with all computing systems/software applications that utilize such data. However, the manual creation of new data silos is practically infeasible to perform. For example, due to the sheer scale of modern computing systems, there may exist hundreds if not thousands of data silos and corresponding computing systems/software applications that would need to be modified to communicate and utilize such data. As such computing systems/software applications rely on large amounts of data stored within such data silos to be processed in real time (or near real time), reconfiguring such systems, applications, or data silos may lead to significant computing system downtimes, thereby impacting a user's experience.

Furthermore, even if computer and data scientists manually create new data silos, there exists the threat of impacting the data integrity of the data which the data silos store. For example, when creating a new data silo, the computer/data scientists must not only remove copies of the data, but also may need to reformat the data to enable the intended computing systems/software applications to effectively communicate with the data within the data silo. Such modifications to the data may corrupt the data and render such valuable data unusable. Even when data scientists create copies of the data silos in case data stored within a given data silo is corrupted, this further exacerbates the problem of wasted computer memory as even more copies of the data must be created.

Moreover, creating new data silos or reconfiguring existing computing systems/software applications further creates the issue of wasting computational resources (e.g., computer processing and computer memory resources) of the given system. For example, as each data silo, computing system, or software application must be reconfigured/created, computational resources are wasted as each new data silo or new computing system/software application occupies a large volume of memory. As such, creating these new data silos, computing systems, or software applications further exacerbates these issues.

For these and other reasons, there is a need to stop copying data and simplify data access patterns when accessing siloed data across disparate locations via a unified metadata graph. There is a further need to access siloed data across disparate locations to enable users access to such siloed data without creating new data silos, databases, or reconfiguring existing computer systems and/or software applications. There is a further need to preserve data integrity of data stored within data silos without requiring multiple copies of the data stored within the data silos.

For example, as described above, existing systems have no mechanism to access siloed data across disparate locations without creating new computational components. As existing systems rely on the creation of new data silos, databases, computing systems, software applications, and the like to access siloed data, such new computational components require a vast amount of resources to effectively access the data. Furthermore, as these existing systems rely on the creation of new data silos, the time and energy spent can lead to long periods of computing system downtime. Moreover, as existing systems are prone to corrupting the data during a creation process of such computational components, existing systems may rely on creating various copies of data silos themselves, thereby further exacerbating the issue of wasting valuable computer memory resources.

To overcome these and other deficiencies of existing systems, the inventors have developed systems and methods for reducing usage of computational resources when accessing siloed data across disparate locations via a unified metadata graph. For example, the system can receive, at a graphical user interface (GUI), a user-specified query indicating a request to access a set of data objects, where each data object of the set of data objects is stored in a respective data silo of a set of data silos among disparate locations. For instance, the system can receive a user query to access data stored among various data silos. The system can then perform natural language processing on the user-specified query to determine a set of phrases corresponding to the user-specified query. For example, to enable non-technically savvy users to access data they want, the system can determine a set of phrases that are contextually accurate (e.g., based on the user query) to provide the data the non-technically savvy user is attempting to access.

The system then accesses a metadata graph to determine a node corresponding to the set of phrases. The metadata graph can comprise (i) a set of nodes comprising (a) metadata indicating internal data objects stored in data silos and (b) location identifiers of the data silos, and (ii) edges indicating data lineages between the set of nodes. For example, by using the metadata graph, the system can traverse the metadata graph that indicates where data (e.g., data objects) are stored, and what data is available among differing data silos. In this way, data scientists need not create new data silos and/or reconfigure existing computing systems/software applications as the metadata graph may provide an abstract layer as to what data is stored where, thereby reducing the utilization of computational resources. Moreover, as the metadata graph includes data lineages between the set of nodes (e.g., a representation of data stored within the data silos themselves), the system can further provide information as to where copies of the data the user intends to access may reside, in which the system may leverage to efficiently find where copied data is hosted. The system then determines a data silo storing at least one data object of the set of data objects using the location identifier corresponding to the determined node to obtain the at least one data object of the set of data objects via the data silo. The system then generates for display, on the GUI, a visual representation of the at least one data object. For example, the system can then provide the data that the non-technically savvy user intends to access. As such, by leveraging the power of a metadata graph to access siloed data, the system may reduce the utilization of computational resources caused by generating new data silos, computing systems, or software applications to access data that is stored across differing data silos at disparate locations.

While using a metadata graph reduces data retrieval times when accessing siloed data across disparate locations (e.g., data silos that are hosted in various locations), there is a further need for optimizing generation of such metadata graphs. For example, while traditional approaches to locate data may involve manually generating tables that include metadata of siloed data, generating these tables are inefficient and waste a large amount of computational resources (e.g., computer memory and processing power) as computer scientists must first find the metadata, normalize the data (e.g., based on mere opinion), and then create the table. Not only is creating such tables inefficient, but these tables are also error prone given the sheer amount of data to consider and the various copies of data that are inherent among many copies of data stored in differing data silos. To reduce error and overcome the inherent inefficiencies of traditional approaches, the inventors have developed an optimized data structure (e.g., a metadata graph) that reduces data retrieval times as compared to parsing an error-prone metadata table. The inventors have further developed an optimized method for generating the metadata that is less error prone by leveraging large language models, the metadata itself, and domain-specific language to boost metadata normalization and accuracy to ensure correct labeling of metadata while reducing the time it takes to generate such data structure.

For example, the system can select from a set of Large Language Model (LLM) prompts, a first LLM prompt corresponding to a first metadata identifier of a set of metadata identifiers. The LLM prompt may correspond to a first metadata identifier based on a data profile of the metadata identifier (e.g., a data schema, data format, etc.). The system can then augment the first LLM prompt with the first metadata identifier to be provided to an LLM, where the LLM is configured to generate a first intermediate output indicating a second set of metadata identifiers corresponding to the first metadata identifier. For example, the system may provide the first metadata identifier to the first LLM prompt to cause the LLM to generate a set of semantically similar metadata identifiers. The set of semantically similar metadata identifiers may represent variations of the first metadata identifier (e.g., to "ask" the LLM what the LLM believes the first metadata identifier represents).

The system can then augment the first LLM prompt with the first intermediate output (e.g., the second set of metadata identifiers) to be provided to the LLM, where the LLM is configured to generate a second intermediate output indicating a filtered domain-specific metadata identifier by accessing a set of domain-specific ontologies. For instance, by providing the augmented LLM prompt to the LLM (e.g., that is communicatively coupled to the set of domain-specific ontologies), the LLM may leverage contextual knowledge provided by the domain-specific ontologies to generate a normalized, domain-specific, metadata identifier. The domain-specific ontologies may include relationships between phrases, words, or descriptions of data present within a computing system of an entity, thereby providing a level of contextual knowledge for the entity. The LLM may leverage such contextual knowledge to generate the filtered, domain-specific, metadata identifier. Moreover, by using the LLM that is communicatively coupled to the domain-specific ontologies, the system may reduce the amount of computational resources required to generate a metadata graph by reducing the data set of metadata identifiers to consider (e.g., via the access to the domain-specific ontologies).

The system can then generate a domain-specific unified metadata graph via the LLM using (i) the first metadata identifier and (ii) the second intermediate output indicating the filtered domain-specific identifier. For example, the filtered domain-specific metadata identifier may be a traversable identifier and the first metadata identifier may be a non-traversable identifier within the domain-specific unified metadata graph. By generating the domain-specific unified metadata graph with traversable and non-traversable identifiers, the system reduces data retrieval times by reducing the amount of information to traverse when identifying where data is located (e.g., among the data silos via the metadata graph) while preserving verifiability and accuracy of the metadata graph (e.g., by storing the non-filtered, non-domain-specific first metadata identifier in association with the filtered domain-specific metadata identifier). In this way, the system preserves data integrity of the metadata of the disparate data silos by transforming the metadata into a verifiable metadata graph to efficiently locate and determine available underlying data stored among the data silos. Lastly, to ensure data retrieval time efficiency, the system determines performance metrics of the generated domain-specific unified metadata graph with respect to previous performance metrics of another version of the domain-specific unified metadata graph. Where the performance metrics of the generated domain-specific unified metadata graph fail to satisfy a performance criteria with respect to the previous performance metrics of the other version of the domain-specific unified metadata graph, the system performs an update process on the domain-specific unified metadata graph. In this way, the system may ensure data retrieval times are at a minimum as well as being accurate when generating, updating, or modifying the domain-specific unified metadata graph occurs.

In various implementations, the methods and systems described herein can reduce utilization of computational resources when accessing siloed data across disparate locations via a unified metadata graph. For example, the system can receive (e.g., via a GUI), a query indicating a request to access a set of data objects, wherein each data object of the set of data objects is stored in a respective data silo of a set of data silos among disparate locations. The system can perform natural language processing on the query to determine a corresponding set of phrases. The system can then access a metadata graph to determine a node corresponding to the set of phrases, where the metadata graph comprises (i) a set of nodes comprising (a) metadata indicating internal data objects stored in data silos and (b) location identifiers of the data silos, and (ii) edges indicating data lineages of the set of nodes, and where the metadata graph is generated using a metadata data structure that is based on file-level and container-level metadata identifiers. The system can then determine a data silo storing at least one data object of the set of data objects using the location identifier corresponding to the determined node to obtain at least one data object of the set of data objects via the data silo. The system can then generate, for display, on the GUI, a visual representation of the at least one data object.

In various implementations, the methods and systems described herein can reduce data retrieval times when accessing siloed data across disparate locations by generating a unified metadata graph via a Retrieval-Augmented Generation (RAG) framework. For example, the system selects, from a set of LLM prompts, a first LLM prompt corresponding to a first metadata identifier of a set of metadata identifiers. The system then augments the first LLM prompt with the first metadata identifier to be provided to an LLM, where the LLM is configured to generate a first intermediate output indicating a second set of metadata identifiers corresponding to the first metadata identifier. The system then augments the first LLM prompt with the second set of metadata identifiers corresponding to the first metadata identifier to be provided to the LLM, where the LLM is configured to generate a second intermediate output indicating a filtered domain-specific metadata identifier by accessing a set of domain-specific ontologies. The system can then generate a domain-specific unified metadata graph, via the LLM, using (i) the first metadata identifier and (ii) the second intermediate output indicating the filtered domain-specific metadata identifier. The filtered domain-specific metadata identifier can be a traversable identifier and the first metadata identifier can be a non-traversable identifier within the domain-specific unified metadata graph. In response to determining that first performance metrics of the domain-specific unified metadata graph fail to satisfy a performance criteria with respect to second performance metrics of another version of the domain-specific unified metadata graph, the system performs an update process on the domain-specific unified metadata graph.

This domain-specific unified metadata graph also enables a system to automatically build or apply artificial intelligence (AI) models. An AI sandbox according to implementations herein provides a low-code or no-code environment in which data from disparate locations, as represented by the metadata graph, is used to automatically generate AI models for data analysis or to automatically apply existing AI models to the data.

In some implementations, a computer system generates data sets for training an AI model or applying to an AI model. The computer system can receive a first natural language input from a user that includes a set of phrases and an instruction to analyze data associated with the set of phrases using an artificial intelligence (AI) model. In response to the first natural language input, the computer system accesses a metadata graph to determine a node corresponding to the set of phrases, where the metadata graph includes (i) a set of nodes including (a) metadata indicating internal data objects stored in data silos and (b) location identifiers of the data silos, and (ii) edges indicating data lineages of the set of nodes. The system processes the internal data objects indicated by the determined node to generate a first set of application data and applies the AI model to the first set of application data to generate one or more first outputs. For example, the first outputs can include a classification of data items in the first set of application data or a prediction made based on the first application data. A representation of the one or more outputs is sent for display to the user. Subsequently, a second natural language input can be received from the user, where the second natural language input includes an instruction to modify the first set of application data. Based on the second natural language input, the computer system generates a second set of application data. The AI model can then be applied to the second set of application data.

In some implementations, a computer system automates deployment of AI models. The computer system can receive, for a first artificial intelligence (AI) model used by an entity, a first request to deploy the first AI model to make the first AI model available for use in a production environment to process input data and generate corresponding outputs. Based on a model deployment engine, the computer system selects a first model deployment location for the first AI model, where the first model deployment location can be selected from among a set of one or more cloud provider environments or an on-premise environment operated by the entity. The computer system generates scripts to deploy the first AI model to the first model deployment location and, after deploying the model, monitors operations parameters associated with the deployment of the first AI model at the selected model deployment location as the first AI model processes the input data and generates the corresponding outputs. The computer system can update the model deployment engine based on the monitored operations parameters and, in response to a second request to deploy a second AI model, select a second model deployment location for the second AI model based on the updated model deployment engine.

In the following description, for the purposes of explanation, numerous specific details are set forth in order to provide a thorough understanding of implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 illustrates a representation of a Graphical User Interface (GUI) for reducing usage of computational resources when accessing siloed data across disparate locations via a unified metadata graph, in accordance with some implementations of the present technology. For example, a user interface 100 can include a user-specified query input 102, a results output 104, a visual representation of at least one data object 106, and data lineage information 108 (e.g., 108a-108b) of the at least one data object. For example, user-specified query input 102 may be a data field configured to receive, as input, a user-specified query. Users may provide a query into user-specified query input 102 to access data that may be stored across disparate data silos of a computing system. Results output 104 may include one or more visual representations of at least one data object 106 and data lineage information 108 that correspond to the at least one data object 106. As an example, in the context of non-technically savvy users attempting to find or otherwise access data that may be stored among a set of data silos respective to one or more computing systems, user interface 100 provides a mechanism to enable such users to find the data that they want or need.

Often, users do not know which data silo (e.g., database) hosts the data they intend to obtain nor do they know exactly which data they may need for a given application. For instance, a non-technically savvy user, such as a business user, may want a list of all of the first names of users who have been active in the last month. As such, the user may provide a query indicating "I want all of the first names of users who have been active in the last month" to user-specified query input 102, and the system may generate results output 104. As will be explained later, the system may perform natural language processing on the user-specified query to obtain a set of phrases (e.g., keywords, semantically similar phrases, etc.) to search a metadata graph. The metadata graph may be a graph that indicates where data is stored and what data is available. For example, as the user-specified query may be in a question format, the system may determine a set of phrases to access the metadata graph by removing unnecessary terms in the user-specified query. Not only may the set of phrases be a "cleaned up" version of the user-specified query, but it also may help target what data the user intends to obtain. By leveraging the access to the metadata graph, the system may display results output 104, which may include a visual representation of the at least one data object 106 (e.g., the data that the user is attempting to access, a location of the data that the user is attempting to access, a format of how the data that the user is attempting to access is stored, etc.) and may also include a visual representation of data lineage information 108 (e.g., where a copy of the data or similar data may be stored, a format of how the data is stored, etc.). In this way, non-technically savvy users may be provided with a unified, easy-to-use, user interface that provides a central access point for accessing data stored amongst differing data silos at differing locations while improving the user experience.

In some implementations the visual representation of the at least one data object 106 may be interactive. For example, the visual representation of the at least one data object 106 may be an interactive link (e.g., a hyper link) that, upon a user selection of the visual representation of the at least one data object 106, may enable the user to access the data associated with the at least one data object (e.g., by generating a visual representation of a table storing the at least one data object, by generating a window showing the at least one data object, etc.). In this way, users are enabled to quickly and efficiently view the data they intend to access.

Suitable Computing Environments

Figure 2:
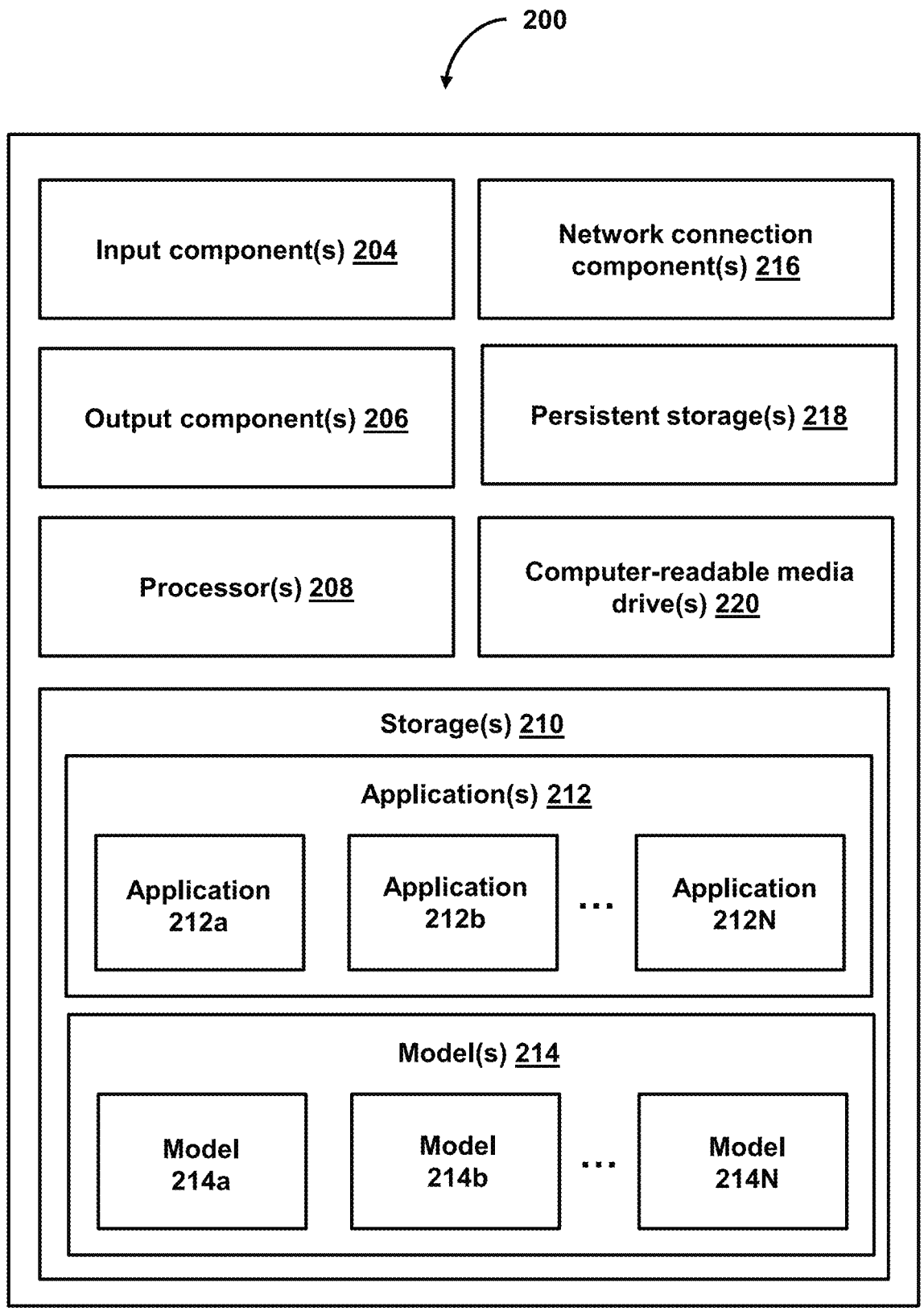
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jacks, HDMI input connections, VGA input connections, USB input connections, or other computing input components; output components 206, including display screens (e.g., LCD, OLED, CRT, etc.), speakers, 3.5 mm output jacks, lights, LEDs, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212a-212N, model(s) 214a-214N, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory, computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations and having various components.

Figure 3:
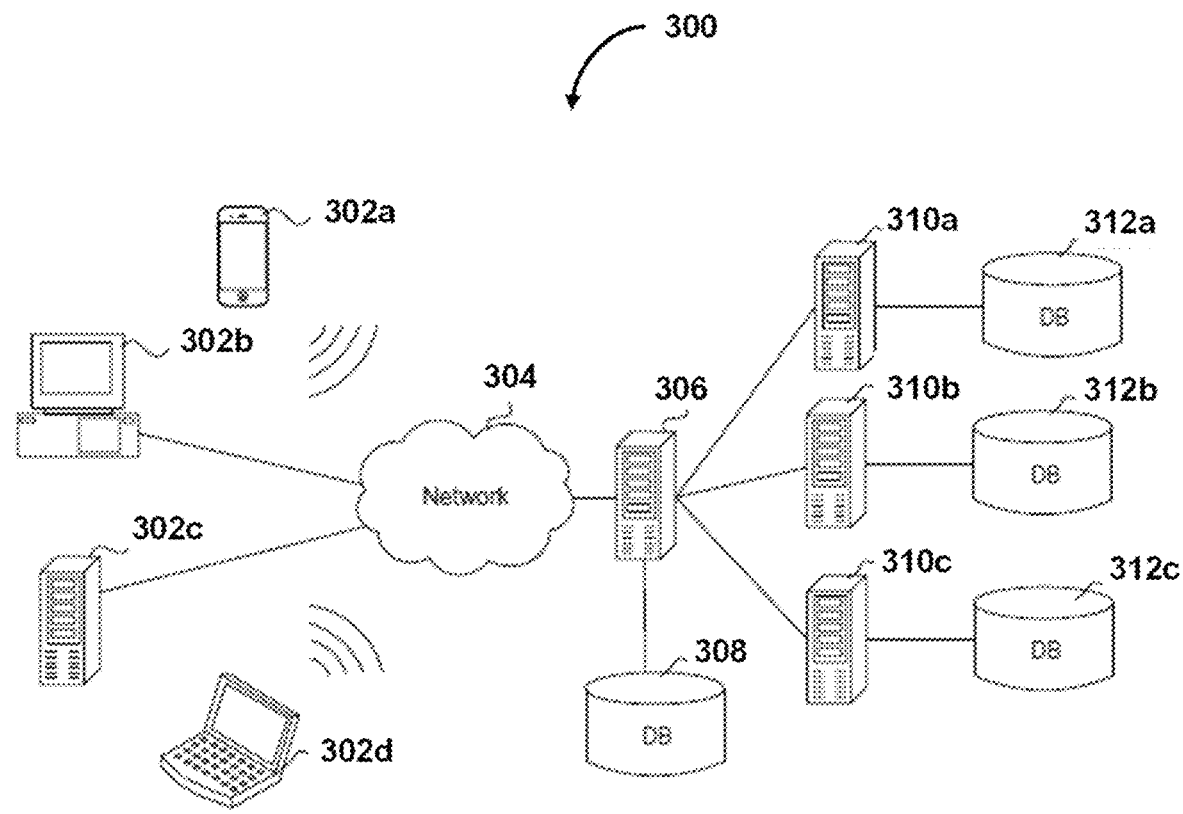
FIG. 3 is a system diagram illustrating an example of a computing environment in which the disclosed system operates in some implementations of the present technology.

FIG. 3 is a system diagram illustrating an example of a computing environment in which the disclosed system operates in some implementations. In some implementations, environment 300 includes one or more client computing devices 302a-d, examples of which can host a metadata graph 500 (FIG. 5) (or other system components). For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers. In some implementations, server computing devices 306 and 310 host a large language model, a set of domain-specific ontologies, artificial intelligence models, user interfaces, web servers, or other computing components.

Client computing devices 302 and server computing devices 306 and 310 can each act as a server or client to other server or client devices. In some implementations, server computing devices (306, 310a-c) connect to a corresponding database (308, 312a-c). As discussed above, each server computing device 310 can correspond to a group of servers, and each of these servers can share a database or can have its own database (e.g., data silos). Databases 308 and 312 warehouse (e.g., store) information such as, predefined ranges, predefined thresholds, error thresholds, graphical representations, machine learning models, artificial intelligence models, natural language processing models, LLM, LLM prompts, keywords, metadata graphs, location identifiers, lineage information, semantically similar phrases, file-level metadata identifiers, container-level metadata identifiers, system-level metadata identifiers, governance policies, usage criteria, machine learning model training data, artificial intelligence model training data, performance metrics, data schemas, data profiles, or other information. In some implementations, databases 308 and 312 may be data silos.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN) but can also be another wired or wireless network. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Accessing Siloed Data Across Disparate Locations

Figure 4:
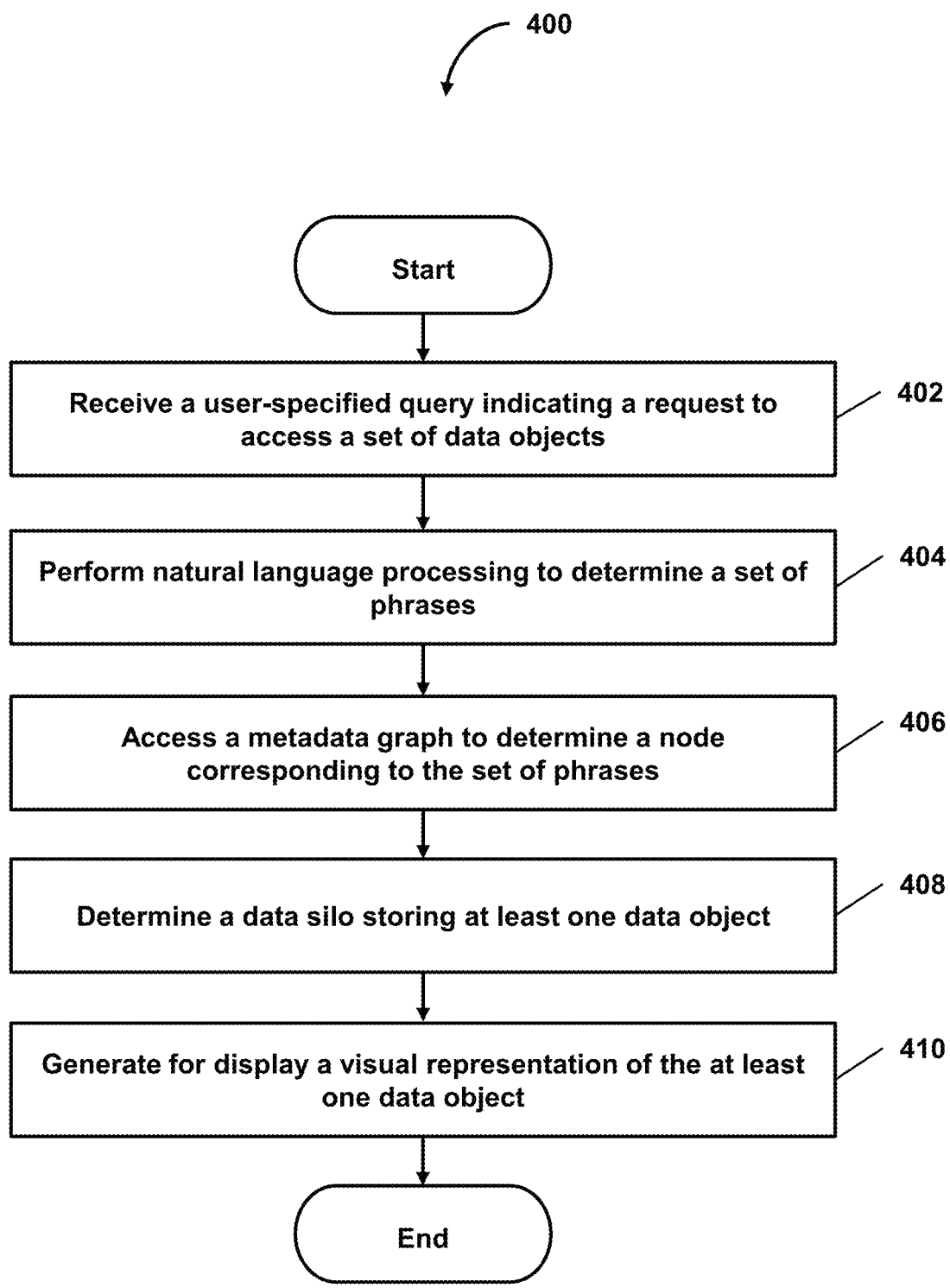
FIG. 4 is a flow diagram illustrating a process of reducing usage of computational resources when accessing siloed data across disparate locations via a unified metadata graph, in accordance with some implementations of the present technology.

FIG. 4 is a flow diagram illustrating a process 400 of reducing usage of computational resources when accessing siloed data across disparate locations via a unified metadata graph, in accordance with some implementations of the present technology.

At act 402, process 400 receives a user-specified query indicating a request to access a set of data objects. For example, the system receives, at a GUI, a user-specified query indicating a request to access a set of data objects, where each data object of the set of data objects is stored in a respective data silo of a set of data silos among disparate locations. A data object can be any object, piece of data, or information that may be stored in a data silo, such as a file, information included within a file (e.g., a first name, last name, email address, home address, business address, financial information, account identifiers, number of accounts, values, percentages, ratios, alphanumeric strings, sentences, etc.), a table, a data structure, or other data objects.

The data objects (e.g., that a user is attempting to access) can be stored across varying data silos (e.g., databases) within a computing environment (e.g., environment 300 (FIG. 3)). For example, the user may want to access account related data of one or more user accounts. However, the account related data may be stored in one or more data silos within the computing environment. For instance, one data silo may indicate how many accounts are currently opened/active (e.g., a first data object), and another data silo may indicate the names of users who have opened accounts (e.g., a second data object). The user may be unaware as to where such data is located, if it is at all available. Therefore, the user may provide a user-specified query indicating a request to access a set of data objects, and as will be explained later, the system may return the data to the user (e.g., the set of data objects). In this way, the system improves the user experience as users can access data without needing prior knowledge as to where such data may or may not reside.

At act 404, process 400 can perform natural language processing to determine a set of phrases. For example, the system performs natural language processing on the user-specified query to determine a set of phrases corresponding to the user-specified query. As data stored among data silos can include the same (e.g., copies of) or similar data, the system determines a set of phrases that correspond to the user-specified query to efficiently search for data stored among the data silos. As an example, one data silo that stores user account information, such as users' last names, may store the users last names as a variable called "last_name." However, another data silo that stores user account information may store users' last names as a variable called "given_name." While the data stored is the same (e.g., each silo stores the users' last names), the variable names may be different. As such, when searching for data, the system may determine a set of phrases that correspond to the user-provided query to access the data.

In some implementations, the system determines a set of semantically similar phrases that correspond to the user-specified query. For example, the system parses the user-specified query for a set of keywords. The set of keywords may correspond to a set of data objects the that are stored in data silos. For example, the user provides a query (e.g., "I want the first names of all users who have been active in the last month."). The system parses the user-provided query for a set of keywords (e.g., first names, active, etc.). For each keyword, the system can determine a set of semantically similar phrases.

For instance, as data may be stored in differing silos for different computer applications across an entity's computing system, the same or similar data may be stored in varying formats. For example, a database storing a table of account information of users may store users' first names as a variable "name_first," "account_ID," "first_name," "name" or others. In this way, the system determines a set of semantically similar phrases corresponding to each respective keyword of the set of keywords to search a metadata graph to obtain the data which the user intends to receive.

The system can then determine the set of phrases that correspond to the user-specified query using the set of semantically similar phrases that correspond to each keyword of the set of keywords. For example, continuing with the example above, where the user-specified query is "I want the first names of all users who have been active in the last month," The system may determine a first set of semantically similar phrases for "first names" (e.g., "name_first," "account_ID," "first_name," "name") to be used when accessing the metadata graph to determine a node (e.g., that indicates metadata of data objects stored in silos, and lineage data of such data objects). In this way, the system may reduce the usage of computational resources to access siloed data using a metadata graph as the system can determine the location of needed data based on a set of semantically similar phrases (e.g., when traversing the metadata graph) more efficiently as opposed to being limited to a single phrase, keyword, or variable name.

In some implementations, the system can determine semantically similar phrases by accessing a database. For example, the database may indicate a mapping between first keywords and a set of second keywords. In some implementations, the database may store a set of pre-determined keywords that are generated by a Subject Matter Expert (SME). In this way, SMEs may create such database to accurately determine which keywords are semantically similar to other keywords, thereby improving accuracy to which semantically similar phrases are determined.

In some implementations, the database can be based on an artificial intelligence model. For example, due to a large volume of user-specified queries, the amount of semantically similar phrases, and the unique data that may be searched for within data silos, the system may use an artificial intelligence model to determine a set of semantically similar phrases or to generate the database to determine semantically similar phrases. The artificial intelligence model may be a machine learning model configured to receive keywords (e.g., a phrase) as input and output a set of semantically similar keywords (e.g., semantically similar phrases). Due to the nature of a machine learning model (or other artificial intelligence model) being able to learn associations between training data (e.g., labeled instances of keywords and semantically similar phrases), the model is not restricted to a defined set of keywords and phrases. For instance, the machine learning model may generate new, undiscovered instances of semantically similar phrases that correspond to a given keyword that may be infeasible to the human mind. As such, the system may determine a set of semantically similar phrases that correspond to each respective keyword by using the machine learning model. In this way, the system may determine more robust semantically similar phrases as the machine learning model is not restricted to a set of predetermined keywords, thereby expanding the range of possible semantically similar phrases that may be generated.

In response to accessing the database, the system can determine the set of semantically similar phrases corresponding to the respective keyword by using the respective keyword. For example, the system can parse the database using the respective keyword to determine a match between (i) the respective keyword and (ii) a keyword in the database. Upon identifying a match, the system may obtain the set of semantically similar phrases that correspond to the keyword. In this way, the system may reduce the usage of computational resources when determining semantically similar phrases by using a match as opposed to performing natural language processing on the respective keyword to determine a set of semantically similar phrases.

At act 406, process 400 can access a metadata graph to determine a node corresponding to the set of phrases. For example, the system can access a metadata graph to determine a node corresponding to the set of phrases. The metadata graph may include (i) a set of nodes and (ii) edges indicating data lineages of the set of nodes. The set of nodes may include (a) metadata indicating internal data objects stored in data silos and (b) location identifier of the data silos. As an example, the metadata graph may be a graph data structure that indicates metadata of the information stored in the set of data silos of the environment 300 (FIG. 3).

As discussed above, when accessing data that may be stored in data silos at disparate locations, each data silo may be associated with its own configuration to access data stored within the data silo. When designing computing systems/software applications, data scientists and computer scientists may carefully design the data silos, the computing systems, and software applications to effectively communicate with one another via one or more communication protocols. However, this creates scalability issues when scaling computing systems as required data for a given computing system/software application may be inaccessible due to the configuration of either the computing system/software application or the data silos themselves. Furthermore, searching for the required data may be difficult as the information stored in one data silo may be the same underlying data as in another data silo, albeit with differing variable names (e.g., variable identifiers, metadata identifiers, etc.). When searching for such required data for a given computing system/software application, existing systems may parse each and every data silo that is available for a given match between the data stored within the data silo and the data intended to be accessed (e.g., the required data). However, parsing each and every data silo within an environment wastes valuable computer processing and memory resources caused by determining whether a match exists between each and every data silo and the information stored therein.

To combat these technical deficiencies, accessing a metadata graph to determine a node corresponding to the set of phrases (e.g., phrases, keywords, alphanumeric strings that correspond to the user-specified query) may be leveraged to quickly and efficiently identify and access data, thereby reducing the usage of computational resources.

Figure 5:
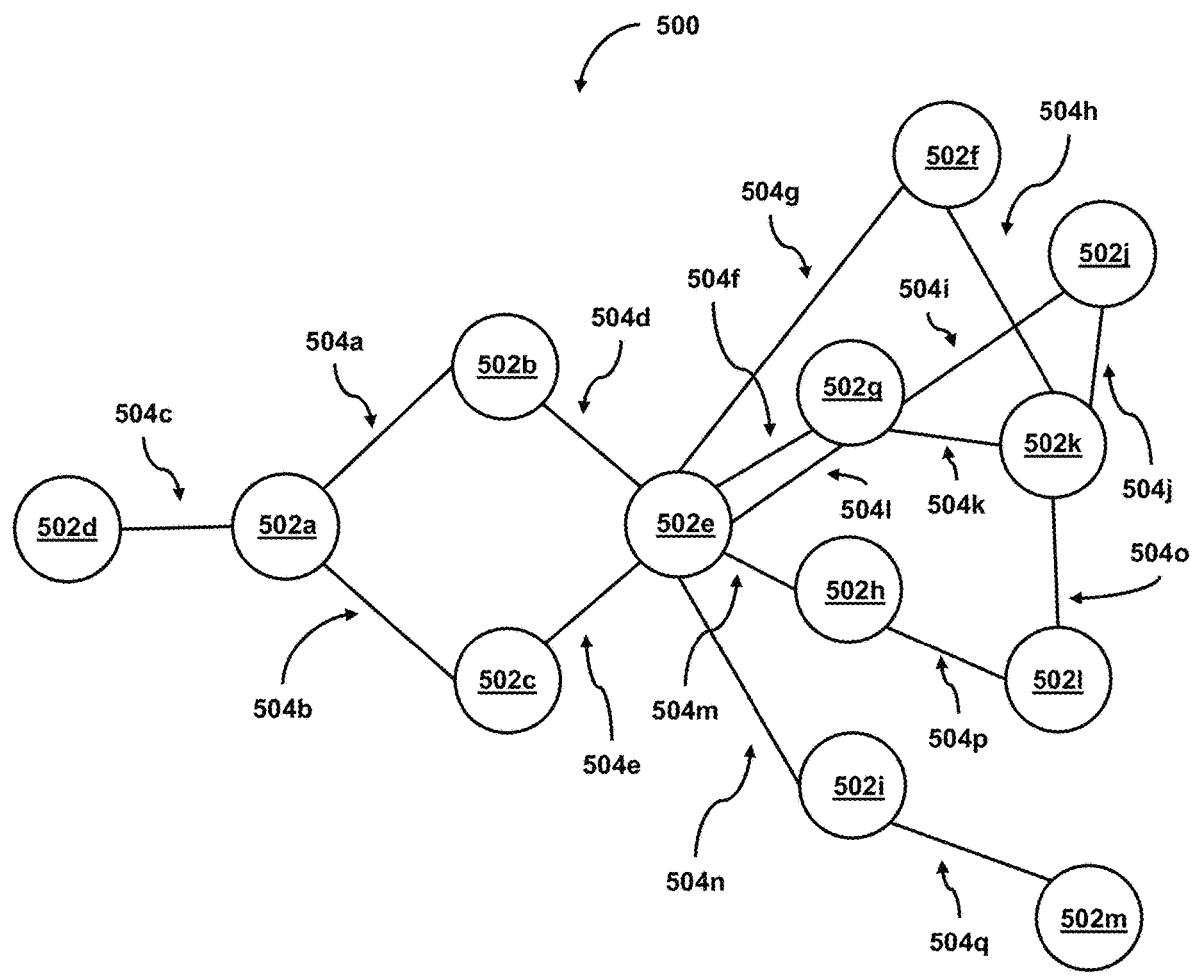
FIG. 5 shows an illustrative representation of a metadata graph, in accordance with some implementations of the present technology.

Referring to FIG. 5 showing an illustrative representation of a metadata graph, metadata graph 500 may include a set of nodes 502a-502m and edges 504a-504q. Each node 502 may be linked to, or connected to, one or more other nodes via one or more edges 504. Each node 502 may indicate metadata of one or more data silos, such as metadata of internal data objects stored within a given data silo (e.g., file-level metadata), metadata of the data silo itself (e.g., container-level metadata), and location identifiers of a given data silo (e.g., where the data silo is located, such as a computational component node identifier, a server identifier, etc.). Each edge 504 may indicate data lineages of the set of nodes. For example, each edge may represent a lineage relationship between a first node and a second node. That is, each edge may indicate whether a node is a data source of, or a derivative of, another node.

Figure 6:
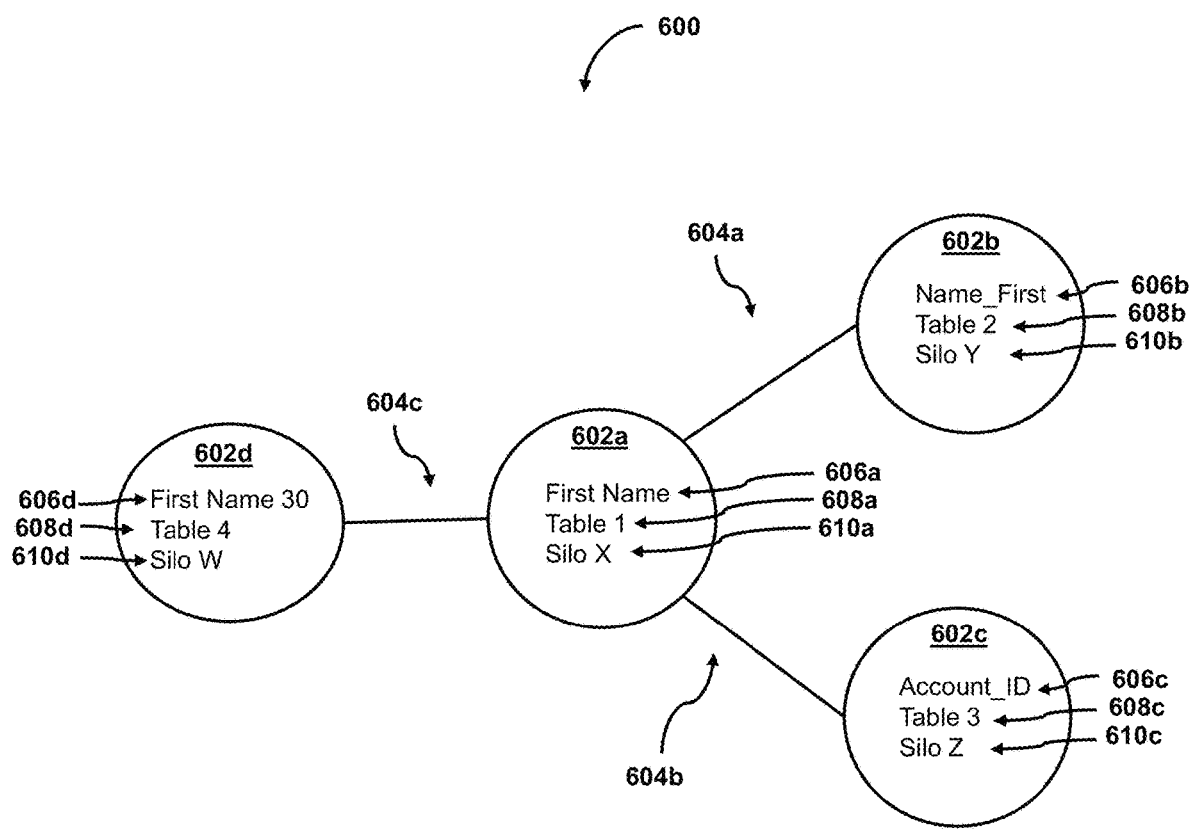
FIG. 6 shows an expanded view of a metadata graph, in accordance with some implementations of the present technology.

For example, FIG. 6. shows an expanded view of a metadata graph. In some implementations, expanded view of metadata graph 600 can correspond to a portion of metadata graph 500, in accordance with some implementations of the present technology. As an example, first node 602a can indicate metadata of one or more data objects stored within a data silo. For example, first node 602a may include a file-level metadata identifier 606a, a container-level metadata identifier 608a, and a location identifier 610a of the data silo. The file-level metadata identifier 606a may be a variable name, a file name, or other identifier that indicates a piece of data that is stored within a given silo. For instance, the file-level metadata identifier may be any identifier that describes data stored within a file stored in the data silo (e.g., variable identifiers, file formats, file sizes, access time stamps, or other file-level metadata). Container-level metadata identifier 608a may be an identifier that identifies a format in which the data stored in the given data silo may be (e.g., a table format, tabular format, a graphical format, a dictionary, etc.), one or more configurations of the data silo (e.g., communication protocols, accessibility parameters, etc.), or other container-level metadata that is associated with a given data silo. Location identifier 610a may be an identifier that indicates the location of the given data silo. For example, the location identifier may indicate a location of which computer node the data silo is associated with (e.g., stored on, hosted on, connected to, etc.), a computer system that the data silo is associated with, a server that the data silo is hosted at or otherwise associated with, or other location identifier.

Each node of the set of nodes (e.g., nodes 602a-602d) can each have their own file-level metadata identifier 606, container-level metadata identifier 608, or location identifier 610. As each node of the set of nodes may represent an abstract view of how data is derived from one another, where data is located, and what data is available, the system may leverage the metadata graph to efficiently find where data is located, along with lineage information of the data itself. That is, nodes may represent an abstracted view of how data is stored across the data silos, the relationships between the data stored in the data silos, and where the data is stored among the data silos. For example, first node 602a may be linked to second node 602b via first edge 604a. In some implementations, first edge 604a may indicate lineage information of the nodes, such as where second node 602b is a data source of first node 602a. However, in other implementations, first edge 604a may indicate lineage information, such as where first node 602a is a data source of second node 602b, in accordance with some implementations of the present technology. It would be appreciated by one of ordinary skill in the art, that each node 602 may be linked to other nodes via an edge 604, where each edge indicates lineage information between one or more nodes of the set of nodes. By representing the data objects via a metadata graph that indicates (i) where data objects (e.g., the data stored in data silos) are located, (ii) metadata of the data objects themselves, (iii) metadata of the data silos which store the data objects, and (iv) the locations of such data silos, the system may traverse the metadata graph to access data stored in data silos at disparate locations more efficiently as opposed to existing systems' reliance on manually parsing each and every data silo for a match between data a user is attempting to access and data stored within the silos themselves, thereby reducing the usage of computational resources when accessing siloed data across disparate locations.

In some implementations, the system can determine the node corresponding to the set of phrases by traversing the metadata graph. For example, the system can traverse each node of the set of nodes of the metadata graph. The system can compare a metadata identifier of a given node to each phrase of the set of phrases. For example, the metadata identifier may be a file-level, a container-level, or other identifier that indicates that a given data silo includes data pertaining to the phrase. For example, the metadata identifier may be "first_name" (e.g., a file-level metadata identifier) indicating that the data silo includes first names of users. In response to determining that the metadata identifier matches at least one phrase of the set of phrases, the system may determine the node corresponding to the set of phrases.

For example, as opposed to traversing the metadata graph using a single phrase, the system traverses the metadata graph and compares each phrase of the set of phrases to a metadata identifier of a given node. That is, as opposed to existing techniques that traverse graphs (e.g., metadata graphs or other graphs) using a given keyword, the system traverses the graph using a set of phrases. In this way the system may determine the node corresponding to the set of phrases more efficiently as the system need not perform multiple traversals of the graph using different phrases each time, thereby reducing the usage of computational resources.

In some implementations, the system may determine another data silo storing a second data object. For example, the system can traverse each node of the set of nodes (e.g., of the metadata graph) to identify a metadata identifier matching at least one phrase of the set of phrases. In response to determining that the metadata identifier matches at least one phrase of the set of phrases, the system determines a first node corresponding to the set of phrases. However, although the system may have determined a first node that corresponds to the set of phrases (e.g., thereby determining a data silo which stores a data object that is associated with the set of phrases), the system may nonetheless continue to traverse the metadata graph to determine other locations (e.g., of data silos) which host a given data object.

For example, in the case where the user-specified query indicates "I want all locations of where first names of users reside," the system may continue to traverse the set of nodes using edges connected to a given node. For instance, in response to determining that the first node corresponds to the set of phrases, the system can perform a second traversal of the nodes of the set of nodes to determine a second node using an edge indicating a first data lineage of the first node. The first data lineage of the first node can indicate a second node that includes information that is a source of information associated with the first node. For example, each edge of the metadata graph can indicate a lineage of data objects. As each node of the set of nodes indicates metadata (e.g., data of data), the edges between the nodes can indicate that one node is the source of another node (or alternatively, a derivative data source of another node).

To illustrate, referring to FIG. 6, the system may determine a first node corresponding to the set of phrases, such as first node 602a. The system may traverse to either second node 602b using first edge 604a, to third node 602c using second edge 604b, or to fourth node 602d using third edge 604c. In some implementations, after performing a first traversal (e.g., the traversal from first node 602a to second node 602b), the system may perform second traversal (e.g. from first node 602a to third node 602c). The system may iteratively repeat such traversals until each node has been traversed to, or until no nodes remain that correspond to the set of phrases after performing the traversal. In this way, the system may access siloed data more efficiently by traversing the metadata graph as opposed to parsing each and every data silo within a computing environment for a match.

As such, the system can determine a second data silo storing a second data object (e.g., the same data object or a similar data object related to the at least one data objects) by using a location identifier corresponding to the second node to obtain the second data object of the set of data objects via the second data silo. That is, the system can determine alternate locations (e.g., data silos) to which a given data object may be stored by traversing the metadata graphs using the edges that are connected to a determined node. In this way, the system may determine all locations where the same or similar data may be stored. In some implementations, the system may then generate, on the GUI, a visual representation of the second data object. In this way, a user may be provided with additional data which they are interested in.

In some implementations, in response to determining each data silo where a given data object is stored, the system can perform one or more data aggregation techniques. For example, the system can remove unnecessary instances of the data itself. For example, as the metadata graph is an abstraction indicating where data is located, and what data a given silo may include, the system may remove all but one instance of the data (e.g., data object) to reduce the amount of computer memory being utilized.

In some implementations, process 400 can generate the metadata graph using a generated metadata data structure. For example, the system can retrieve (i) a set of file-level metadata identifiers and (ii) a set of container-level metadata identifiers from each data silo within a given environment (e.g., environment 300). Each file-level metadata identifier of the set of file-level metadata identifiers indicate metadata of a given data object stored within a respective data silo, and each container-level metadata identifier of the set of container-level metadata identifiers indicates metadata of the respective data silo of the set of data silos within the given environment. The system can generate a set of semantically similar metadata identifiers corresponding to each file-level and container-level metadata identifier, respectively. For example, the system may perform natural language processing on the file-level and container-level metadata identifiers to determine a set of semantically similar metadata identifiers that correspond to each file-level and container-level metadata identifiers, respectively. For instance, for a file-level metadata identifier of "first_name," the system may generate a set of semantically similar metadata identifiers of "name_first," "account_ID," "user_id," "name," or others.

The system can then generate a metadata data structure to map each semantically similar metadata identifier of the set of semantically similar metadata identifiers to normalized file-level metadata identifiers and normalized container-level metadata identifiers. For example, to enable the system to efficiently search for data across the metadata graph, the system can generate a normalized metadata identifier that corresponds to each of the semantically similar phrases (e.g., by using natural language processing, machine learning models, artificial intelligence models, etc.). For instance, the normalized metadata identifier for the set of semantically similar metadata identifiers of "name_first," "account_ID," "user_id," and "name," can be "first_name_ID," where the metadata data structure maps "first_name_ID" to each of the semantically similar metadata identifiers. In some implementations, the system may generate the metadata graph using the generated metadata data structure (e.g., the normalized metadata identifiers, the set of semantically similar metadata identifiers, etc.). Additionally or alternatively, the system may generate the metadata graph based on an artificial intelligence model. In this way, the system may optimize the metadata graph by using normalized container-level and file-level metadata identifiers associated with the nodes of the metadata graph to enable more efficient data searching.

Referring back to FIG. 4, at act 408, process 400 can determine a data silo storing at least one data object. For example, the system can determine a data silo of the set of data silos that store at least one data object of the set of data objects using the location identifier corresponding to the determined node (e.g., of act 406) to obtain the at least one data object of the set of data objects via the data silo. As each node of the set of nodes of the metadata graph include a location identifier corresponding to data silos (e.g., indicating which data silo stores a given data object), the system may access the data silo using the location identifier to obtain the data object. For example, the system can use the location identifier of the determined node to determine which data silo hosts the at least one data object of the set of data objects. In some implementations, the system may determine each data silo that stores each data object of the set of data objects using location identifiers corresponding to other determined nodes to obtain the set of data objects.

Using the location identifier, the system may determine a communication protocol associated with the determined data silo to obtain the at least one data object. For example, as each data silo may be associated with its own communication protocol, the system may identify which communication protocol the determined data silo is associated with and select that communication protocol to communicate with the data silo (e.g., query language, access protocol, configuration, etc.) and provide a query to the data silo. As such, the system may obtain the at least one data object via the query. In this way, the system may reduce the amount of wasted computational resources when accessing siloed data across disparate locations via the metadata graph.

At act 410, process 400 can generate for display a visual representation of the at least one data object. For example, the system can generate, for display, on the GUI, a visual representation of the at least one data object. In some implementations, the visual representation of the at least one data object includes lineage information of the at least one data object. For instance, referring to FIG. 1, a visual representation of the at least one data object 106 may be presented for display within the user interface 100, with lineage information 108 that corresponds to the at least one data object. It would be appreciated by one having ordinary skill in the art that user interface 100 may include one or more visual representations (e.g., of data objects and/or lineage information) that may correspond to the set of data objects, in accordance with one or more implementations of the present technology.

In some implementations, the system can use an artificial intelligence model to generate an intended result. For example, the system can receive, via a second GUI, a second user-specified query indicating a request to generate an intended result. For example, a user may provide a query indicating a request to use an artificial intelligence model to generate an intended result (e.g., a prediction). The intended result can be any user-specified prediction that a user would like to receive. In the context of non-technically savvy users, such users may be ignorant as to what artificial intelligence models/machine learning models to select for generating a given prediction, what data to use to train a given artificial intelligence model/machine learning model, or other components/data to use to generate a given prediction. However, the users may know what they would like to discover (e.g., how many accounts will be opened in the next three months, what week will a company likely receive an influx of accounts opened, what is the expected cost of monitoring for fraud with respect to a set of accounts over a given time period, how many users/accounts are active, how many users/accounts are inactive, etc.). To enable such non-technically savvy users to obtain an intended result, the system may provide a GUI (which may be the same GUI, or similar to the GUI described in FIG. 1) that enables users to provide a query to generate an intended result, and may provide a recommendation as to which artificial intelligence model/machine learning model to use to generate the intended result, and what training data to use to train the artificial intelligence model/machine learning model to generate the intended result.

The system may provide the second user-specified query to an artificial intelligence model to generate a recommendation, where the recommendation includes (i) a second artificial intelligence model to be used to generate the intended result and (ii) a second set of data objects to be used when training the second artificial intelligence model. As an example, the system may provide the user-specified query to an artificial intelligence model (e.g., a machine learning model, model 702 (FIG. 7)) that is trained to generate recommendations. The artificial intelligence model may generate a recommendation that indicates a given artificial intelligence model to use to generate the intended result and what training data to train the given artificial intelligence model with to generate the intended result. For example, the recommended artificial intelligence model can be an artificial intelligence model or a machine learning model that may be configured to generate the intended result. Such recommended artificial intelligence model/machine learning model may be a deep learning model, a neural network, a convolutional neural network, a recurrent neural network, a support vector machine, a natural language processing model, a KNN model, a linear regression model, a logistic regression model, a random forest model, a Bayesian model, or other artificial intelligence/machine learning mode. In this way, the system may provide recommendations as to which artificial intelligence models to use to generate an intended result, and what training data to use to train the artificial intelligence model, thereby reducing the utilization of computational resources that would otherwise be wasted by non-technically savvy users performing multiple incorrect iterations of training a machine learning model to generate the intended result.

In response to receiving a user selection indicating acceptance of the recommendation, the system may (i) access a database to obtain the second artificial intelligence model and (ii) obtain the second set of data objects using the metadata graph, in accordance with some implementations of the present technology. For example, the system may generate a message (e.g., a notification, a user-selectable object, etc.) to enable the user to accept the recommendation (e.g., via a button, via a text-based command, via a checkbox, etc.). In some implementations, the system may automatically accept the recommendation without a user selection to accept the recommendation. In this way, the system may automatically select the recommended artificial intelligence model and training data to generate the intended result, thereby improving the user experience. The system may then access a data base (e.g., an artificial intelligence model database) that stores untrained or pretrained artificial intelligence/machine learning models and obtains the recommended artificial intelligence model (e.g., via an artificial intelligence model identifier, a machine learning model identifier, etc.). The system may also access the metadata graph to obtain the second set of data objects (e.g., to be used as training data for the recommended artificial intelligence/machine learning model). For example, the second set of data objects may be training data stored within one or more data silos of environment 300 to be used as training data for artificial intelligence models. In response to obtaining the recommended artificial intelligence model and the second set of data objects, the system can train the recommended artificial intelligence model using the second set of data objects (e.g., the training data), and can apply the recommended artificial intelligence model (e.g., on input data) to generate the intended result. For example, the system can provide new input data (e.g., new data obtained via the metadata graph) as input to the recommended artificial intelligence model to generate the intended result (e.g., based at least in part on the user-specified query). In this way, non-technically savvy users may be enabled to use artificial intelligence models to generate one or more intended results, thereby improving the user experience.

In some implementations, the system can determine whether an artificial intelligence model's output is approved to be provided to one or more computing systems. For example, as artificial intelligence models and machine learning models are used in various domains for an entity (e.g., a company, business, etc.), the use of such artificial intelligence models/machine learning models may be required to conform to one or more governance standards when using such models for one or more functionalities. As non-technically savvy users may use such models to generate predictions, discover new relationships between existing data, or for other functionalities, the system can ensure that the use of such models, the data being provided to the models, and the outputs generated by the models are in compliance with one or more industry, governmental, or internal standards. In this way, the system may reduce the chance of a data breach, thereby improving data security.

For example, the system can access a governance database to obtain a set of policies indicating usage criteria corresponding to a set of data objects. The governance database may store policies (e.g., governance policies, industry standards, internal company policies, etc.) that indicate usage criteria (e.g., definitions or other criteria pertaining to how data may be used, generated, provided to other computing systems, provided to external computing environments, published, etc.). The system may access the governance data base to obtain the set of policies that indicate usage criteria for the second set of data objects (e.g., the data used to train the recommended artificial intelligence model) and may determine whether the second set of data objects are approved to be used to train the recommended artificial intelligence model using the set of policies. For instance, in some implementations, the system can provide (i) the second set of data objects and (ii) the obtained set of policies (e.g., corresponding to the second set of data objects) to another artificial intelligence/machine learning model (e.g., model 702 (FIG. 7)) that is configured to generate a prediction of whether the second set of data objects are approved to be used to train the second artificial intelligence model. The system can also determine whether an output of the second artificial intelligence model (e.g., the recommended artificial intelligence model) is approved to be provided to one or more computing systems using a second set of policies indicating usage criteria corresponding to artificial intelligence model predictions. For example, the second set of policies may include information pertaining to what types of artificial intelligence model predictions may be transmitted, provided, published, or sent to internal or external computing systems. In response to (i) the second set of data objects being approved to be used to train the second artificial intelligence model and (ii) the output of the second artificial intelligence model being approved to be provided to the one or more computing systems, the system may apply the second artificial intelligence model (e.g., the recommended artificial intelligence model) to generate the intended result. In this way, the system may vet the training data and the outputs that may be generated by the artificial intelligence model prior to generating the intended result, thereby reducing the chance of a data breach caused by providing such outputs to one or more computing systems.

Figure 7:
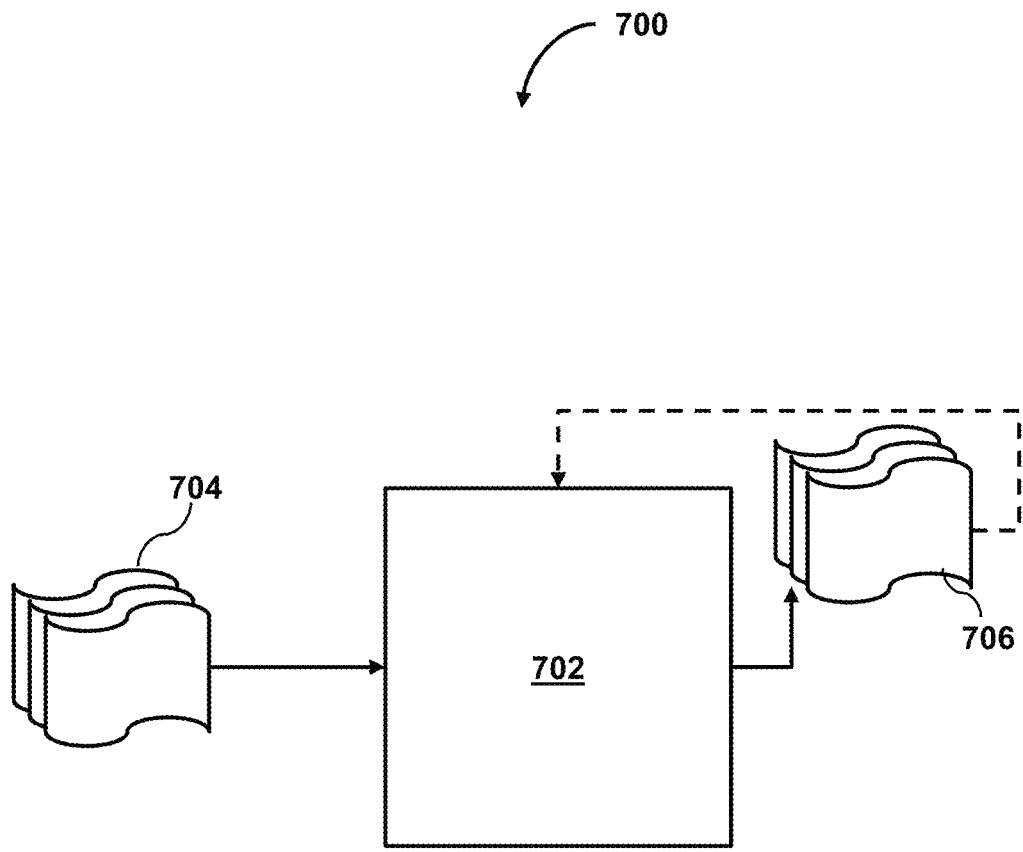
FIG. 7 shows a diagram of an artificial intelligence model, in accordance with some implementations of the present technology.

Referring to FIG. 7, FIG. 7 shows a diagram 700 of an artificial intelligence model, in accordance with some implementations of the present technology. Model 702 may take inputs 704 and provide outputs 706. The inputs may include multiple datasets, such as a training dataset and a test dataset. Each of the plurality of datasets (e.g., inputs 704) may include data subsets related to user data, predicted forecasts and/or errors, and/or actual forecasts and/or errors. In some embodiments, outputs 706 may be fed back to model 702 as input to train model 702 (e.g., alone or in conjunction with user indications of the accuracy of outputs 706, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a response to a user-provided query).

In a variety of implementations, model 702 may update its configurations (e.g., weights, biases, or other parameters) based on the assessment of its prediction (e.g., outputs 706) and reference feedback information (e.g., user indication of accuracy, reference labels, or other information). In a variety of implementations, where model 702 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 702 may be trained to generate better predictions.

In some implementations, model 702 may include an artificial neural network. In such implementations, model 702 may include an input layer and one or more hidden layers. Each neural unit of model 702 may be connected with many other neural units of model 702. Such connections can be enforcing or inhibitory in their effect on the activation state of connected neural units. In some implementations, each individual neural unit may have a summation function that combines the values of all of its inputs. In some implementations, each connection (or the neural unit itself) may have a threshold function such that the signal must surpass it before it propagates to other neural units. Model 702 may be self-learning and trained, rather than explicitly programmed, and can perform significantly better in certain areas of problem solving, as compared to traditional computer programs. During training, an output layer of model 702 may correspond to a classification of model 702, and an input known to correspond to that classification may be input into an input layer of model 702 during training. During testing, an input without a known classification may be input into the input layer, and a determined classification may be output.

In some implementations, model 702 may include multiple layers (e.g., where a signal path traverses from front layers to back layers). In some implementations, back propagation techniques may be utilized by model 702 where forward stimulation is used to reset weights on the "front" neural units. In some implementations, stimulation and inhibition for model 702 may be more free flowing, with connections interacting in a more chaotic and complex fashion. During testing, an output layer of model 702 may indicate whether or not a given input corresponds to a classification of model 702 (e.g., a response to a user-provided query).

In some implementations, the model (e.g., model 702) may automatically perform actions based on outputs 706. In some implementations, the model (e.g., model 702) may not perform any actions. The output of the model (e.g., model 702) may indicate or otherwise be used to generate a metadata graph, determine a set of phrases, determine semantically similar phrases, provide recommendations of artificial intelligence/machine learning models, determine whether data objects are approved to be used to train artificial intelligence/machine learning models, determine whether artificial intelligence/machine learning model outputs are approved to be provided to one or more computing systems, generate responses, or generate other information, in accordance with one or more implementations of the present technology.

In some implementations, the model (e.g., model 702) can be trained based on training information stored in database 308 or database 312 to generate recommendations. For example, the recommendations may be a recommendation for a given artificial intelligence/machine learning model to generate an intended result and a recommendation for what training data to be used when training the given artificial intelligence/machine learning model. Model 702 can take a first set of training information in as input 704 and generate an output (e.g., a recommendation, recommendations) as output 706. The first set of training information may include user-specified queries indicating a request to generate an intended result (e.g., prediction), artificial intelligence/machine learning model identifiers used to generate the intended result, training data used to train the artificial intelligence/machine learning model use to generate the intended result, or other information. For example, model 702 may learn associations between the first set of training information to generate a recommendation as output 706. The output 706 may be a recommendation as to which artificial intelligence model should be selected to generate the intended result and which training data should be used to train the artificial intelligence model to generate the intended result. In some embodiments, outputs 706 may be fed back into the model 702 to update one or more configurations (e.g., weights, biases, or other parameters) based on its assessment of its prediction (e.g., outputs 706) and reference feedback information (e.g., user indication of accuracy, reference labels, ground truth information, known recommendations, etc.). The first set of training information may be historical training information that has been used to train prior artificial intelligence/machine learning models to generate a given intended result. In this way, model 702 may be trained to generate one or more recommendations as to which artificial intelligence/machine learning models can generate the intended result, as well as the training data needed to train such artificial intelligence models/machine learning models, thereby enabling non-technically savvy users to leverage artificial intelligence/machine learning models.

In some implementations, the model (e.g., model 702) can be trained based on training information stored in database 308 or database 312 to determine approvals. For example, model 702 can be trained to determine whether training data for a given artificial intelligence/machine learning model is approved for use in training the artificial intelligence/machine learning model and whether the output of the artificial intelligence/machine learning model is approved to be published, transmitted, or provided to one or more computing systems. For example, as explained above, due to the rise of artificial intelligence and machine learning models being used in business contexts, such models are under scrutiny and must be vetted prior to being applied to sensitive user data. To vet such models, model 702 can take a second set of training information in as input 704, and generate an output (e.g., an approval, approvals) as output 706. The second set of training information may include predictions generated by artificial intelligence/machine learning models, artificial intelligence/machine learning model identifiers used to generate the predictions, training data used to train the artificial intelligence/machine learning model used to generate the predictions, sets of policies indicating usage criteria corresponding to data objects (e.g., the training data) used to train the artificial intelligence/machine learning mode used to generate the predictions, a second set of policies indicating usage criteria corresponding to artificial intelligence model predictions, or other information. For example, model 702 may learn associations between the second set of training information to generate approvals as output 706. The output 706 may be approvals indicating whether the second set of data objects (e.g., the training data) is approved for use to be used to train the artificial intelligence/machine learning model, and whether an output (e.g., prediction) of the artificial intelligence model/machine learning model is approved to be provided to one or more computing systems. In some embodiments, outputs 706 may be fed back into the model 702 to update one or more configurations (e.g., weights, biases, or other parameters) based on its assessment of its prediction (e.g., outputs 706) and reference feedback information (e.g., user indication of accuracy, reference labels, ground truth information, known recommendations, etc.). The second set of training information may be historical information that has been used to provide recommendations as to different data objects (e.g., training data) and machine learning models. In this way, model 702 may be trained to vet artificial intelligence models/machine learning models, their input data, their training data, and their output data prior to being used, in accordance with one or more implementations of the present technology.

Generating A Unified Metadata Graph

Figure 8:
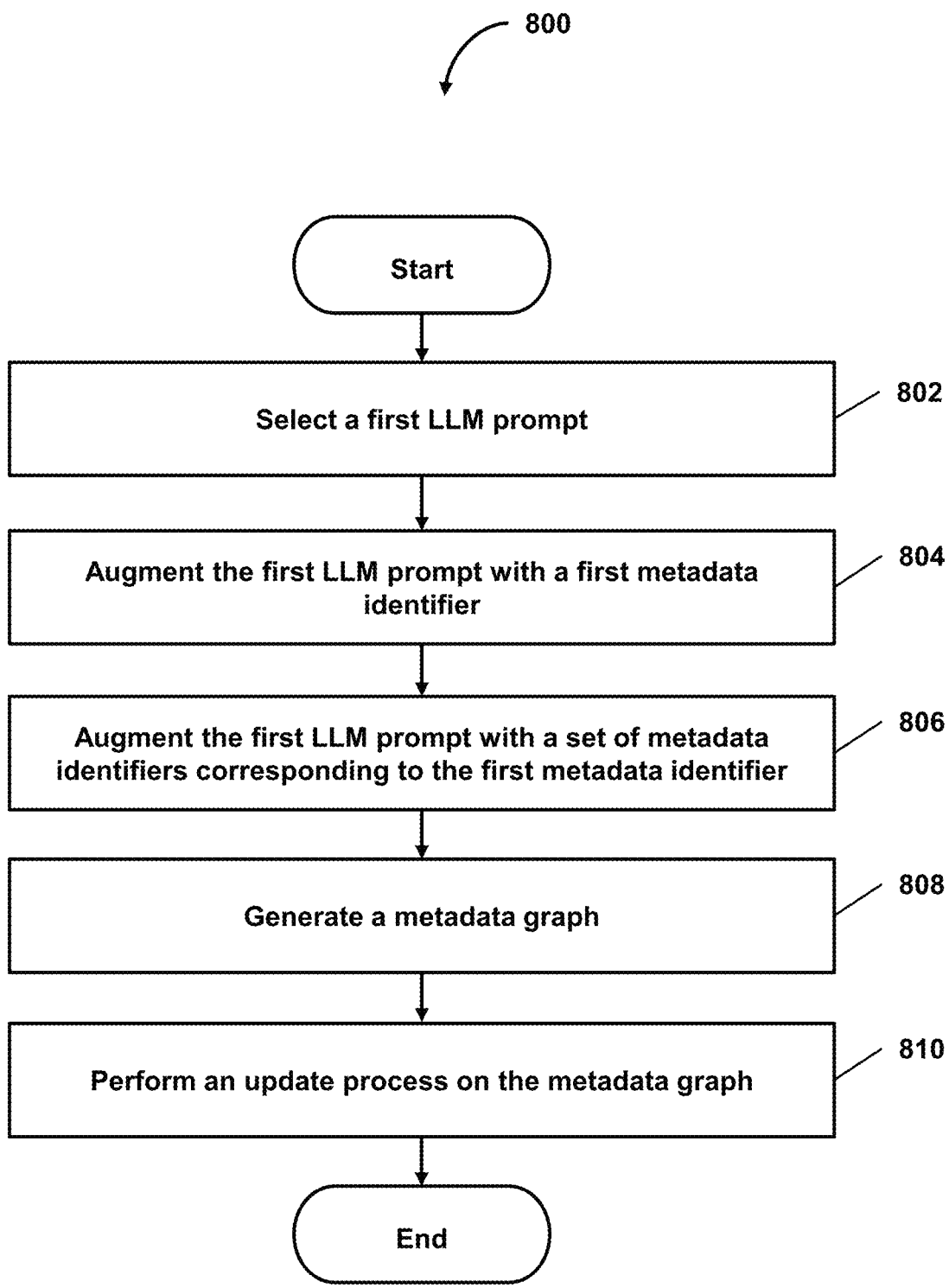
FIG. 8 is a flow diagram illustrating a process of generating a unified metadata graph via a retrieval-augmented generation (RAG) Framework, in accordance with some implementations of the present technology.

FIG. 8 illustrates a process of generating a unified metadata graph via a retrieval-augmented generation (RAG) Framework, in accordance with some implementations of the present technology.

At act 802, process 800 selects a first LLM prompt. For example, the system selects, from a set of LLM prompts, a first LLM prompt corresponding to a first metadata identifier of a set of metadata identifiers. Each LLM prompt of the set of LLM prompts may be associated with a data schema, data format, data type, or other characteristic of a metadata identifier. For example, an LLM prompt that is associated with a data type of a metadata identifier may refer to a file-level metadata identifier, container-level metadata identifier, system-level metadata identifier, or other metadata identifier. For instance, a type of metadata identifier may dictate the structure of an LLM prompt to be selected for use.

LLM prompts may be structured with respect to a data type of a metadata identifier. For example, structured LLM prompts may refer to an input that is configured to be interpreted by an LLM in a structured format. A structured LLM prompt is a prompt that is for a text-to-text language model (e.g., LLM) where text that is included in the structured LLM prompt is structured in a way that can be interpreted and understood by the LLM. As each LLM prompt can be structured for a data schema, data format, data type, data profile, or other characteristic of a metadata identifier, the LLM prompts may provide additional information to the LLM when generating an output. For instance, structured LLM prompts that are structured for the data type of a metadata identifier may include one or more attributes, tags, labels, or other information that indicates that the metadata identifier that is included within the LLM prompt is of a particular type. In this way, the LLM may generate more accurate first intermediate outputs indicating sets of metadata identifiers that correspond to the first metadata identifiers.

Figure 9A:
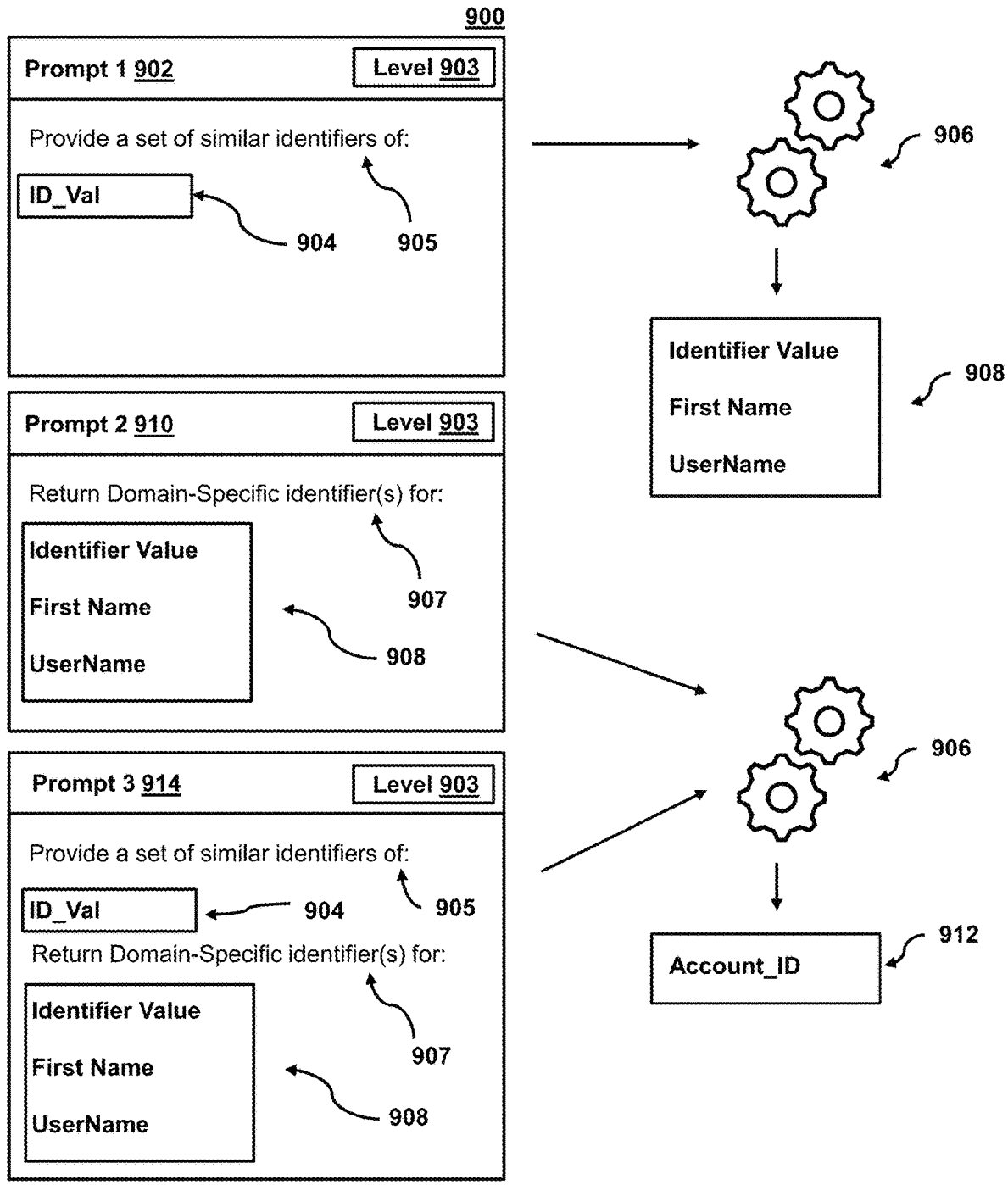
FIGS. 9A-9B are an illustrative diagram of Large Language Model (LLM) prompts, in accordance with some implementations of the present technology.
Figure 9B:
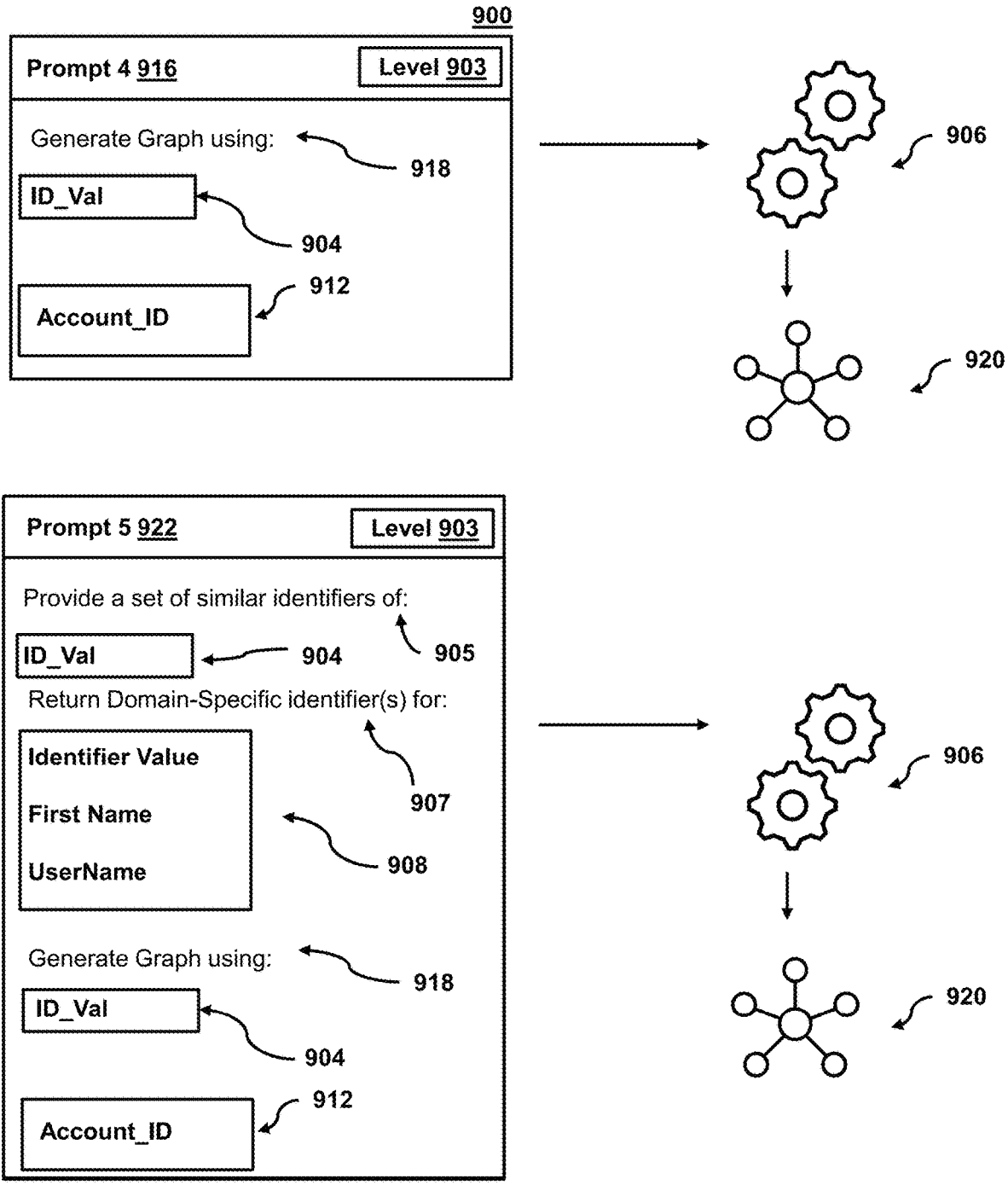

For example, referring to FIGS. 9A-9B which show an illustrative diagram of LLM prompts, in accordance with some implementations of the present technology, illustrative LLM prompts 900 may include prompt 1 902, prompt 2 910, prompt 3 914, prompt 4 916, and prompt 922. Additionally shown is LLM 906 for illustrative purposes. Prompt 1 902 may include level 903, first metadata identifier 904, and first prompt text 905. For example, level 903 may refer to a data schema, data format, data type, or other characteristic of first metadata identifier 904 to provide LLM 906 with additional information as to what kind or type of metadata identifier the LLM is to consider. First prompt text 905 may be structured text that is associated with level 903. For example, first prompt text 905 may be unique to level 903. For instance, first prompt text 905, which is shown to indicate "provide a set of similar identifiers of:," may be the text that corresponds to level 903, where level 903 indicates a file-level metadata identifier type, and where first metadata identifier 904 indicates a file-level metadata identifier. In some implementations, first prompt text 905 may be different based on the metadata identifier of first metadata identifier 904. For example, where first metadata identifier 904 is a container-level metadata identifier, first prompt text 905 may alternatively recite "provide a set of similar container-level identifiers of:," where level 903 dictates first prompt text 905. That is, upon determining a type of metadata identifier of first metadata identifier 904, prompt 1 902 may be selected where prompt 1 902 is associated with level 903, indicating the type of metadata identifier that first metadata identifier 904 is, which, in turn, includes the correct first prompt text 905. In this way, the LLM prompts may be structured based on a data schema, data format, data type, or other characteristic of the first metadata identifier to obtain more accurate results from the LLM as opposed to generic LLM prompts of existing systems that do not rely on specifically generated LLM prompts.

To generate a metadata graph, the system can leverage a RAG framework. For example, a RAG framework, or alternatively, RAG, may refer to framework that enables artificial intelligence models (e.g., large language models) to access data sources that may include information that is subject to updates without requiring retraining of the entire LLM. Traditionally, LLMs are trained on a large corpus of data to provide outputs based on an input prompt. However, LLMs are often limited to the training data in which they are trained on, and the training process for LLMs are exceptionally computationally intensive. To overcome such drawbacks of LLMs, RAG methodologies may be employed to ensure that LLMs are provided with the most up-to-date data without requiring a full retraining of the LLM.

Moreover, using RAG, the LLM is able to query for additional information that the LLM has not been previously trained on. For example, while an LLM can often produce outputs that, on its surface, may appear to be factually correct, LLMs do not have a mechanism for deciphering between what is true, and what is not true. Rather, LLMs provide an output that the LLM interprets is the most correct output with respect to the input (e.g., a prompt). To provide a mechanism that enables LLMs to not only have access to information on which the LLM was not previously trained, but also provide a source of truth (e.g., verifiable information to which the LLM may generate an output based on), the LLM can be communicatively coupled to one or more data sources. For instance, in the context of generating a metadata graph via a RAG framework, the LLM may be communicatively coupled to a raw data component 1010 (e.g., to "retrieve" metadata identifiers) and the set of domain-specific ontologies of domain ontology component 1008 of an entity to return generated filtered domain-specific metadata identifiers (based on augmented LLM prompts including the retrieve metadata identifier).

Figure 10A:
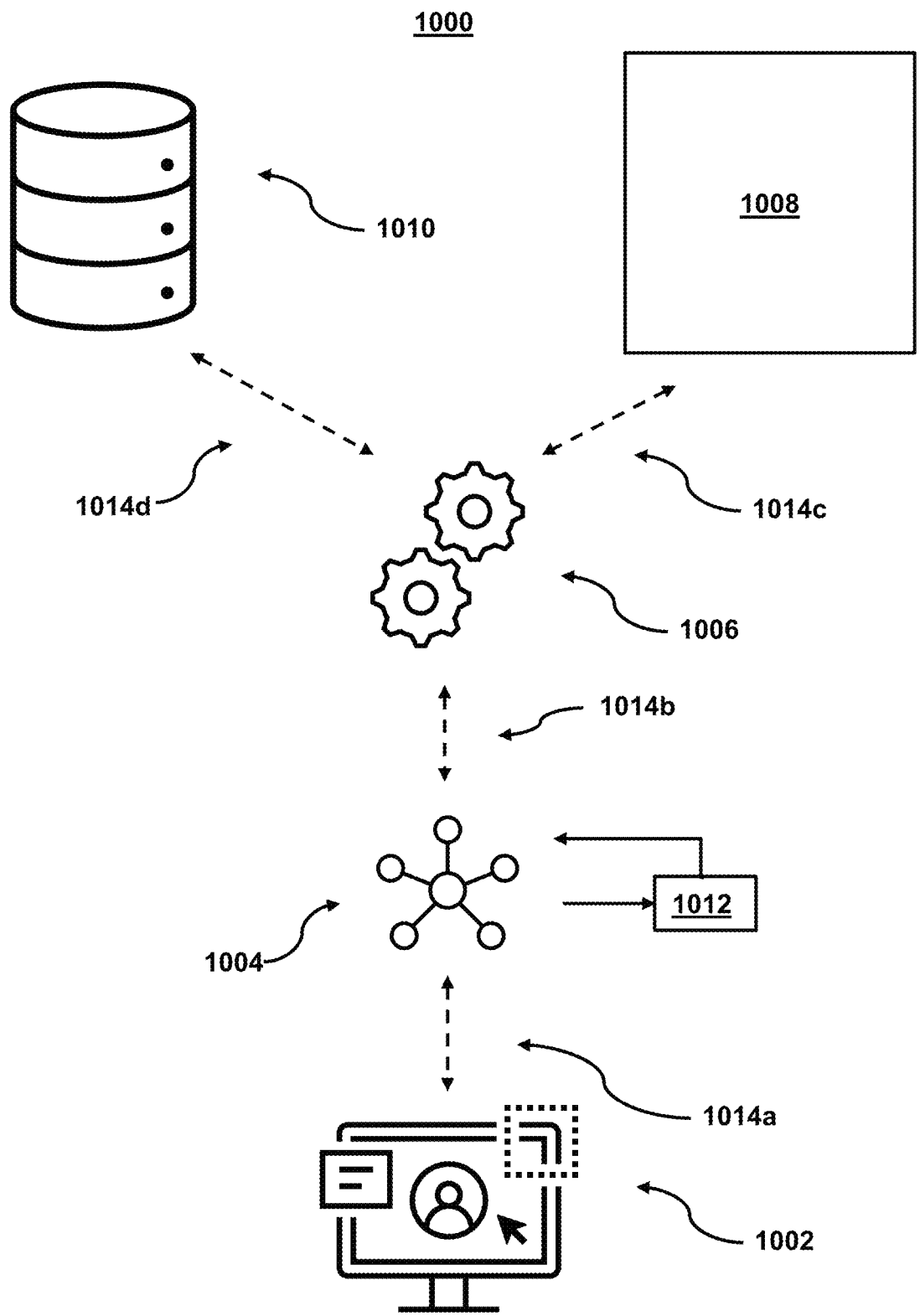
FIGS. 10A-10D are subsystem diagrams illustrating an example of a RAG framework environment to generate a unified metadata graph, in accordance with some implementations of the present technology.

For example, referring to FIG. 10A, FIG. 10A shows a subsystem diagram 1000 illustrating an example of a RAG framework environment to generate a unified metadata graph. Subsystem diagram 1000 may provide an example of a RAG framework environment, in accordance with some implementations of the present technology, which may include a user interface 1002, a metadata graph 1004, an LLM 1006, domain ontology component 1008, raw data component 1010, feedback component 1012, and communication links 1014a-1014p. For example, user interface 1002 is a user interface to receive user-specified queries indicating a request to access a set of data objects (e.g., as explained in act 402 of FIG. 4). Metadata graph 1004 can be a metadata graph (e.g., as explained in act 406 of FIG. 4). LLM 1006 can be any LLM (e.g., BERT, Claude, Cohere, Ernie, Falcon 40B, Galactica, etc.) that is configured to provide outputs in response to inputs. For example, LLM 1006 may be configured to receive LLM prompts and provide a response (e.g., textual, graphical, etc.) in response to the LLM prompt.

Communication links 1014a-1014p may enable communication between user interface 1002, metadata graph 1004, LLM 1006, domain ontology component 1008, raw data component 1010, feedback component 1012, or other components (shown or not shown). For example, Communication links 1014a-1014p may include the Internet, a mobile phone network, a mobile voice or data network (e.g., a 5G or LTE network), a cable network, a public switched telephone network, or other types of communications networks or combinations of communications networks. Communication links 1014a-1014p may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

Domain ontology component 1008 may be a database, server, or other computational component configured to store a set of domain ontologies with respect to an entity. For example, domain ontology component 1008 may store domain ontologies that indicate a set of concepts and categories in a given subject area (e.g., a domain) that provides information about the properties of the concepts/categories and the relationships between the concepts/categories. In accordance with one or more implementations of the present technology, domain ontology component 1008 may store a set of domain ontologies that are specific to an entity of a system. For example, where the entity is a company, the domain ontologies may reflect domain-specific knowledge (e.g., nomenclature, taxonomy, lexigraphy) of terms used in the domain of the entity. For instance, where the entity is a bank, domain ontology component 1008 may include ontologies that relate financial terms to other financial terms to deduce the context in which a given financial term is used.

Such domain-specific (e.g., entity-specific) contextual knowledge is advantageous to leverage with respect to generating metadata graphs as such knowledge may be used to generate normalized, filtered, domain-specific metadata identifiers that conform to the nomenclature that the entity uses in day-to-day operations. By having the LLM communicatively coupled to the set of domain ontologies that are specific to the entity, the system can generate normalized, filtered, domain-specific metadata identifiers to be used in generating the metadata graph. By doing so, the system is able to extract, identify, and locate data that users of the system intend to locate from the metadata graph based on a common nomenclature, context, or domain. Moreover, by leveraging domain ontologies that are associated with an entity, the system reduces error when generating normalized, filtered, domain-specific metadata identifiers as the nomenclature and contextual knowledge of the entity is preserved. For example, differing entities may have different meanings for a given term. By leveraging the domain-specific ontologies, the system can reduce errors when generating the normalized, filtered, domain-specific metadata identifiers to be used in the metadata graph as the LLM may "refer" to the set of domain-specific ontologies to validate an output of the LLM (e.g., the normalized, filtered, domain-specific metadata identifier). In addition to validating outputs of the LLM (e.g., that may include the metadata graph 1004 itself), feedback component 1012 may be used to update, validate, or verify updates (e.g., additions to) the metadata graph 1004 during metadata graph generation processes. For instance, feedback component 1012 may include one or more user inputs or automated inputs to verify accuracy of metadata graph 1004 (explained in more detail later).

Raw data component 1010 can be a data source that provides raw data to the LLM. For example, raw data component 1010 provides metadata identifiers, data profiles (e.g., of the metadata identifiers, data silos, data objects, the system), or other raw data to the LLM 1006 when generating the metadata graph 1004. For instance, the raw data component 1010 may obtain raw data from data silos of the system. For example, the system may receive, from a set of data silos, raw data comprising a set of metadata identifiers indicating (i) file-level metadata identifiers, (ii) container-level metadata identifiers, or (iii) system-level metadata identifiers. The file-level metadata identifiers may indicate metadata of data objects stored within a data silo of the set of data silos, the container-level metadata identifiers may indicate metadata of a data silo of the set of data silos, and the system-level metadata identifiers may indicate metadata of a computing system hosting a data silo of the set of data silos. For example, the file-level metadata identifiers may indicate a label of a data object stored within a data silo, a container-level metadata identifier may indicate a label of the data format in which the data silo stores data, and the system-level metadata identifiers may indicate a label of an operating system or system identifier that hosts a data silo.

Figure 10B:
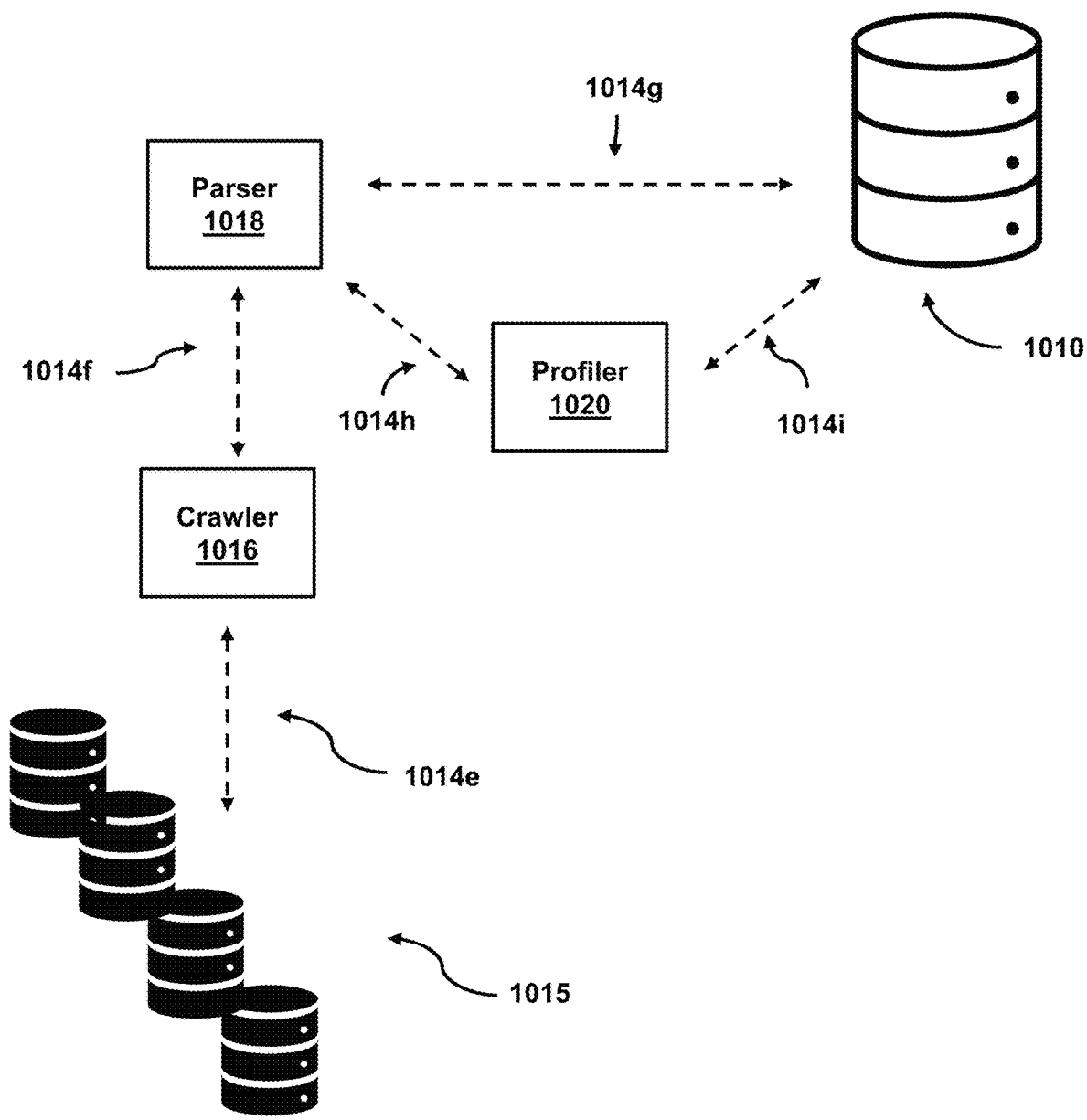

In some implementations, the system can perform a crawling process over a set of data silos. For example, to obtain raw metadata, the system can perform a crawling process over a set of data silos associated with an entity (e.g., a company, merchant, corporation, business, computing environment, etc.) to obtain the raw data comprising the set of metadata identifiers. For instance, referring to FIG. 10B, which shows a subsystem diagram of raw data component 1010, the crawling process may be performed by crawler 1016, which can be any database crawling service configured to extract metadata from data silos 1015. Data silos 1015 may be the same or similar data silos as described in acts 402-410 of process 400 (FIG. 4). For example, crawler 1016 may generate a set of crawl queries to obtain file-level, container-level, or system-level metadata (e.g., metadata values, metadata identifiers, etc.). Parser 1018 may parse the set of crawl queries to extract the file-level, container-level, or system-level metadata identifiers. In this way, the system may obtain all available metadata from the data silos for use in generating a more robust and accurate metadata graph as opposed to existing methods that rely on manual labeling techniques. In some implementations, the metadata is obtained via a combination of crawler 1016 and parser 1018, as well as via manually labeled data entities.

In some implementations, the system can generate a data profile for each data silo of a set of data silos. When generating a domain-specific unified metadata graph, the data silos themselves may store various data of different schemas, types, and formats, and may also have different contexts. Profiling such data silos is advantageous as these data profiles may indicate valuable contextual information that can impact a given structure of an LLM prompt, thereby impacting the ultimate results received by the LLM. For instance, as each LLM prompt may be specifically keyed to achieve an intended result (e.g., to obtain a normalized metadata identifier with a particular context or domain), when providing an LLM a prompt, the structure of the prompt can include various data elements that achieve more efficient and accurate results. As an example, an LLM prompt that is augmented with a metadata identifier as well as the data type corresponding to that metadata identifier may cause more accurate results to be generated as opposed to an LLM prompt solely with the metadata identifier (e.g., as additional contextual information may be lacking). As such, the system may generate a data profile for each data silo of the set of data silos to augment, or select, a structured LLM prompt for processing.

For example, parser 1018 can extract a first value from each data silo of a set of data silos. As each data silo may store a unique set of data, the system need only extract at least one value from each of the set of data silos. However, in other implementations, the system can extract one or more values from each data silo of the set of data silos. Profiler 1020 may then determine a data type corresponding to each first value extracted from each of the set of data silos. For example, profiler 1020 may be a logical component that may determine the data type corresponding to the first value. The data type may relate to a data schema of the first value, a format of the first value, whether the first value is an integer, character, floating point, double flowing point, or other data type. Using the data type for the first value(s), the profiler 1020 can generate a data profile for each data silo of the set of data silos indicating the data type of the values stored in the data silo. For example, the system may generate a data profile (e.g., a file, text file, tag, etc.) that is associated with each data silo (e.g., container) within the entity's computing system, that indicates the data types of the values stored in each of the data silos. Such data profile may be stored in a database for later retrieval and may be associated with its respective data silo. In this way, the system may index the data types associated with each data silo to accurately select structured LLM prompts with contextual information (e.g., the data profiles).

In some implementations, to select a first LLM prompt from a set of LLM prompts, the system can filter the set of LLM prompts. For example, For instance, as discussed above, the data profiles (e.g., the data types) of each data silo may add contextual information that is advantageous to use when selecting structured LLM prompts to generate a domain-specific unified metadata graph. For example, by augmenting specifically engineered LLM prompts with contextual information (e.g., the data profiles of data silos) which the metadata identifiers originate from, the system may achieve more accurate results as opposed to existing systems that fail to add such contextual information and rather rely on the learned knowledge of the LLM's themselves.

As such, the system can determine a data silo which stores data corresponding to the first metadata identifier. For example, the system may compare the first metadata identifier to each metadata identifier stored in each of the data silos for a match. In other implementations, however, the system may refer to a database storing a mapping between metadata identifiers and data silos which store data associated with the metadata identifier. The system can then retrieve a data profile that corresponds to the data silo which stores the data corresponding to the first metadata identifier. For example, as discussed above, the system can retrieve the generated data profile for the data silo.

The system can then filter the set of structured LLM prompts to generate a set of filtered LLM prompts using the retrieved data profile. For instance, each LLM prompt of the set of LLM prompts may be tagged with one or more tags indicating (i) a metadata identifier, (ii) a data profile (e.g., data type), (iii) an architecture of the LLM prompt, and/or (iv) other tag (e.g., data schema, data format, or other characteristic). The system can filter out the set of structured LLM prompts to a subset of LLM prompts (e.g., the filtered set of LLM prompts) to reduce the amount of computational resources utilized when comparing LLM prompts. Not only does the filtering reduce the utilization of computational resources (e.g., computer memory and processing power), but also can provide a reduced set of LLM prompts to select from that are based on the data profile of a data silo which is associated with the metadata identifier-thereby increasing LLM prompt selection accuracy. The system can then select, from the set of filtered LLM prompts, the first structure LLM prompt that corresponds to the first metadata identifier of the set of metadata identifiers. For example, the system selects the first structured LLM prompt based on a match between a tag of the LLM prompt that indicates a data format of the LLM prompt and the data format of the metadata identifier.

Referring back to FIG. 8, at act 804, process 800 augments the first LLM prompt with a first metadata identifier. For example, the system augments the first LLM prompt (e.g., structured LLM prompt) with the first metadata identifier to be provided to an LLM. The LLM may be configured to generate a first intermediate output indicating a second set of metadata identifiers corresponding to the first metadata identifier. For example, the LLM can be communicatively coupled to (i) a raw data component and (ii) a domain ontology component where the LLM is configured to generate a first intermediate output indicating the second set of metadata identifiers that correspond to the first metadata identifier without accessing the domain ontology component.

For instance, referring to FIG. 10A, LLM 1006 is communicatively coupled to both the raw data component 1010 and the domain ontology component 1008. While the LLM is communicatively coupled to each of the raw data component 1010 and the domain ontology component 1008, the LLM may communicate with the raw data component 1010 to generate a first intermediate output. For example, the first intermediate output may be an intermediate output such that it is not the final output of the LLM. For instance, consistent with a RAG framework, the system may augment the first LLM prompt with the first metadata identifier to be provided to LLM 1006 to generate a second set of metadata identifiers corresponding to the first metadata identifier.

Referring back to FIG. 9, for example, prompt 1 902 may reflect the first LLM prompt. The system may augment (e.g., add, update, place, etc.) prompt 1 902 with the first metadata identifier (e.g., first metadata identifier 904). The augmented version of prompt 1 902 can then be provided by the system as input to the LLM 906 to generate first intermediate output 908. For instance, LLM 906 may be the same or similar as LLM 1006 (FIG. 10A), in accordance with some implementations of the present technology. LLM 906 processes prompt 1 902 to generate first intermediate output 908. First intermediate output 908 can be a set of metadata identifiers that correspond to the first metadata identifier 904. For instance, to determine what a metadata identifier (e.g., first metadata identifier 904) means, could be, or is similar to, the system may provide the first metadata identifier to the LLM to receive a generated set of metadata identifiers, explanations, descriptions, or other information that corresponds, or is otherwise associated with, the first metadata identifier. In some implementations, the first intermediate output may be the same or similar to the semantically similar phrases as described in act 404 of process 400 (FIG. 4). By doing so, the system may generate a set of semantically similar phrases that corresponds to the first metadata identifier, thereby expanding the scope of contextual information to be considered by the LLM to later generate more accurate, normalized domain-specific metadata identifiers that are keyed to a specific entity.

Referring back to FIG. 8, at act 806, process 800 augments the first LLM prompt with a set of metadata identifiers corresponding to the first metadata identifier. For example, the system augments the first LLM prompt with the second set of metadata identifiers corresponding to the first metadata identifier to be provided to the LLM. The LLM can be configured to generate a second intermediate output indicating a filtered domain-specific metadata identifier by accessing a set of domain-specific ontologies. For example, referring to FIG. 9A, the system augments prompt 2 910 with the first intermediate output 908 corresponding to the first metadata identifier 904 to be provided as input to LLM 906. In some implementations, prompt 2 910 may be the same or similar to prompt 1 902, however, in other embodiments, prompt 2 910 may be different than that of prompt 1 902. For example, prompt 3 914 may represent a single prompt, that combines the information of prompt 1 902 and prompt 2 910 into a single, updatable prompt. That is, as opposed to having two separate prompts to achieve a given goal, the system may augment a prompt multiple times with respect to receiving respective outputs from LLM 906.

For instance, referring back to prompt 2 910, prompt 2 910 can include second prompt text 907 and the first intermediate output 908. Second prompt text 907 may be structured text that is associated with level 903 or the first intermediate output 908. For example, second prompt text 907 may be unique to level 903. For instance, second prompt text 907, which is shown to indicate "Return Domain-Specific identifier(s) for:," may be the text that corresponds to level 903, where level 903 indicates a file-level metadata identifier type, and where first metadata identifier 904 indicates a file-level metadata identifier. In some implementations, second prompt text 907 may be different based on the metadata identifier of first metadata identifier 904. For example, where first metadata identifier 904 is a container-level metadata identifier, second prompt text 907 may alternatively recite "Return Domain-Specific for container-level identifiers of:," where level 903 dictates second prompt text 907. That is, upon determining a type of metadata identifier of first metadata identifier 904, prompt 2 910 may be selected where prompt 2 910 is associated with level 903 indicating the type of metadata identifier that first metadata identifier 904 is, which in turn, includes the correct second prompt text 907. In this way, the LLM prompts may be structured based on a data schema, data format, data type, or other characteristic of the first metadata identifier to obtain more accurate results from the LLM as opposed to generic LLM prompts of existing systems that do not rely on specifically generated LLM prompts.

Additionally or alternatively, second prompt text 907 may be associated with the first intermediate output 908. For example, second prompt text 907 may be augmented into prompt 2 910 when the system receives the first intermediate output 908. For instance, the system may change, update, augment, or otherwise alter prompt 1 902 to reflect prompt 2 910 (e.g., which includes second prompt text 907 and the first intermediate output 908). To provide an illustrative example, prompt 3 914 is shown. Prompt 3 914 can be a combined prompt (e.g., of prompt 1 902 and prompt 2 910). In some implementations, prompt 3 914 may be a resultant prompt. For instance, when the system originally selects prompt 1 902 to be provided to the LLM to generate the first intermediate output 908, the system may only provide the information of prompt 1 902 to the LLM to generate the first intermediate output 908. When the system receives the first intermediate output from the LLM, the system may augment the original prompt (e.g., prompt 1 902) to generate prompt 3 914, which includes the second prompt text 907 and the first intermediate output 908. In some implementations, the system may provide prompt 3 914 in its entirety to LLM 906 to generate second intermediate output 912 indicating a filtered domain-specific metadata identifier by accessing the set of domain-specific ontologies. In yet other implementations, the system may provide only the new information of prompt 3 914 to LLM 906 to generate second intermediate output 912. For example, the system may only provide the second prompt text 907 and the first intermediate output 908 to LLM 906 to generate the second intermediate output 912-thereby reducing the amount of computational resources required by the LLM to process the input data (e.g., prompt information).

The second intermediate output 912 may be a filtered domain-specific metadata identifier. For example, to reduce data retrieval times when accessing data stored in a variety of disparate data silos via non-technically savvy users, there is a need to preserve contextual, domain-specific information of an entity's system that enables users to quickly search for the data they need without the burden of knowing the correct nomenclature of the data. For example, a non-technically savvy user may attempt to locate the names of accounts. However, due to computer engineers, data scientists, and other more technically savvy users being those who set up, create, or otherwise maintain data silos, the values, identifiers, phrases, or other data markers may be different than that of what the non-technically savvy user is privy to. While the non-technically savvy user may have a business mindset and understand the domain-specific language that the entity formally operates under, the computer engineers and data scientists often do not, and thereby label data without respect to the business's (e.g., the entity's) domain-specific context. To overcome this, the system may provide the prompt 2 910 (or alternatively, prompt 3 914) to the LLM that is communicatively coupled to domain ontology component 1008 to generate the second intermediate output 912 (e.g., the filtered, domain-specific metadata identifier).

For instance, referring to FIG. 10, LLM 1006 can be provided, as input, with the augmented LLM prompt indicating the second set of metadata identifiers (e.g., the first intermediate output) to generate the second intermediate output indicating the filtered domain-specific metadata identifier by accessing domain ontology component 1008. LLM 1006 may extract one or more domain ontologies that include a set of domain ontologies that are specific to an entity of a system. For example, as described above, where the entity is a company, the domain ontologies may reflect domain-specific knowledge (e.g., nomenclature, taxonomy, lexigraphy) of terms used in the domain of the entity. For instance, where the entity is a bank, domain ontology component 1008 may include ontologies that relate financial terms to other financial terms to deduce the context in which a given financial term is used. LLM 1006 may validate the first intermediate output (e.g., the second set of metadata identifiers corresponding to the first metadata identifier) using the one or more domain-specific ontologies included in domain ontology component 1008. For example, LLM 1006 may compare each metadata identifier of the second set of metadata identifiers to keywords, phrases, strings, or other domain-specific values of the domain-specific ontologies to determine (i) the meaning of each metadata identifier of the second set of metadata identifiers or (ii) a filtered domain-specific metadata identifier.

As LLM 1006 can be an unsupervised artificial intelligence model, LLM 1006 may be trained to determine the meanings of each metadata identifier of the second set of metadata identifiers by accessing the domain-specific ontologies. The domain-specific ontologies may be pre-defined ontologies generated by one or more subject matter experts of the given entity. LLM 1006 can determine a filtered domain-specific metadata identifier by accessing the domain-specific ontologies. For example, during the comparing process (e.g., the LLM comparing or otherwise processing the first intermediate output), LLM 1006 may determine that the first intermediate output (e.g., the second set of metadata identifiers that correspond to the first metadata identifier) corresponds (e.g., is associated with, matches, etc.) to a common, filtered, domain-specific metadata identifier that is present within the domain-specific ontologies. For example, the domain-specific metadata identifier is considered "filtered" as the domain-specific metadata identifier is filtered to a single, representative, domain-specific metadata identifier that corresponds to the potential matches to the first intermediate output as generated via LLM 1006. In this way, the system may reduce the amount of computational resources involved when generating the metadata graph as a filtered, domain-specific metadata identifiers are used to generate the metadata graph.

Figure 10C:
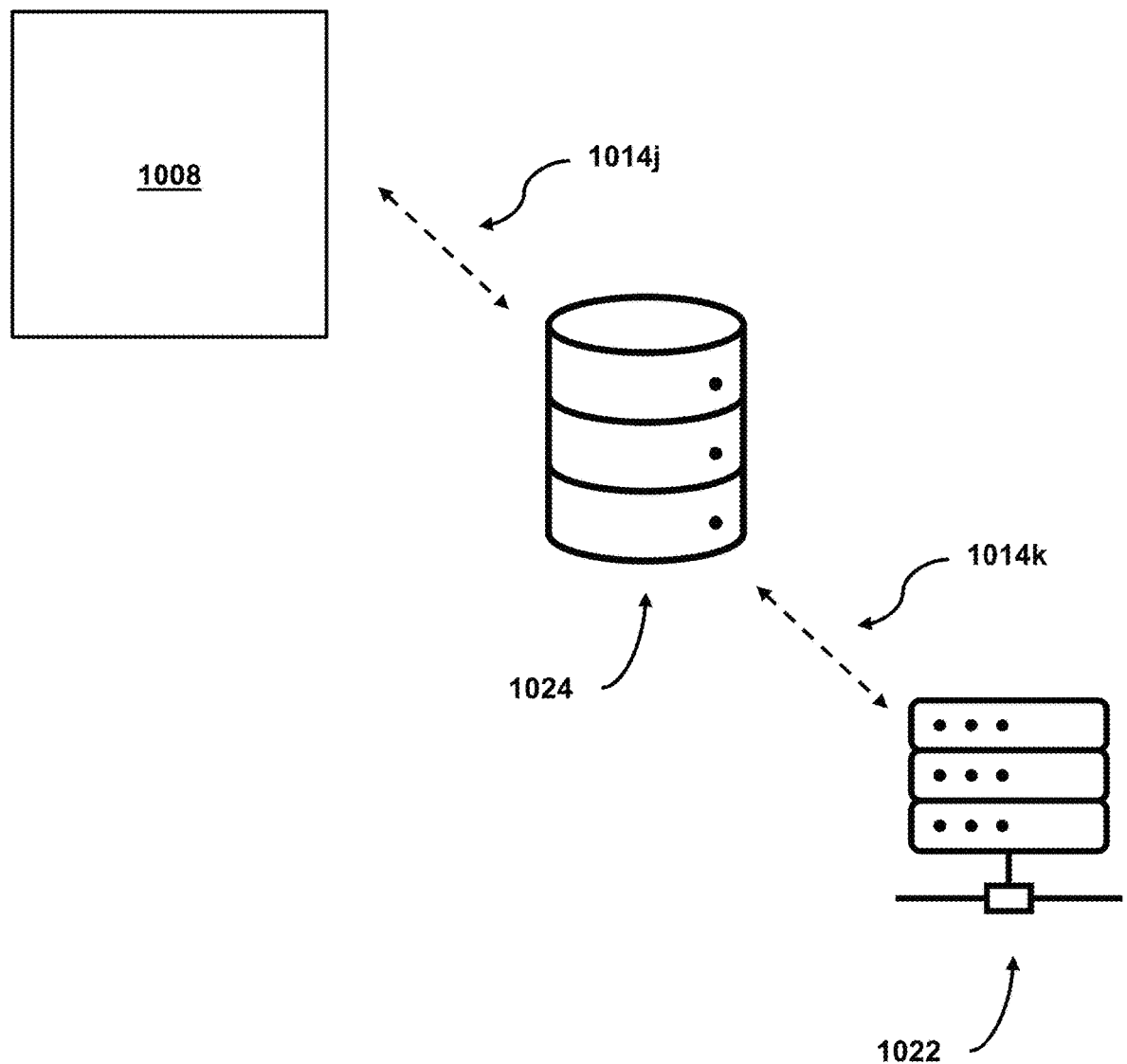

Referring to FIG. 10C, which shows a subsystem diagram of domain ontology component 1008, domain ontology component 1008 may be communicatively coupled to a domain thesaurus 1024 and concepts 1022. For example, while domain ontology component 1008 may host a set of domain-specific ontologies that are generated, based at least in part, on subject matter experts, domain thesaurus 1024 and concepts 1022 may contribute to domain ontology component 1008's generation of the domain-specific ontologies. Concepts 1022 may include a set of entity-specific terms, phrases, or other concepts commonly used throughout the entity's system (e.g., FIG. 3). Thesaurus 1024 may include a data structure that maps the set of entity-specific terms, phrases, or concepts to other terms, phrases, or other concepts that are used throughout the entity's system. For example, thesaurus 1024 may represent a digital thesaurus of terms, phrases, or concepts. Ontology component 1008, in some implementations, may aggregate the information stored in thesaurus 1024 and concepts 1022 to generate one or more domain-specific ontologies automatically (e.g., via one or more ontology creation models). Additionally or alternatively, ontology component 1008 may leverage a SME to create the set of domain-specific ontologies. In this way, the system may preserve the accuracy of domain-specific contexts in which metadata identifiers rely upon when generating the metadata graph, thereby preserving the domain-specific language of the entity's system.

At act 808, process 800 generates a metadata graph. For example, the system can generate a domain-specific unified metadata graph, via the LLM, using (i) the first metadata identifier and (ii) the second intermediate output indicating the filtered domain-specific metadata identifier. The LLM may be configured to generate a graph (e.g., a non-directed graph, a directed graph, a directed acyclic graph, etc.) using the first metadata identifier and the filtered domain-specific metadata identifier. In some implementations, the LLM may be provided with a prompt indicating to generate a graph (e.g., a metadata graph), where the prompt includes the first metadata identifier, the filtered domain-specific metadata identifier, and prompt text indicating to generate the metadata graph. In some implementations, acts 802-808 may be iteratively repeated until all metadata of the data silos 1015 (FIG. 10B) has been processed by the system.

Referring to FIG. 9B, prompt 4 916 may include third prompt text 918 indicating to generate a graph 920, the first metadata identifier 904, and the second intermediate output 912. Third prompt text 918 may be structured text that is associated with level 903 or the second intermediate output 912. For example, third prompt text 918 may be unique to level 903, first metadata identifier 904, and second intermediate output 912 where the LLM 906 is to generate a domain-specific unified metadata graph based on level 903, first metadata identifier 904, or the second intermediate output 912. The LLM may use at least a portion of the information included in prompt 4 916 to generate metadata graph 920. For example, the LLM may be trained to generate graph data structures that include the first metadata identifier, the filtered domain-specific metadata identifier, and or other information (e.g., file-level metadata identifiers, container-level metadata identifiers, system-level metadata identifiers, location identifiers, data lineages, etc.) as described in act 406 of process 400 (FIG. 4) and FIGS. 5-6.

In some implementations, the LLM can be provided with prompt 5 922, which may represent a single prompt, that combines the information of prompt 1 902, prompt 2 910, and prompt 4 916 into a single updatable prompt. That is, as opposed to having three separate prompts to achieve a given goal, the system may augment a prompt multiple times with respect to receiving respective outputs from LLM 906. Upon the LLM 906 being provided as input with a prompt (e.g. prompt 4 916 or prompt 5 922), the LLM 906 may generate metadata graph 920.

Figure 11:
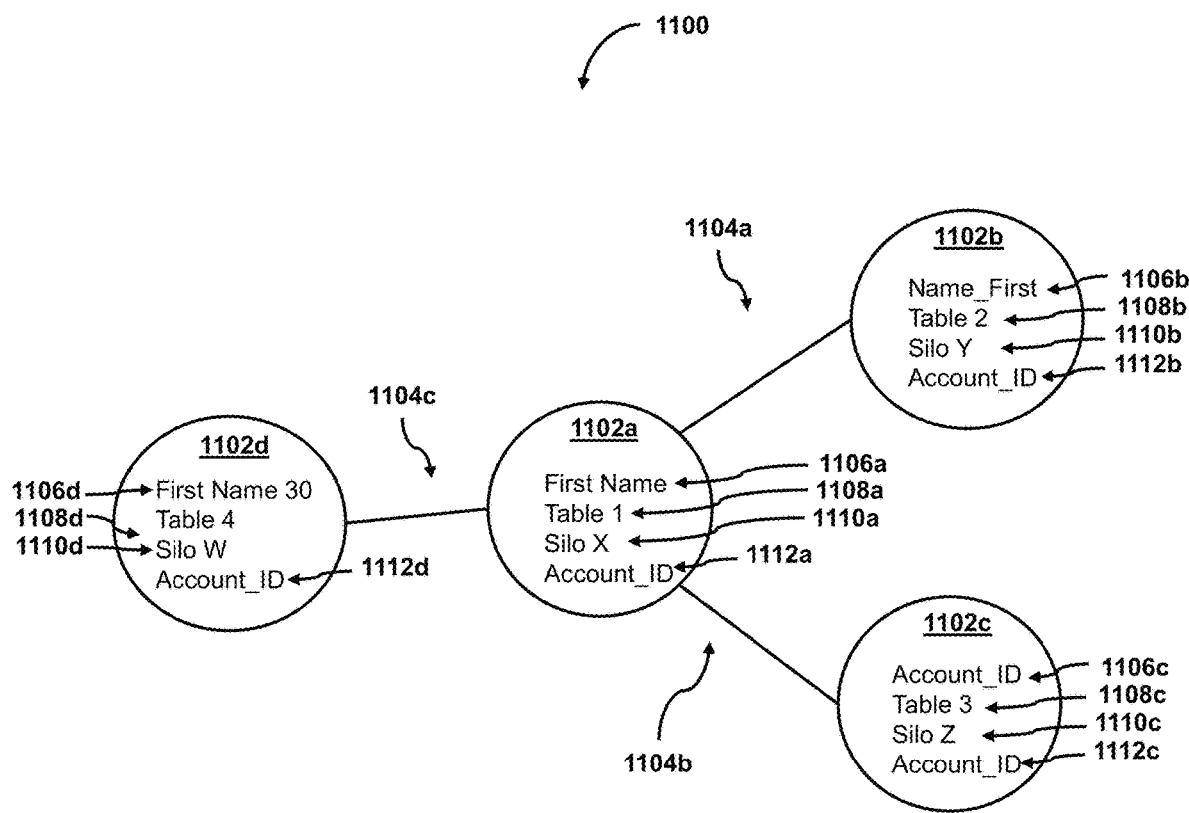
FIG. 11 is an illustrative representation of a generated metadata graph, in accordance with some implementations of the present technology.

Referring to FIG. 11, which shows an illustrative representation of a generated metadata graph, LLM 906 may generate metadata graph 1100. Metadata graph 1100 may be the same or similar to metadata graph 920 (FIG. 9B), metadata graph 1004 (FIG. 10A), metadata graph 500 (FIG. 5), or metadata graph 600 (FIG. 6). Metadata graph 1100 may represent the domain-specific unified metadata graph, in accordance with some implementations of the present technology. Metadata graph 1100 may include nodes 1102a-1102d, such as fifth node 1102a, sixth node 1102b, seventh node 1102c, and eighth node 1102d. Each node 1102a-1102d may indicate metadata of one or more data objects stored within a given data silo. For example, fifth node 1102a may include file-level metadata identifier 1106a, a container-level metadata identifier 1108a, a location identifier 1110a, and a domain-specific metadata identifier 1112a. Additionally or alternatively, fifth node 1102a may include a system-level metadata identifier or other information, although not shown. The domain-specific metadata identifier 1112a may be the same or similar as the second intermediate output 912 indicating the filtered domain-specific metadata identifier.

Each of the nodes 1102a-1102d may be linked to one or more other nodes. For example, fifth node 1102a may be linked to sixth node 1102b via second edge 1104a. In some implementations, second edge 1104a may indicate lineage information of the nodes, such as where sixth node 1102b is a data source of fifth node 1102a. However, in other implementations, second edge 1104a may indicate lineage information, such as where fifth node 1102a is a data source of sixth node 1102b, in accordance with some implementations of the present technology. It would be appreciated by one of ordinary skill in the art that each node 1102 may be linked to other nodes via an edge 1104, where each edge indicates lineage information between one or more nodes of the set of nodes.

In some implementations, one or more of the identifiers included within nodes 1102a-1102d are traversable. To efficiently traverse the metadata graph 1100, the system can traverse the metadata graph based on a single, traversable identifier while ignoring other identifiers that are included in the nodes. For instance, the traversable identifier can be the filtered domain-specific metadata identifier 1112a. As referred to herein, traversable identifiers are the identifiers that the system looks for when a user provides a query attempting to locate data, while non-traversable identifiers are identifiers that the system stores in association with the nodes 1102a and does not look for when traversing the metadata graph 1100. In this way, the system reduces the amount of computational resources traditionally utilized when string searching large tables as the metadata graph (i) is a graph that provides direction (e.g., directed graphs) and (ii) uses the entity-specific, domain-specific, contextually accurate metadata identifiers to locate the same instances of data objects stored throughout the entities system. For example, when the system traverses the metadata graph, the system may compare a set of phrases (e.g., as described in act 406 of process 400 (FIG. 4)) to the traversable metadata identifiers of the metadata graph 1110. While the system may traverse the metadata graph 1110 based on the filtered domain-specific metadata identifier, the metadata graph 1110 may still store other metadata identifiers (e.g., which can be any of the file-level metadata identifier 1106a, container-level metadata identifier 1108a, or system-level metadata identifiers) in association with the nodes 1102a-1102d to preserve information for future use. For example, when the metadata graph locates a given data object using the filtered domain-specific metadata identifier 1112a, the system can then retrieve file-level, container-level, or system-level location information, or other information about the given data object.

Referring back to FIG. 8, in some implementations, the system can perform a validation process on the generated metadata graph 1100 (FIG. 11). For example, in some implementations, the system computes query-to-result performance metrics and accuracy performance metrics. For example, the validation process can include providing automatically generated or user-provided test queries to the domain-specific unified metadata graph to measure the performance of the domain-specific unified metadata graph.

Figure 10D:
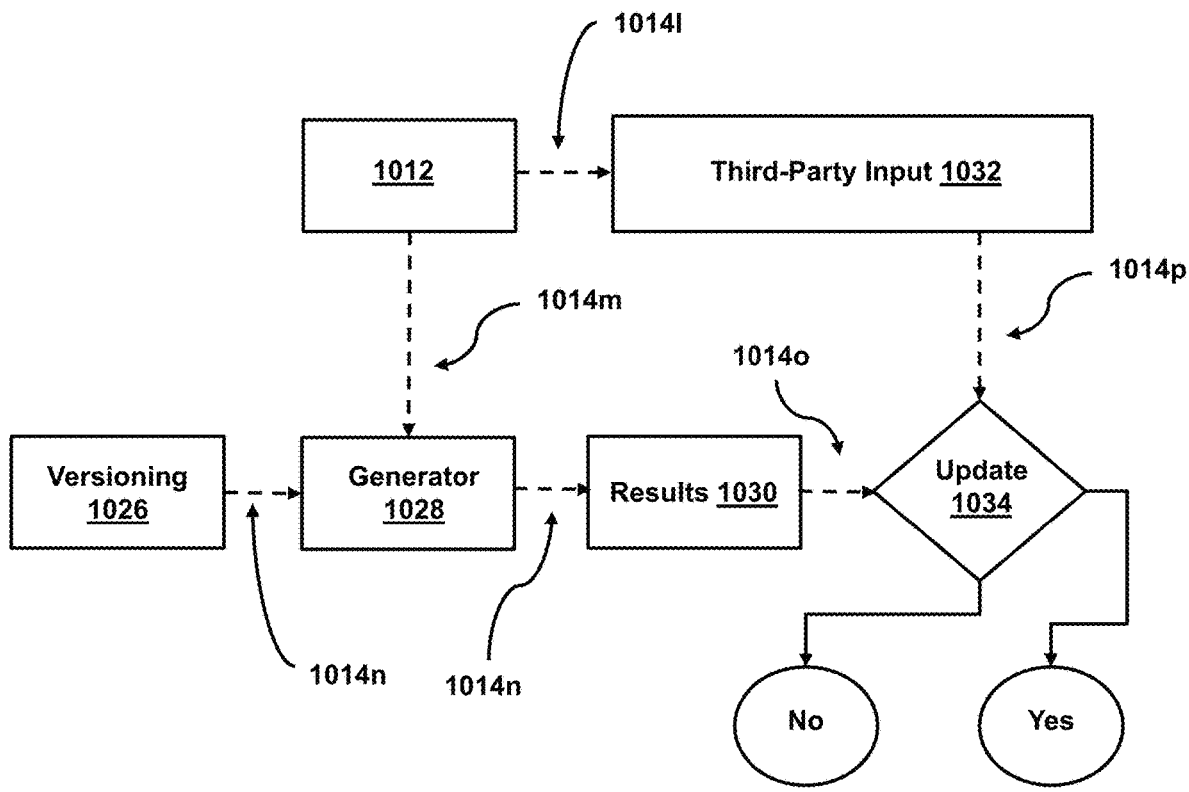

For example, referring to FIG. 10D which shows a subsystem diagram of feedback component 1012, where the feedback component 1012 can include versioning component 1026, generator 1028, results 1030, and update component 1034. Versioning component 1026 may store previous versions of metadata graph 1100 (FIG. 11). For example, versioning component may store the most recent version of metadata graph 1100 prior to generating an updated version of the metadata graph 1100 (FIG. 11). Generator 1028 may generate test queries to provide the metadata graph 1100. For example, the test queries may be the same or similar as the user-specified queries as discussed in act 402 of process 400 (FIG. 4). Additionally or alternatively, the test queries may be historical user-specified queries as discussed in act 402 of process 400 (FIG. 4). The test queries may be leveraged to generate one or more results. For example, results 1030 may determine (e.g., generate) one or more performance metrics based on the test queries as generated by generator 1028. For example, results 1030 may store historical performance metrics of other versions of metadata graph 1100 and performance metrics of a current version of metadata graph 1100 (FIG. 11). The performance metrics may be query-to-result performance metrics, accuracy metrics, or other performance metrics.

When performance metrics of the metadata graph 1100 are generated, a decision may be made to update the metadata graph 1100 (FIG. 11). Update component 1034 may automatically trigger an update process to the metadata graph 1100 (FIG. 11). In some implementations, however, update component 1034 may trigger an update process to the metadata graph 1100 in conjunction with a third-party input 1032. For example, third-party input 1032 may be a third-party source of information (e.g., a website, a computing device, etc.). As another example, third-party input 1032 may be a subject matter expert's input. In this way, by leveraging a subject matter expert's input, a human may verify accuracy of the LLM-generated metadata graph prior to publishing such metadata graph for use among the system. Adding a subject matter expert's opinion to the generation process of the metadata graph 1100 may enhance the accuracy with which the metadata graphs are generated to circumvent any unintended LLM-related error.

To perform the validation process, the system can provide a first query (e.g. a test query) requesting the location of a first data item to each of the (i) domain-specific unified metadata graph and (ii) the other version of the domain-specific unified metadata graph. As an example, the system may test the latest iteration of the domain-specific unified metadata graph for finding the location of a given data item (e.g., stored in a data silo). However, to ensure that the most recent modification to the domain-specific unified metadata graph results in a better metadata graph, the system compares performance metrics of the domain-specific metadata graph to the prior version (or other version) of the metadata graph. For example, the system may compute a query-to-result performance metric that indicates a time period between the query being provided to the respective metadata graph and the time at which a result is received from the respective metadata graph. The time period may be in epoch time, unix time, measured in seconds, milliseconds, decisions, microseconds, etc. Such query-to-result performance metrics may be generated for each of the domain-specific unified metadata graph and the other version of the domain-specific unified metadata graph (e.g., the prior version of the unified metadata graph).

In some implementations, the system can compute an accuracy metric (e.g., performance metric) of the domain-specific unified metadata graph and the other version of the domain-specific unified metadata graph. For example, the accuracy metric may be a measure of accuracy (e.g., percentage, decimal, ratio, integer, binary value, numeric value, alphanumeric value, etc.) of the result that is generated from the domain-specific unified metadata graph and the other version of the domain-specific metadata graph. The accuracy metric may be generated based on a human evaluation of the result (e.g., the result returned from providing the query to the respective metadata graph). For instance, a subject matter expert (e.g., data scientist, software developer, computer engineer) may verify the accuracy of the result for each of the domain-specific metadata graph and the other version of the domain-specific metadata graph. As each of the metadata graphs integrate the "domain," "context," and "nomenclature" of a given entity's system, a subject matter expert may verify the accuracy of the generated results returned by the respective metadata graphs in finding the location of a given data item. In this way, an expert may verify the accuracy of a result, thereby providing more accurate generation of domain-specific unified metadata graphs. However, in other implementations, the accuracy metric may be auto-generated without human intervention. For example, the accuracy metric may be based on a comparison of the generated results from the respective metadata graphs and historical results, in accordance with one or more implementations of the present technology.

The system can compute the accuracy metric by sampling and auditing one or more portions of the results, or all of the results. For example, the system can select a sample set of the results to determine the accuracy metric, and can alter the size of the sample set until a desired accuracy metric threshold is satisfied.

In some implementations, the system may determine whether to perform an update process on the metadata graph. For example, the system may determine whether the performance metrics of the metadata graph (e.g., metadata graph 1100) satisfy performance criteria with respect to the second performance metrics of the other version (e.g., the prior version) of the metadata graph. In some implementations, determining whether the performance metrics of the metadata graph satisfy the performance criteria may be based on whether the (i) query-to-result performance metric of the metadata graph fails to exceed the query-to-result performance metric of the other version of the metadata graph or (ii) the accuracy metric of the result of the metadata graph meets or exceeds the accuracy metric of the result of the other version of the metadata graph. In this way, if the performance criteria fails to be satisfied, the system may perform an update process on the metadata graph. Simply put, if the metadata graph (i) returns a result faster than prior versions of the metadata graph and (ii) returns a more accurate result than prior versions of the metadata graph, then the metadata graph is not to be updated. However, if the metadata graph (i) returns a result slower than prior versions of the metadata graph or (ii) returns less accurate results than prior versions of the metadata graph, then the metadata graph is to be updated.

Referring back to FIG. 8, at act 810, process 800 performs an update process on the metadata graph. For example, in response to determining that first performance metrics of the domain-specific unified metadata graph fail to satisfy a performance criteria with respect to second performance metrics of another version of the domain-specific unified metadata graph, the system may perform an update process on the domain-specific unified metadata graph (e.g., metadata graph 1100 (FIG. 11)). As discussed above, if the metadata graph (i) returns a result slower than prior versions of the metadata graph or (ii) returns less accurate results than prior versions of the metadata graph, then the metadata graph is to be updated.

In some implementations, the update process can be performed by updating nodes and edges of the metadata graph to those of a previous version of the metadata graph. For example, the system may determine a set of discrepancies between the domain-specific unified metadata graph and the other version of the domain-specific unified metadata graph. The set of discrepancies can reflect a discrepancy between (i) nodes of the domain-specific unified metadata graph and the other version of the domain-specific unified metadata graph and (ii) edges connected to at least one node of the domain-specific unified metadata graph and the other version of the domain-specific unified metadata graph. For instance, the system may traverse each graph to determine newly added nodes, edges, metadata identifiers, or other information. For example, the system may first traverse the current version of the domain-specific unified metadata graph and store, in a database, a tabular representation of the current version of the domain-specific unified metadata graph. The system may then retrieve a tabular version of the other version (e.g., the previous version) of the domain-specific unified metadata graph if available. In some implementations, the system may traverse the other version of the domain-specific unified metadata graph and store, in a database, a tabular representation of the other version of the domain-specific unified metadata graph. The system may then compare the two tabular versions of the metadata graphs to each other to identify discrepancies between the two versions. For example, the system may identify one newly added node (e.g., and the metadata identifiers or location identifiers that the node includes) as well as two newly added edges connecting that node to other nodes in the current version of the metadata graph (when compared to the prior version of the metadata graph). The system may then update the domain-specific unified metadata graph with updated nodes and edges of the other version of the domain-specific unified metadata graph that correspond to the set of discrepancies. In this way, the system may revert back to prior versions of the unified metadata graph when performance metrics fail to be satisfied.

In some implementations, the system can cause an update process based on detecting the addition of a data silo. For example, in some implementations, the system can perform an update process on the domain-specific unified metadata graph when a data silo is added to a computing environment associated with an entity. The system may monitor the computing environment associated with the entity (e.g., FIG. 3) using one or more network discovery tools, such as SNMP, LLDP, CDP or others to identify when a new device is added to a computing environment of the entity. The system may then communicate with the new device to determine a type of the new device using a determined IP address via the network discovery tool to verify the addition of the new device (e.g., using the "ping" command). The system can further compare the determined IP address of the new device and compare it to a data base storing device information of the computing environment. For example, a table may store IP addresses of devices and the device types with respect to the entity's computing system. The system can use the table to determine whether the newly added device is a data silo (e.g., a data source, database, etc.). In response to detecting the addition of the data silo, the system can cause an update process to be performed on the domain-specific unified metadata graph. For example, the system may extract metadata from the newly added data silo to update or regenerate the domain-specific unified metadata graph 1100 (FIG. 11). For instance, the system may cause one or more of the processes described above to iteratively repeat until all metadata of the data silos (and the newly added data silos) has been processed by the system, thereby generating a system-wide, domain-specific, unified metadata graph.

Artificial Intelligence Sandbox

The domain-specific unified metadata graph described above enables a computer system to efficiently retrieve siloed data across disparate locations. An artificial intelligence (AI) sandbox enables the use of data from these disparate locations to generate AI models for data analysis or apply existing AI models automatically. The sandbox provides a low-code or no-code environment, allowing users to construct and apply models to extract insights or predictions from the data even when the users lack the expertise or time to build AI models and data pipelines for the data to be processed through the models, or even when the users are unaware that a model would help solve a problem. As described herein, the AI sandbox includes automated tools for deploying and managing models, ensuring they operate efficiently without requiring human intervention. The AI sandbox can be used to automate any or all steps in a lifecycle of models, such as training new models, fine-tuning or improving existing models, deploying models, or generating pipelines of data that is suitable for analysis by the models when deployed. By integrating these functionalities, the sandbox offers a practical solution that transforms user interactions with data and AI models, enhancing accessibility and usability while maintaining operational efficiency.

Figure 12:
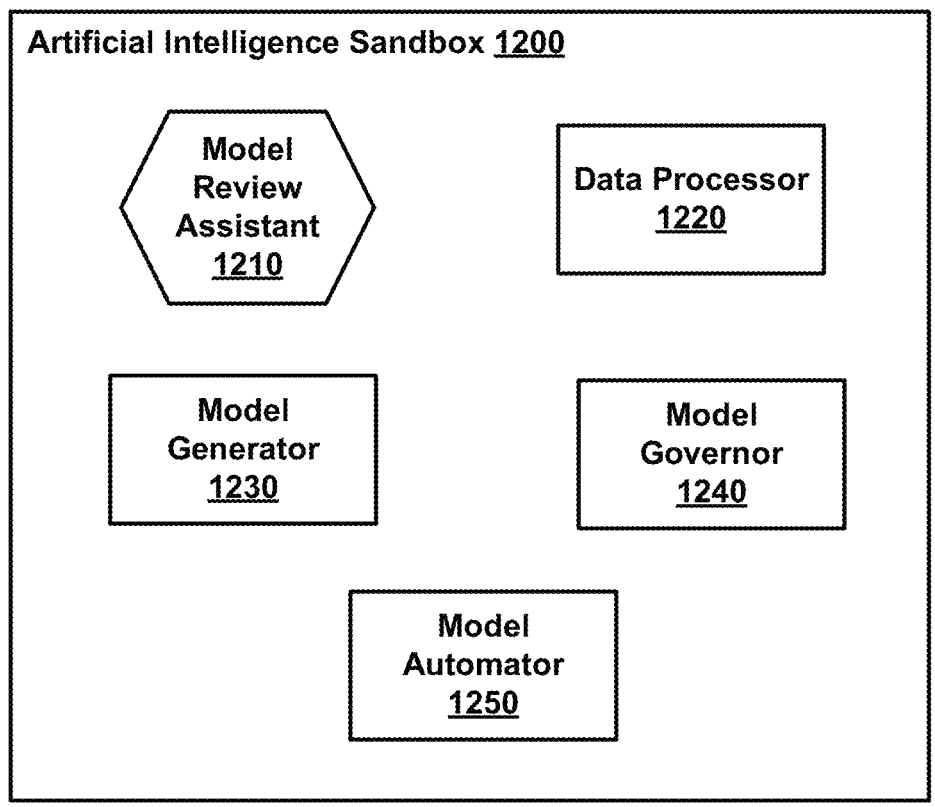
FIG. 12 is a block diagram illustrating components with an AI sandbox 1200, according to some implementations.

FIG. 12 is a block diagram illustrating components with an AI sandbox 1200, according to some implementations. As shown in FIG. 12, the AI sandbox 1200 can include a model review assistant 1210, a data processor 1220, a model generator 1230, a model governor 1240, and a model automator 1250. Other implementations of the AI sandbox 1200 can include additional, fewer, or different components, or can divide functionality differently between the components.

The model review assistant 1210 interacts with users and orchestrates other components of the AI sandbox 1200 to generate and apply AI models. The model review assistant 1210 can leverage a large language model (LLM) to both interact with the user and to perform tasks related to generating, applying, or improving AI models as users interact with the assistant 1210. In some implementations, the model review assistant 1210 generates a chat-like interface by which user inputs are received and information is output to the user.

The data processor 1220 identifies relevant data objects that are applicable to a model that a user requests to train or apply. The data processor 1220 processes the data to ensure cleanliness and integrity, making it suitable for analysis by an AI model. Data can be prepared for various stages of AI development, including generating training and testing data sets to train, fine-tune, or evaluate the model. Furthermore, the data processor 1220 can offer archiving capabilities that store cleaned data and generated training samples securely. Using this archived data, the data processor 1220 can generate documentation that facilitates audits of the models and their applications, ensuring transparency and compliance with regulatory standards. The data processor 1220 is described further with respect to FIG. 13.

The model generator 1230 builds an AI model based on user inputs and the data output by the data processor 1220. The model generator 12030 is configured to train machine learning models using cleaned and processed data sets from the data processor 1220. The model generator 1230 can analyze the data sets output by the processor 1220, for example by creating a set of features from the data set and identifying a target variable for the model. The model generator 1230 can also recommend a type of machine learning model to build, either from a list of available models or based on performance metrics of the models. Using processed data sets and a selected model type, the model generator 1230 constructs the model, which can involve training a new model, fine-tuning an existing one, or preparing a model for deployment. The model generator 1230 is described further with respect to FIG. 14.

The model governor 1240 performs higher-level analysis and governance evaluation tasks to ensure that a model complies with a set of governance criteria. These governance criteria can relate to policies or procedures within an organization within which the model review assistant 1210 operates or policies from external organizations to which the organization must adhere (such as policies or regulations implemented by governments or standard-setting bodies, or social pledges the organization has signed). If a model does not comply with the governance criteria, the model governor 1240 can cause the model to be modified until it does comply. The model governor 1240 can further generate documentation for the model that can be archived and stored for subsequent analysis and auditing. The model governor 1240 is described further with respect to FIG. 15.

The model automator 1250 manages deployment of AI models. Models can have different requirements for their deployment. For example, some models are large and require a significant amount of computing resources. Some models are used for applications where results are needed quickly. An entity that uses AI models may have access to various different locations for deploying models, such as one or more cloud providers or on-premise machines or elastic resources. The model automator 1250 can orchestrate the deployment of models across these various different locations. The model automator 1250 can provide a central system that has access to any applicable APIs for deploying and calling models, access to the data used to train these models, and access to the application data that is processed by the models, such that the model automator 1250 can determine how to efficiently deploy models in a way that enables the models to perform and manages computing resources well. The model automator is described further with respect to FIG. 18.

Figure 13:
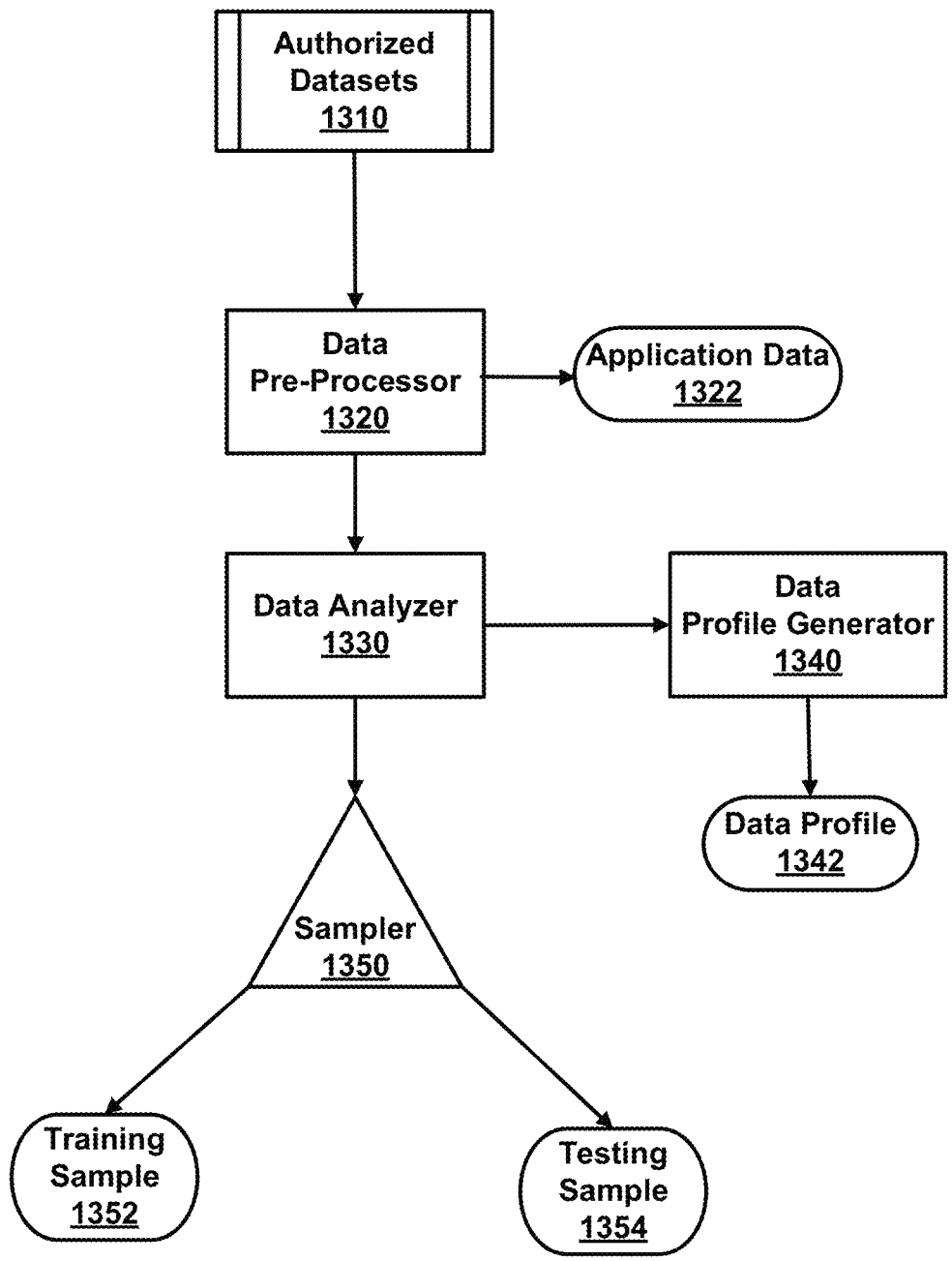
FIG. 13 is a block diagram illustrating components within a data processor, according to some implementations.

FIG. 13 is a block diagram illustrating components within the data processor 1220, according to some implementations. The data processor 1220 can generally prepare data for a variety of purposes associated with AI models, including generating training data for training or fine-tuning a model, generating testing data for testing a model, or preparing data for application to a model.

When a request for data is received (e.g., to train, fine-tune, or test a model, or to apply to the model), the data processor 1220 accesses data sets 1310 that are authorized for the entity that is requesting access. The data sets 1310 can be accessed using any of the techniques described above, including using a metadata graph to identify data objects within data silos of a data repository.

The data processor 1220 can include a data pre-processor 1320 that performs various operations on the accessed data set 1310 to prepare the data for a desired use. The data pre-processor can perform operations to generate training data sets or testing data sets for training, fine-tuning, and/or testing a model. Such operations can include, for example, normalizing data, converting data from one type to another, transforming data into a suitable format or structure, or aggregating or reducing data. In some implementations, the data pre-processor 1320 can apply anonymization operations that remove, encrypt, or obscure personally identifiable or private information within the accessed data set 1310. Some implementations of the data pre-processor 1320 also apply operations to bring data into compliance with a policy or regulation. For example, the data pre-processor 1320 can remove data from the data set 1310 that has been determined to be inaccurate. An example process for detecting and removing noise from a data set is described in U.S. patent application Ser. No. 18/736,407, filed Jun. 6, 2024, which is incorporated herein by reference in its entirety.

The processed data output by the data pre-processor 1320 can be passed to other elements of the data processor 1220 to generate sets of data for training or testing an AI model. The data pre-processor 1320 can additionally or alternatively generate a set of application data 1322 to apply to an existing AI model. The data pre-processor 1320 can performing cleaning, normalization, conversion, or other processing operations on an accessed data set 1310 to generate the application data. These operations can include anonymizing the data as described above, or, in another example, applying a pre-processing model to the data set 1310 that counteracts a distortion in the model to which the application data set 1322 is to be applied. The pre-processing model can include one or more data modification operators that modify the raw data set 1310 by, for example, adding features, removing features, or changing values within the data set 1310, to create a set of modified data. When applied to the AI model, modified data items from the set of modified data cause the model to produce outputs that do not exhibit the distortion in the model. An example process for detecting model distortions and counteracting the distortions via pre-processing models is described in U.S. patent application Ser. No. 18/783,409, filed Jul. 25, 2024, which is incorporated herein by reference in its entirety.

A data analyzer 1330 analyzes data to understand data types and how the data is used, as well as to generate usable sets of the data (e.g., training data, testing data, or inference data sets). The data analyzer 1330 receives raw data and/or the pre-processed data set output by the pre-processor 1320 and evaluates properties such as data types, extent of the data, linkages or dependencies between data, or other information that helps the system understand what the data is, how it is used, and how it can be used in models. The data analyzer 1330 can further generate synthetic data to supplement the existing data based on its analysis of the data's properties. In some implementations, the data analyzer 1330 includes the data profile generator 1340 and/or the sampler 1350, which are described below.

A data profile generator 1340 generates a data profile 1342 for the data set output by the data pre-processor 1320. The data profile generator 1340 can analyze a structure of the data set and interrelationships between data in the set to ensure that the data set is suitable for an intended artificial intelligence application. Such analysis can include, for example, calculating statistics for the data set (e.g., mean or standard deviation), checking data types within the data set and correcting data types as needed, checking for data anomalies (e.g., missing values, duplicates, or outliers), detecting patterns in the data set or correlations between data items, or detecting skews or imbalances in the distribution of the data in the data set that may affect model performance. The data profile 1342 output by the data profile generator 1340 can further include metadata that describes the data set, which can be used to generate documentation for a model or to perform auditing and compliance checks.

In some implementations, the data processor 1220 generates sets of training data that can be used to train machine learning models. Accordingly, the data processor 1220 can further include a sampler 1350 that samples the data set output by the data pre-processor 1320 and data analyzer 1330 to generate either training samples 1352 or testing samples 1354. For example, the sampler 1350 can generate a representative, random sample of items of data from the processed data set for each of a training data set and a testing data set. The training samples 1352 can be further input to a synthetic fabricator for generating additional training or test cases.

Figure 14:
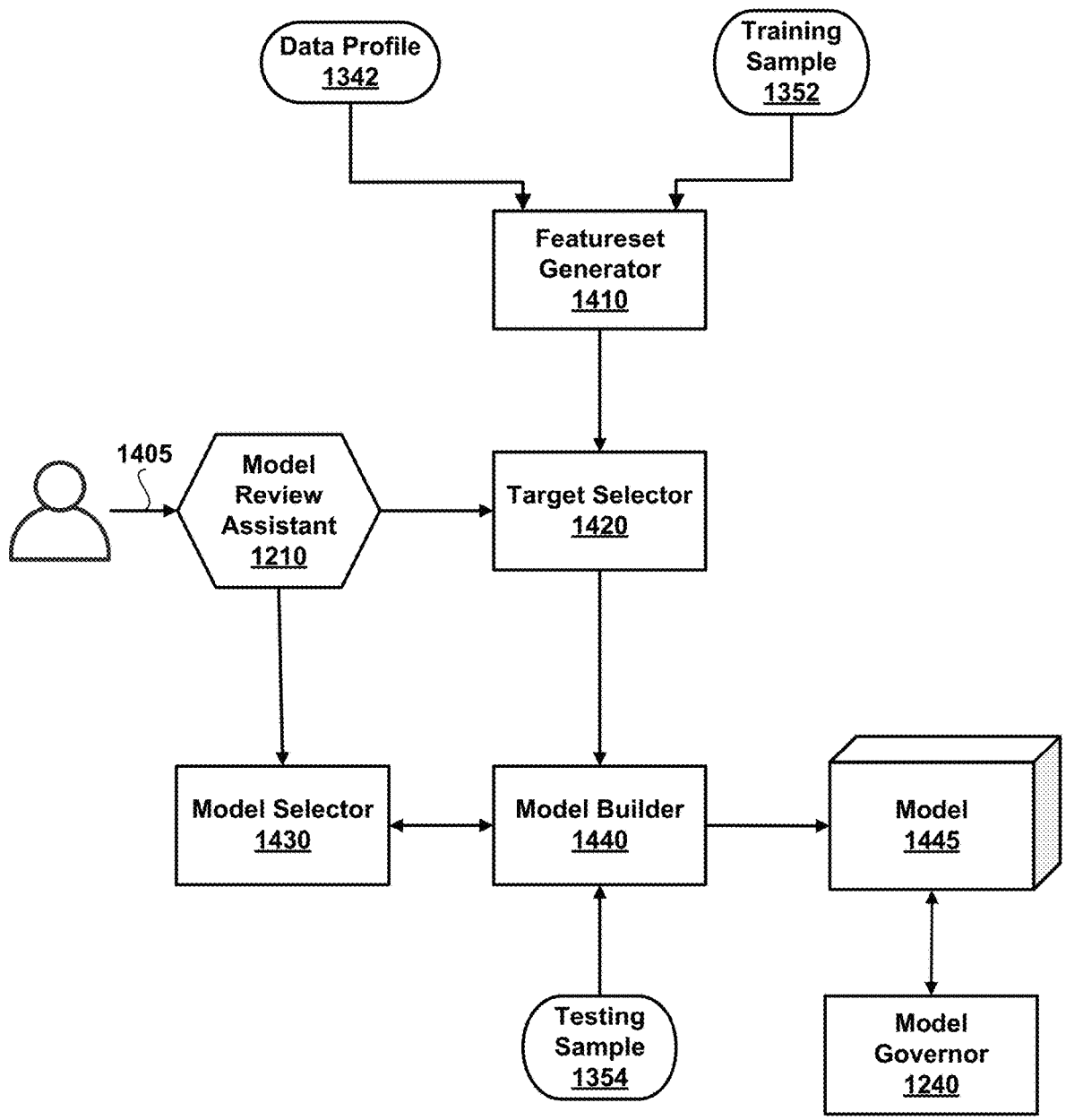
FIG. 14 is a block diagram illustrating components within a model generator, according to some implementations.

FIG. 14 is a block diagram illustrating components within the model generator 1230, according to some implementations. As described above, the model generator 1230 uses the cleaned and/or processed data sets output by the data processor 1220 to train machine learning models. The model training procedure can be conducted based in part on inputs 1405 received from a user (e.g., via the model review assistant 1210).

As shown in FIG. 14, the model generator 1230 can include a featureset generator 1410 that ingests the data profile 1342 and training samples 1352 generated by the data processor 1220. The featureset generator 1410 creates a set of features from a data set that can be used to train the machine learning model. When creating the features, the featureset generator 1410 can convert data (e.g., in the training samples 1352) into suitable machine-readable formats, for example by converting non-numerical values into numerical values, converting numerical formats to the same type, vectorizing data, or the like.

Features output by the featureset generator 1410 can be defined in part based on user inputs. For example, when a user is creating a model using the AI sandbox 1200, the user can directly specify features of interest for the model or can provide information that the featureset generator 1410 uses to identify the features within the dataset.

In some implementations, the featureset generator 1410 further uses feedback to learn, over time, how to select relevant features for a given application. For example, as users interact with the AI sandbox 1200 to generate models, the featureset generator 1410 can evaluate the features that are used in each model to build up a robust mapping between features and attributes of the models, such as data types input to the model, target variables of the models, or performance of the models. The featureset generator 1410 can then use this mapping to recommend features for other models or can train a feature selection model based on the mapping. In another example, the featureset generator 1410 uses model performance feedback to recommend or select features for a given model. The featureset generator 1410 can select, for example, a first set of features and receive feedback indicating performance (e.g., accuracy) of a model trained using the first set of features. The generator 1410 can then select a second set of features, receive feedback indicating performance of a model trained using the second set of features, and compare the performance measurements to determine whether the first or second set of features resulted in better outcomes.

A target selector 1420 selects a target variable for the machine learning model, based on features output by the featureset generator 1410 and/or based on user instructions received via the model review assistant 1210. The target variable specifies the output that the machine learning model will predict or classify. To identify the target variable, the target selector 1420 can receive an identification of a variable from the model review assistant 1210, generated based on a user input 1405. For example, the model review assistant 1210 uses an LLM to identify a user-specified target variable in a natural language user input. The target selector 1420 can compare the variable identified in the user's input to the features output by the featureset generator 1410 to determine whether the user-specified variable is present in the set of features or can be derived from the set of features. In some cases, the target selector 1420 can use the LLM to evaluate the set of features to identify the closest match to the user-specified target variable. The target selector 1420 can additionally or alternatively use a pattern of user behavior to identify the target variable. For example, if a user has recently used the AI sandbox 1200 to generate models based on a certain target variable within corresponding data sets, the target selector 1420 can determine that the user may be interested in generating a model based on the same target variable within a different data set. Similarly, the target selector 1420 can detect similarities between the user's actions within an enterprise (such as other models the user has built, models the user has used, or data the user has created or accessed) and actions of other users who have used the AI sandbox 1200 to build models. Based on these similarities, the target selector 1420 can determine that the user is likely to build a model for a specified target variable because the other users built models for the same specified target variable.

The target selector 1420 can additionally or alternatively use feedback from users or other systems when selecting the target variable. This feedback can be used instead of the processes for selecting the target variable from the user's natural language input or based on the user's past activity described above, or can be used to improve the ability of the selector 1420 to identify the correct target variable based on the natural language input or user activity. In an example, after a model has initially been trained for one target variable, feedback from the user or an external system can be used to determine that the model should be trained for a different target variable (e.g., because the user provides direct input indicating that the trained model is not producing desired outputs, or because another system identifies an error in the trained model's outputs). In other cases, the target selector 1420 generates a mapping between target variables used in other models and attributes of the models (such as features input to the other models, data types used in the other models, users who created the other models, or performance of the other models) to predict a target variable that is likely to be relevant to the model being developed.

A model selector 1430 evaluates whether to generate or deploy a model and, if so, recommends a type of machine learning model for the model generator 1230 to build. The model type can be one of a set of different model architectures, such as neural networks, random forests, or support vector machines. Model types can additionally or alternatively be selected from a set of off-the-shelf or preexisting models that can be used as—is or that can be fine-tuned for a particular purpose. Similarly, the model selector 1430 can select from among pre-trained models, which can be models that were previously developed within the organization in which the model review assistant 1210 operates, or received from an external source. For each application, the model selector 1430 can recommend either an individual model or a set of multiple models to achieve a user's desired purpose. For example, the model selector 1430 can recommend generating a suite of models that can be used together in an ensemble method. When recommending multiple models, the model selector 1430 can recommend generating all new models, using a selected set of pre-trained models or fine-tuned models, or combining new models with pre-trained or fine-tuned models. The model selector 1430 can also recommend specific ensemble learning techniques that enable these models to be used together. For example, the model selector 1430 can recommend generating a suite of three models in a voting ensemble, where the predictions of each model are combined by majority vote or averaging. In another example, the model selector 1430 recommends a stacking ensemble, in which the outputs of several base models are used as inputs to a meta-learner model that makes a final prediction, or a boosting ensemble in which models are trained sequentially, each one focusing on correcting the errors of its predecessor to improve overall performance.

When selecting a model, the model selector 1430 can receive an explicit model selection from the user. For example, the model review assistant 1210 can provide a list of available types of models to the user, and the user can select a model from the list. Alternatively, the model selector 1430 can recommend a model type for a given application. To recommend a model, the model selector 1430 can apply a set of input data to each of multiple types of models and compute metrics for each type of model. The metrics can include, for example, a measure of how quickly the model generates outputs for the set of input data (e.g., latency, output speed of the model, or variance of model response time), a measure of how accurate the model's outputs are, an amount of memory used by the model, or a measurement of cost to use the model. Based on the metrics, the model selector 1430 can recommend one or more model types that achieve a particular goal, such as fastest execution or most accurate results. In other cases, rather than applying input data to multiple models and computing metrics that are used for model selection, the model selector 1430 can recommend a model type based on historical model performance. For example, the model selector 1430 can evaluate historical data that indicates, for example, that one type of model is typically faster but less accurate than another type of model, enabling the model selector 1430 to make a recommendation for the model type based on whether speed or accuracy is more important for a given application. Some implementations of the model selector 1430 output an identifier of the recommended model to a model builder 1440 to enable the recommended model to be built. In other implementations, the model selector 1430 outputs the recommended model types to the user, such that the user can select between the recommended model types or can select another type of model.

The model builder 1440 builds a model 1445, which can include training a new model, fine-tuning an existing model, or packaging or refining a model for deployment without any further training. The model builder 1440 receives the selected model type from the model selector 1430 and can determine whether to perform training, fine-tuning, packaging, or other tasks based on the selected model. When training a new model or fine-tuning an existing model, the model builder 1440 trains the model type selected by the user or the model selector 1430 based on the target variable identified by the target selector 1420 and the set of training samples 1352 produced by the data processor 1220. The model builder 1440 can then using the testing samples 1354 produced by the data processor 1220 to test the model and retrain as needed, for example until the model converges or reaches a specified accuracy threshold on the testing data set.

Figure 15:
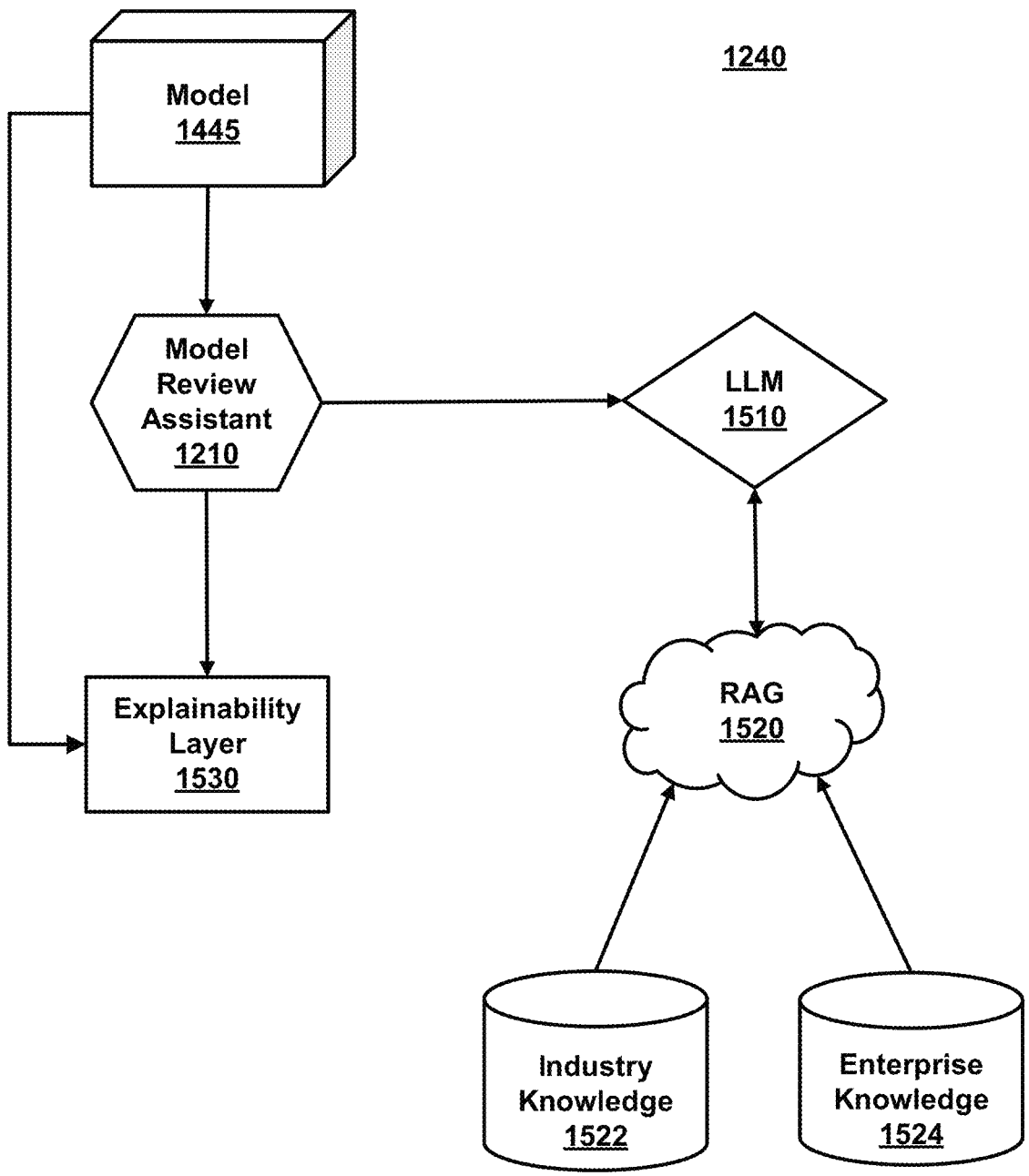
FIG. 15 is a block diagram illustrating functionality of a model governor, according to some implementations.

FIG. 15 is a block diagram illustrating functionality of the model governor 1240, according to some implementations. As shown in FIG. 15, the model governor 1240 can leverage the model review assistant 1210 to evaluate the model 1445, including using the model review assistant 1210 to interface with a large language model (LLM) 1510 to evaluate the model 1445 for higher-level analysis and governance tasks. In some implementations, the LLM 1510 uses a RAG-based process 1520 to retrieve policies, procedures, know-how, or other applicable governance information from data repositories such as an industry knowledge repository 1522 or an enterprise knowledge repository 1524. The industry knowledge repository 1522 can store, for example, scientific models, country regulations, or data standards. The enterprise knowledge repository 1524 can store information such as organization policies, a taxonomy specific to the organization, or a business mission of the organization. The model review assistant 1210 can generate queries to the LLM 1510 that cause the LLM 1510 to evaluate the model 1445 against applicable governance information.

Based on the evaluation, the model governor 1240 can update the model 1445, create additional models or data that bring the model 1445 into compliance with the governance criteria, or generate documentation describing how the model complies or does not comply with the governance information. For example, an organization may be subject to a regulation that indicates that certain types of models (e.g., models for approving loan applications) must produce outputs that are not biased on certain grounds (e.g., race, gender, age, sexual orientation, or geographic location or the loan applicants). If the model governor 1240 detects that such a loan approval model is unfairly biasing outcomes based on one or more of these grounds, the model governor 1240 can cause the model to be retrained or fine-tuned to reduce the biased outcomes. Alternatively, the model governor 1240 can cause a second model to be generated, where the second model is configured to pre-process application data before the application data is input to the model 1445 in order to correct the model's bias. In another example, if the model governor 1240 determines that a model is in compliance with each of a set of governance criteria, the model governor 1240 can generate documentation (optionally using the LLM 1510) that describes the governance criteria against which the model 1445 was evaluated and how the model was determined to comply with each of the criteria.

The model governor 1240 can further generate an explainability layer 1530 for the model 1445. The explainability layer 1530 includes data associated with the model 1445 that explains what the model is doing, how it is making decisions, what data was used to train the model, what data is input or output from the model, any modifications that are applied to input data prior to the data being processed through the model, or any other features that are specified by enterprise, regulatory, or other standards for the organization in which the model is generated. The model governor 1240 can used the LLM 1510 to generate the explainability layer by analyzing the model 1445 itself and/or governance documentation retrieved from repositories such as the industry knowledge repository 1522 or the enterprise knowledge repository 1524.

Automated Generation of AI Models

Figure 16A:
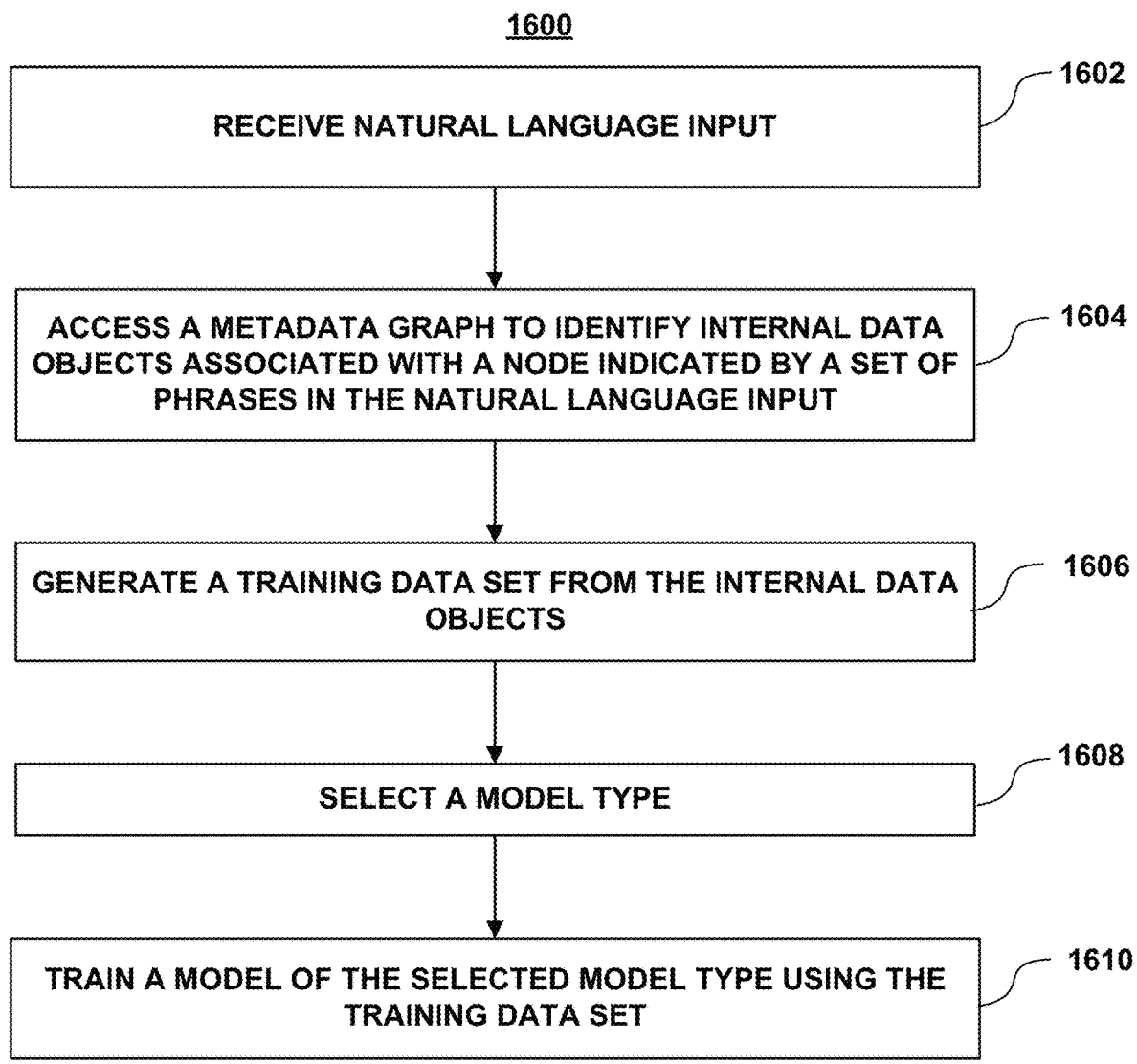
FIG. 16A is a flowchart illustrating a process for automatically generating an artificial intelligence (AI) model, according to some implementations.

FIG. 16A is a flowchart illustrating a process 1600 for automatically generating an artificial intelligence (AI) model, according to some implementations. The process 1600 can be executed by a computer system, such as one or more systems that implement components of the artificial intelligence sandbox 1200.

As shown in FIG. 16A, the computer system receives, at 1602, a natural language input from a user. The natural language input can include explicit instructions for the computer system to train an AI model or a general query that the computer system can process as an instruction to generate a model. The input can include a set of phrases that implicitly or explicitly indicate desired properties of the model, such as the data that should be processed by the model and/or intended outputs from the model. In an example, a user can provide the input "I need help analyzing my investment portfolio." The computer system processes this input to determine if a model is helpful to answer the query or if the query can be answered without a model. For example, the computer system determines that a model would be helpful in the analysis of an investment portfolio, whereas a more direct query (e.g., "do I own any shares of XYZ Corp stock?") would not require or would be complicated by a model. When submitting the natural language input, the user may be unaware that a model would be helpful, much less the type of model that would yield the best results, the data that should be used to train or input to the model, or how to go about training and deploying a model.

Figure 17A:
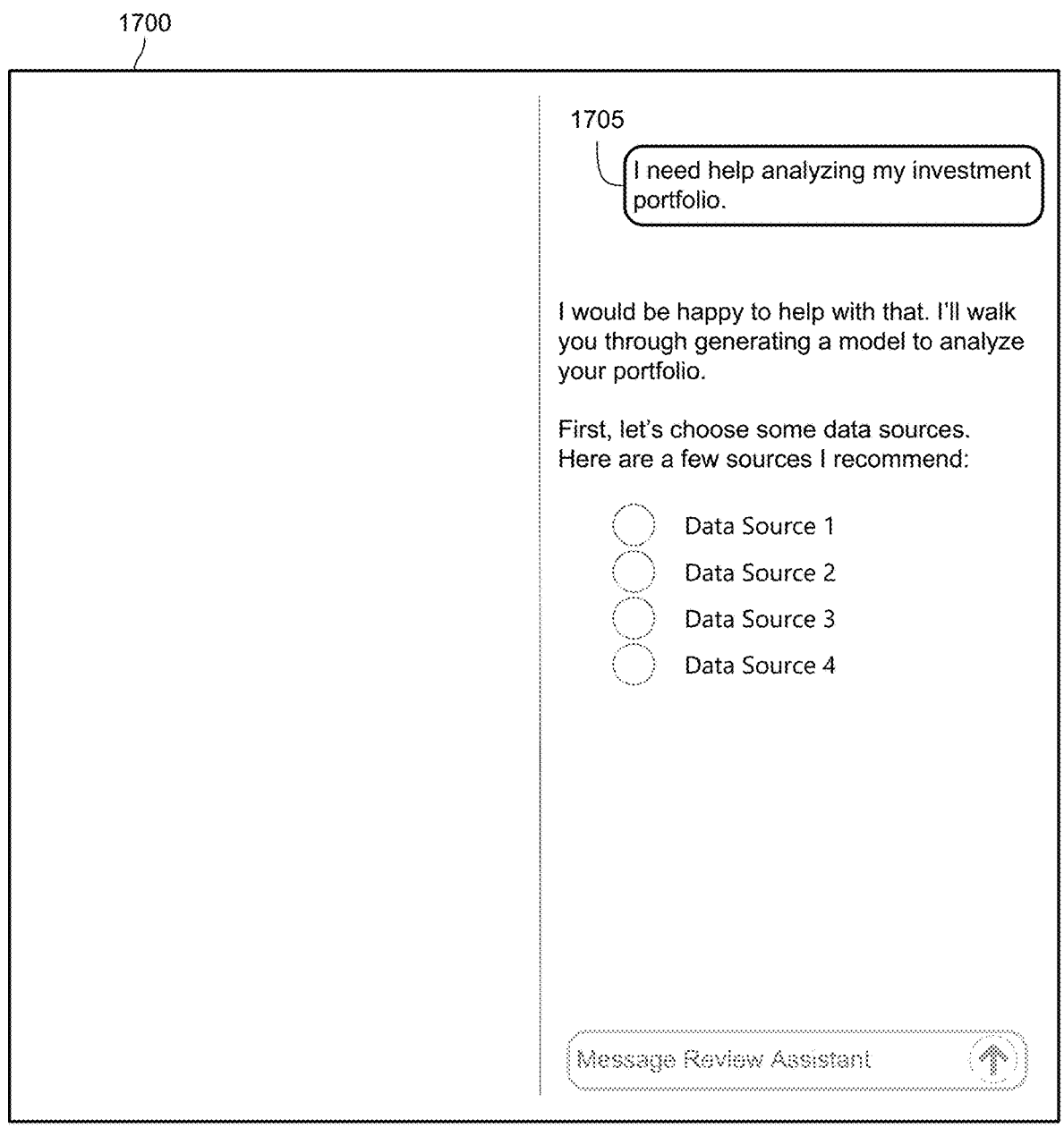
FIGS. 17A-D illustrate an example chat interface.

The input can be received via the model review assistant 1210, which, for example, can provide a chat-like interface by which inputs can be received from a user and information can be output to the user. User inputs to the chat interface can be received as natural language inputs and/or as other types of inputs, such as selections of items from a list. Similarly, the model review assistant 1210 can output information to users in natural language formats (e.g., using an LLM to generate the outputs), in graphical formats such as data plots, or in other formats. An example of a chat interface 1700 by which user inputs can be received is depicted in FIG. 17A. In the example, a user has provided the natural language input 1705 "I need help analyzing my investment portfolio." Other users may provide natural language inputs that more directly instruct the computer system to generate a model (e.g., "Create a model for analyzing my investment portfolio."). The phrase "my investment portfolio" can be processed by the computer system as being indicative of the data that is to be processed by the model.

Figure 17B:

At 1604, the computer system accesses a metadata graph based on the user input. The metadata graph can comprise (i) a set of nodes comprising (a) metadata indicating internal data objects stored in data silos and (b) location identifiers of the data silos, and (ii) edges indicating data lineages between the set of nodes. As described above, a computer system can traverse the metadata graph that indicates where data is stored, what data is available among differing data silos, and data lineages between nodes of the graph, thereby enabling the computer system to efficiently find data within a set of data silos. By traversing the metadata graph, the system can determine a node that corresponds to the set of phrases in the natural language input received from the user. In the example interface illustrated in FIG. 17A, the computer system selects four candidate data sources associated with one or more nodes of the metadata graph that are identified based on the phrase "my investment portfolio," where each data source includes one or more data items. For example, a data source for performance of Investment A can include a set of measurements of the value of Investment A at different times. In some implementations, such as in the example shown in FIG. 17A, the user can provide an additional input to select from among the candidate data sources, shown in FIG. 17B. Alternatively, the computer system can proceed with training the new model with the data objects identified based on the user's natural language input.

At 1606, the computer system processes the data objects retrieved using the metadata graph in order to generate a training data set. The computer system can pre-process the data objects, such as by removing biased, incorrect, or irrelevant values from the data set. Once the data objects have been cleaned, the system can sample a training data set from the data objects and/or input the data objects to a synthetic data generator to generate synthetic training data. In a similar manner, the computer system can generate a set of test data to test the model once it has been trained.

At 1608, the computer system selects a model type for the model that is to be trained. A model type can be selected from among different model architectures and/or from off-the-shelf packages or preexisting models, using model metrics associated with each available model type. In some cases, model types can be output to the user via the chat interface, enabling the user to select the type of model to train. The computer system then trains a model of the selected type, at 1610, using the generated set of training data.

Figure 16B:
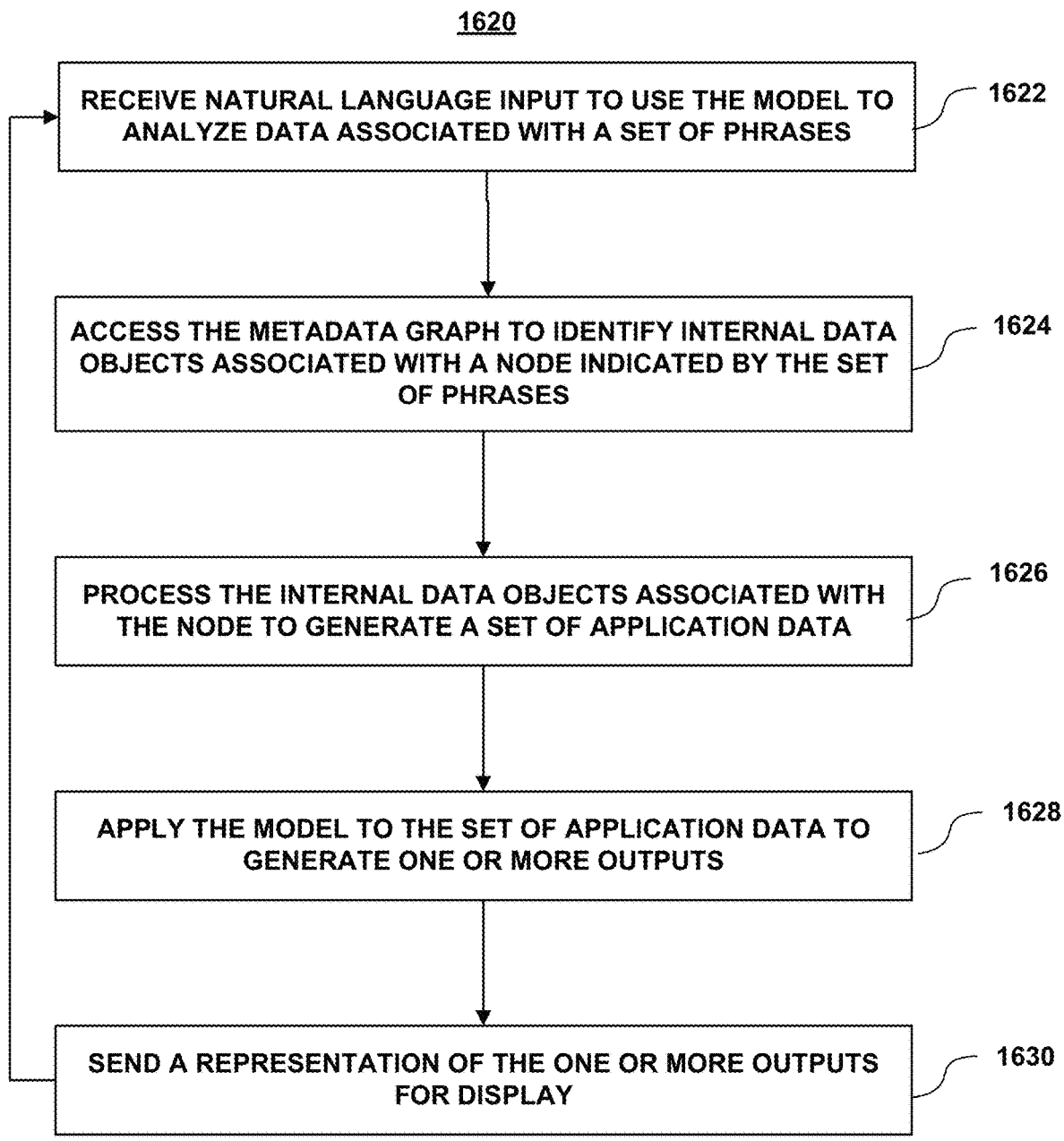
FIG. 16B is a flowchart illustrating a process for automatically generating data pipelines for AI models, according to some implementations.

After a model has been trained, whether by the process in FIG. 16A or by another process, the computer system can also interact with a user to automatically generate pipelines of application data to be processed through the model. FIG. 16B is a flowchart illustrating a process 1620 for automatically generating data pipelines for AI models, according to some implementations. The process 1620 can be at least partially performed by the same computing system that performs the process 1600 in FIG. 16A, or can be performed by one or more different computing systems.

Figure 17C:
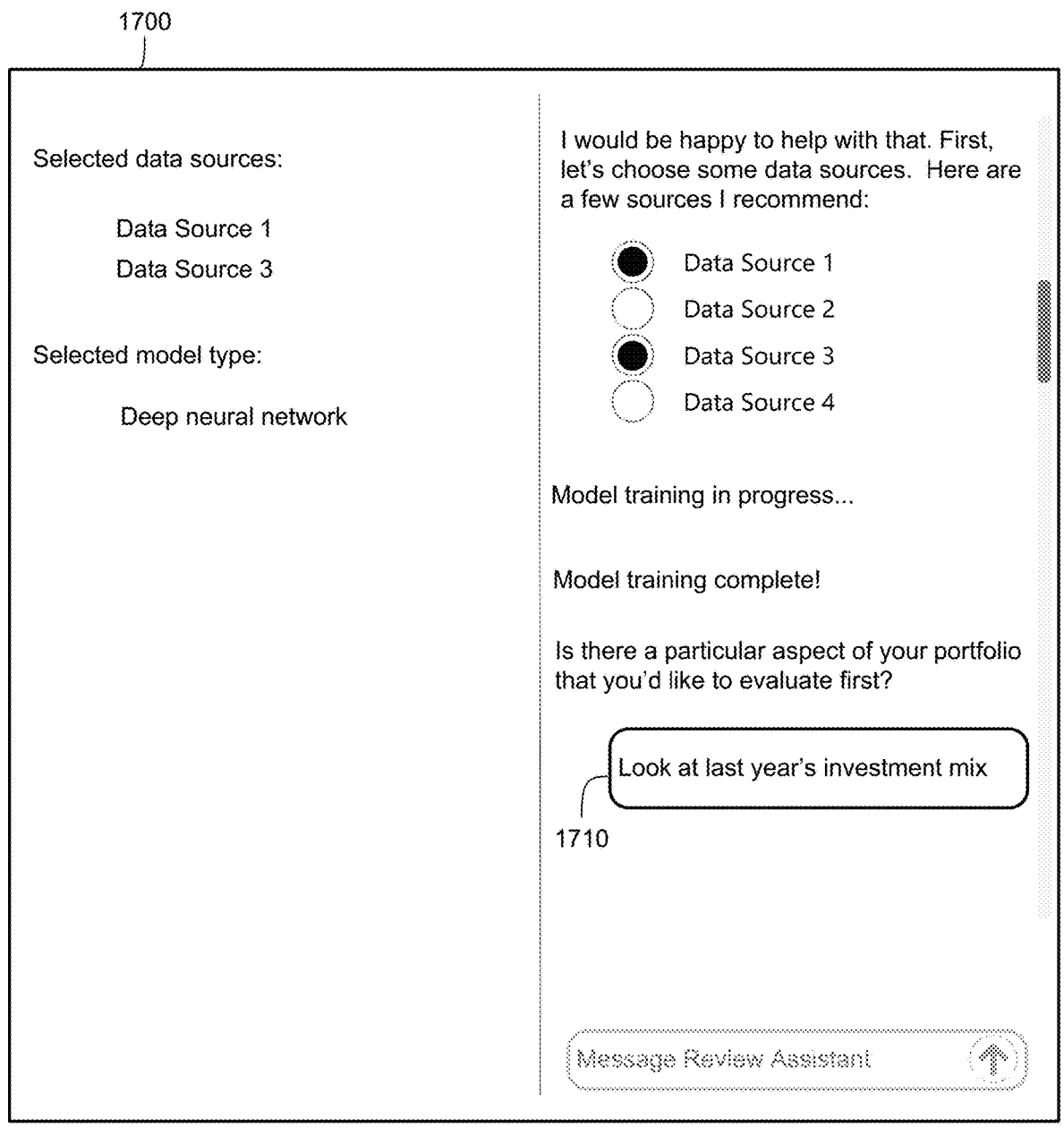

As shown in FIG. 16B, the computer system receives, at 1612, a first natural language input from a user, which can include a set of phrases and an instruction to analyze data associated with the set of phrases using an AI model. Like the input to train the model, the input to deploy the model can be received via the chat interface generated by the model review assistant 1210. For example, FIG. 17C illustrates that a user input 1710 has been received via the chat interface, instructing the computer system to "Look at last year's investment mix." The phrase "last year's investment mix" can be used to identify a set of data to which the model is to be applied, while "look at" is interpreted, in the context of the chat session, as an instruction to deploy the model that was generated during the chat session.

At 1624, the computer system uses the natural language input to access a metadata graph that indicates internal data objects stored in data silos. The metadata graph can be the same graph used to identify data objects for generating the training data sets described with respect to FIG. 16A. Using the metadata graph, the system can determine a node that corresponds to the set of phrases in the first natural language input.

At 1606, the computer system processes internal data objects indicated by the determined node to generate a first set of data. For example, the computer system can remove personally identifiable or private information from the internal data objects. In another example, the system applies a set of data modification operators to the internal data objects to generate a set of modified data based on the internal data objects, where the data modification operators are configured to remove bias from the internal data objects or to remove or compensate for inaccurate or irrelevant data within the objects.

At 1608, the computer system applies the AI model to the first set of application data to generate one or more outputs based on the application data. For example, the computer system uses the model to classify an item of data in the first set of application data or make a prediction based on one or more of the application data items.

Figure 17D:
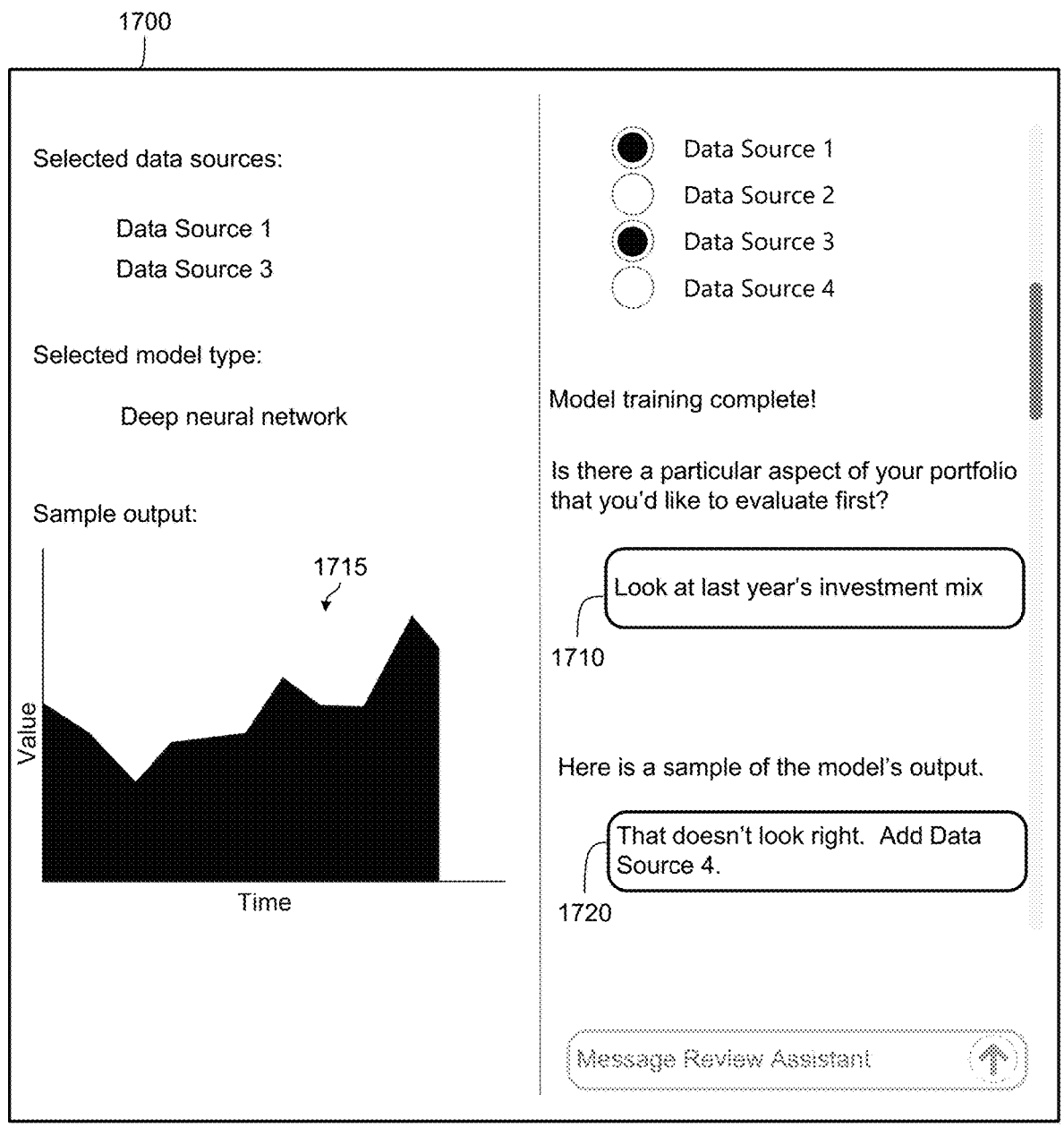

At 1610, the computer system sends a representation of the one or more outputs for display to a user. For example, FIG. 17D illustrates that the computer system generates a plot 1715 to illustrate results that are produced when the model is applied to the set of data specified by the user (e.g., "last year's investment mix").

Based on the displayed output, the user may determine that modifications to the model or the data it processes are needed to obtain a desired result. For example, the displayed output may indicate that the data input to the model was incomplete or incorrect. Accordingly, the user can iteratively interact with the model review assistant 1210 to modify the model's inputs until an expected output is received. These iterative interactions can include further natural language inputs from the user via the chat interface provided by the model review assistant 1210.

For example, at 1612, the computer system receives a second natural language input that includes an instruction to modify the first set of application data (e.g., by adding data to the first set, removing data from the first set, or modifying values within the first set). FIG. 17D further illustrates an example input 1720, in which the user instructs the computer system to "add Data Source 4." The computer system then generates, at 1614, a second set of application data based on the second natural language input. Depending on the instructions in the second input, generating the second set of application data can entail retrieving additional data objects using the metadata graph and processing the data objects to obtain application data, modifying the data values within the first set of application data (e.g., by modifying the way the data objects were processed to produce the first set of application data), or removing data from the first set of application data. The AI model can then be applied to the second set of application data, at 1616, and the outputs produced from the application of the model can be displayed to the user. This iterative process can be repeated until the user is satisfied with the outputs of the model.

Deploying an AI Model

Once an AI model has been trained and has been determined to comply with governance parameters for the model, the model can be deployed to make predictions based on application data input to the model. The model automator 1250 determines how to deploy the model for use in a production environment, and orchestrates the deployment.

Figure 18:
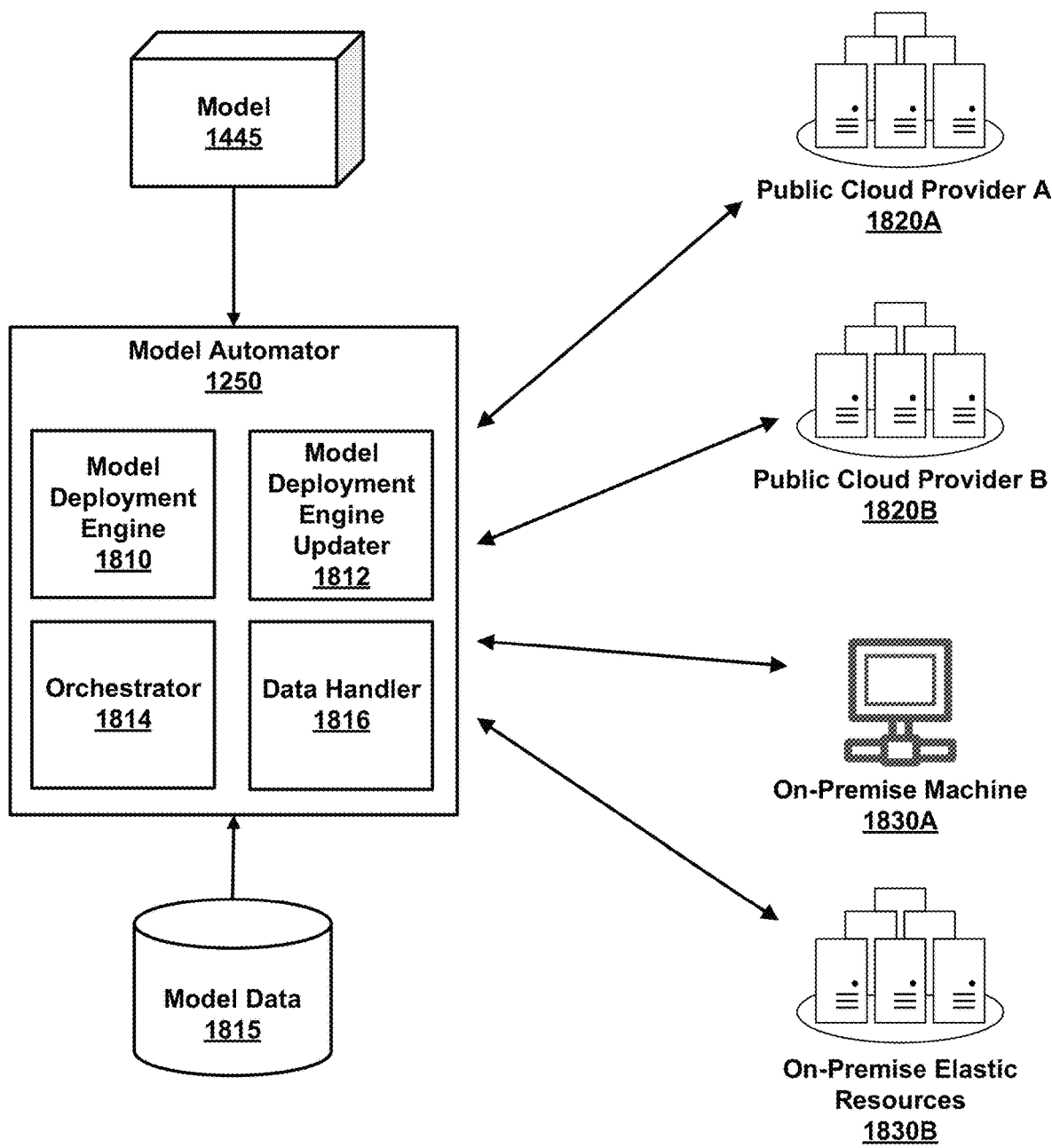
FIG. 18 is a schematic diagram illustrating operations of a model automator, according to some implementations.

FIG. 18 is a schematic diagram illustrating operations of the model automator 1250, according to some implementations. As shown in FIG. 18, the model automator 1250 can include a model deployment engine 1810, a model deployment engine updater 1812, an orchestrator 1814, and a data handler 1816.

The model automator 1250 uses the model deployment engine 1810 to select a model deployment location for an AI model, where the model deployment location can be selected from among several available computing environments. For example, as illustrated in FIG. 18, the model automator 1250 may have access to multiple public cloud environments (e.g., from a first public cloud provider 1820A and a second public cloud provider 1820B), as well as one or more on-premise environments (such as an on-premise machine 1830A or on-premise elastic resources 1830B).

Different deployment environments for AI models can present various advantages and disadvantages, especially with respect to cost efficiency, computing capacity, and privacy. On-premise environments often have limited capacity, since they are constrained by the available hardware in the enterprise. However, on-premise environments can offer privacy benefits that are not available in some cloud environments. On the other hand, cloud environments offer scalable resources, but the costs can vary significantly depending on the cloud provider and the amount of compute power used. For example, cloud providers typically charge based on usage, and sometimes use a tiered pricing system where the price for a marginal amount of computing resources varies depending on the total amount of resources used in a given timeframe. Cloud and on-premise environments can also differ in their the ease of integration with existing systems, the flexibility of resource allocation, and their potential for downtime or service interruptions.

The model automator 1250 can monitor operations parameters associated with the deployment environments that are available to the automator. The operations parameters can include data that is relatively dynamic, such as an amount of computing capacity that is available for use by a given model, computing resources used during execution of a model deployed in the environment, response time from a model deployed in the environment, or accuracy of results produced by the model when deployed in the environment. Other example operations parameters include data that is static or changes over longer period of time, such as a privacy policy of the operator of a deployment environment, an average amount of downtime of the environment, or a number of service interruptions to the environment. The model automator 1250 can measure some of the operations parameters as the automator deploys models to the various available environments. Alternatively, the model automator 1250 can obtain the operations parameters from other sources, such as operators of the environments or other systems that perform computing tasks within the environments.

Additionally, the model automator 1250 can facilitate publishing of a model for use by other users. Within some organizations, it may be desirable for a model generated by one user to be made available to other users. For example, many users within an organization may perform similar tasks and would benefit from the model created by another user to assist these tasks. When a model is published, the model automator 1250 can manage access rights or entitlement to the model. For example, the model automator 1250 can link the model to access rights that specify that only users within a particular division of an organization can use the model, or that the model can only be used by users who have permission to access certain data (e.g., the data the model was trained upon).

The model deployment engine 1810 includes rules, models, or other logic tools that enable the model automator 1250 to select a model deployment location. For example, the model deployment engine 1810 can include a trained decision model such as one or more decision trees or a random forest, a knowledge graph, or a rules engine. When determining a deployment location for a given model, the model deployment engine 1810 can input information such as parameters of the model itself (e.g., size of the model, privacy considerations associated with the model, or information that indicates whether the model is used in a real-time or batch processing flow), parameters of the data that is to be processed through the model when deployed (e.g., an amount of data processed at each iteration of the model, location of the data, or privacy considerations associated with the data), or operations parameters associated with the available deployment locations. Based on one or more of these inputs, the model deployment engine 1810 selects a model deployment location for the model. In some implementations, the model deployment engine 1810 includes an explainability layer that enables the engine to output an explanation for its selected model deployment location. For example, if a user is using a chat-like interface from the model review assistant 1210 to create and deploy a model, the model deployment engine 1810 can generate an explanation for its decision that can be output to the user via the model review assistant 1210.

In an example, the model deployment engine 1810 evaluates cost efficiency of the available environments and deploys a model to an environment for which the cost efficiency is greater than a specified threshold. Cost efficiency can be measured based on the amount of computing resources the model is expected to use and the expected cost to use those resources in each available environment. The model deployment engine 1810 can determine cost efficiency as an isolated metric associated with each available model deployment environment, or as a differential metric that compares the cost to deploy the model in one environment to another. In other cases, the model deployment engine 1810 selects the deployment location based at least in part on a privacy policy associated with the model, the input data to be processed by the model, or the outputs produced when the model processes the input. For example, a model is deployed to an on-premise environment if the model has a privacy policy restricting its use to on-premise systems, but is deployed to a cloud environment in the absence of such a restriction. In still other cases, the model deployment engine 1810 can select the model deployment location based in part on whether the model is used to process data in real-time or in batch processes. For example, where a model is used in a real-time processing flow, the engine 1810 may select a cloud environment for deploying the model, based on a determination that the cloud environment can more readily scale resources to ensure availability of the model than an on-premise environment. On the other hand, where a model is used in a batch processing flow, the engine 1810 may cause the model to be deployed to an on-premise environment, based on a determination that execution of the batch process can be delayed until computing resources are available, if needed.

The model deployment engine updater 1812 can update the model deployment engine 1810 based on its continued observation of the operations parameters. For example, when the model deployment engine 1810 includes a trained decision model, the model deployment engine updater 1812 can retrain the decision model based on updated operations parameters. When the model deployment engine 1810 includes explicit rules, the model deployment engine updater 1812 can update the rules by instructing a large language model (LLM) to modify an existing rule or create a new rule based on an observed operations parameter. For example, if a cloud service provider updates its privacy policy, the model deployment engine updater 1812 can prompt the LLM to evaluate the updated privacy policy to determine where it does or does not comply with a privacy policy of an organization that operates the model automator 1250. Based on the evaluation, the LLM can then update a rule for acceptable deployment locations for certain types of AI models, for example if a first cloud service provider modifies its privacy policy such that it no longer complies with a privacy policy associated with a particular AI model or the data it processes.

The model automator 1250 can use the model deployment engine 1810 both to select a model deployment location for a new model or a new instance of a model, as well as to move a model from one deployment location to another. For example, as the engine 1810 is updated in response to observed operations parameters, the model automator 1250 can periodically use the engine 1810 to reevaluate whether a model is deployed at a location that satisfies the engine's criteria (e.g., whether the cost efficiency of the environment is still greater than a corresponding threshold, or whether the environment still complies with a privacy policy associated with the data). In another example, the model automator 1250 can determine that a new instance of a model should be deployed in a second environment when an original instance of the model is using computing resources of a first environment that exceed a given threshold (e.g., a specified pricing tier from the cloud computing provider that operates the first environment).

The orchestrator 1814 facilitates deployment of an AI model to the location selected by the model automator 1250 based on the model deployment engine 1810, making the model available for use in a production environment. When deploying a model, the orchestrator 1814 can configure models for deployment on selected infrastructure (including transferring the model to the selected infrastructure), as well as configure the infrastructure for the model (e.g., by spinning up the resources that are needed for the model). The orchestrator 1814 is configured to use platform-specific APIs to automatically and seamlessly deploy models in any of the available environments. The orchestrator 1814 can also leverage containerization technologies, such as Docker, and orchestration frameworks, such as Kubernetes, to package models with all necessary dependencies and to scale and manage containerized applications.

The orchestrator 1814 can determine deployment attributes that are required for deployment of each model or that improve the performance of deployed models. These deployment attributes can include, for example, the language of the model (such as Python or R), infrastructure needs of the model (such as available memory, processing speeds, available parallelization, or hardware type), or configuration parameters for Docker files or Kubernetes deployments. In some implementations, the orchestrator 1814 maintains a set of patterns or templates that each specify deployment attributes for a corresponding type of model. Some of these patterns or templates can be initially provided by a user. Other patterns or templates can be automatically generated by the orchestrator 1814, for example by identifying deployment attributes for similar types of models. The orchestrator 1814 can automatically update the patterns or templates over time as it uses the attributes in the patterns or templates to deploy models.

After deploying a model, the orchestrator 1814 can monitor the deployed model to verify that the deployment succeeded. Success can be measured, for example, by an indicator that specifies whether the model is generating results, by a measurement of model operational parameters (e.g., latency, memory utilization, or CPU or GPU utilization), by a measurement of model performance (e.g., accuracy or precision), or by a combination of factors. The orchestrator 1814 can determine that a model was not successfully deployed if, for example, the model is not generating results, if the model's operational parameters fall outside of specified ranges, or if the model performance differs from expected model performance by at least a threshold amount. When the orchestrator 1814 determines a model has not been successfully deployed, the orchestrator 1814 can determine to roll back a configuration to an earlier configuration, deploy the model on different infrastructure, halt deployment of the model altogether until errors are corrected, or take other remedial action to improve the model deployment. The orchestrator 1814 can also update the deployment templates based on successful or unsuccessful deployments. For example, if it is determined that a configuration parameter in a Docker file caused model operational parameters for a certain type of model to fall outside of the expected range, the orchestrator 1814 updates the deployment template for the model's type to ensure that the correct configuration parameter is used in future Docker files for the same type of model.

The data handler 1816 makes data available to the deployed AI model, at the location where it is deployed. In some implementations, the data handler 1816 identifies a pipeline of application data for the deployed model that is processed by the data processor 1220 described above. Using APIs associated with the environment in which the model is deployed, the data handler 1816 can generate scripts that make the application data available to the environment for processing by the model. The data handler 1816 can further handle privacy policies for the data, check the data for compliance with ethical or fairness standards, and/or can obtain or generate approvals for the data that can be used in a given circumstance.

Figure 19:
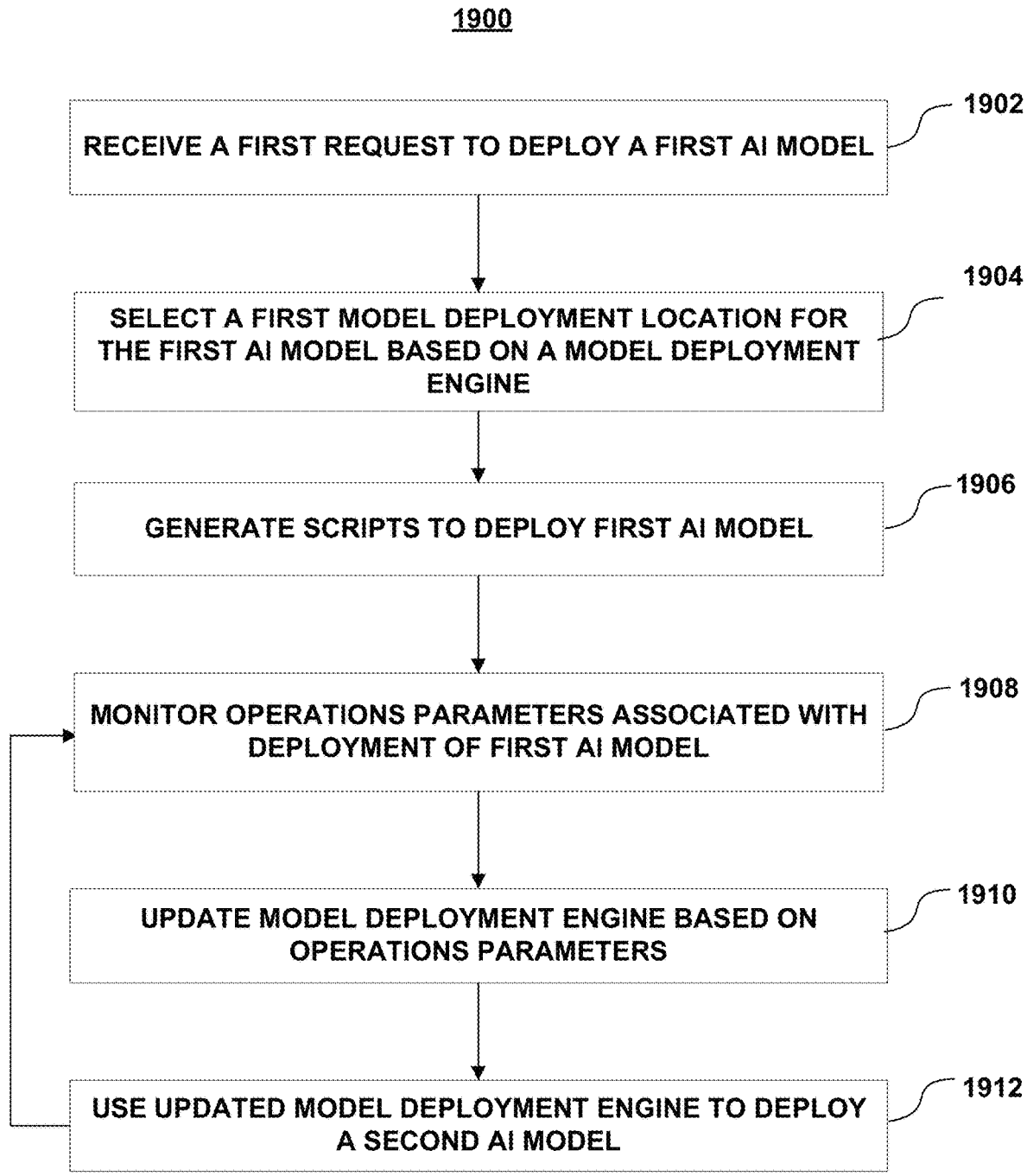
FIG. 19 is a flowchart illustrating a process for automating deployment of AI models, according to some implementations.

FIG. 19 is a flowchart illustrating a process 1900 for automating deployment of AI models, according to some implementations. The process 1900 can be performed by a computing system, such as a system that implements aspects of the model automator 1250.

As shown in FIG. 19, the computer system receives, at 1902, a first request to deploy a first AI model, in order to make the first AI model available for use in a production environment. In some implementations, the request can be received as a natural language input to a chat interface, similar to the inputs described with respect to FIGS. 17A-17D.

At 1904, the computer system selects a first model deployment location for the first AI model based on a model deployment engine. The deployment location can be selected from among cloud provider environments or environments that are operated at least in part by an entity that controls the first AI model ("on-premise environments"). For example, an entity may contract with multiple cloud providers to use computing environments maintained by the cloud providers, but may also maintain some of its own computing infrastructure. The computer system can select whether to deploy the first model on the on-premise infrastructure or in a cloud environment, and/or can select the particular location within the on-premise infrastructure or the particular cloud environment where the model is to be deployed. To select the model deployment location, the model deployment engine can account for properties of the first AI model itself, properties of the deployment location, or considerations for governance of models or entity-specific policies of the entity that controls the first AI model. The model deployment engine can include one or more trained models such as decision trees or random forests, a rules-based system such as one or more knowledge graphs or rules engines, or a combination of logic or tools that enable the computer system to make decisions about model deployment locations.

At 1906, the computer system generates scripts to deploy the first AI model to the first model deployment location. For example, the computer system can generate scripts that call the platform-specific APIs for the selected model deployment location, leverage cloud technologies (such as containerization or orchestration) for cloud deployment locations or file system or server management technologies for on-premise deployment locations, and ensure that the deployed model has access to a data pipeline with the data that the model is configured to process.

After deploying the first AI model, the computer system can monitor operations parameters associated with the deployment of the model, at 1908. The operations parameters can include, for example, a computing cost used by the first AI model or a response time from the first AI model when deployed at the selected location, a privacy policy of the environment that includes the model's deployment location, or a measurement of downtime or service interruptions of the environment that includes the deployment location.

Based on the operations parameters, at 1910, the computer system can update the model deployment engine by, for example, retraining a trained model within the model deployment engine or updating rules within the engine. For example, the computer system can update a model when a cloud provider modifies its privacy policy, or when actual operations parameters monitored by the computer system differ from the operations parameters that were used to train the model deployment engine.

The updated model deployment engine can then be used, at 1912, to deploy a second AI model or to re-deploy the first AI model to another location. In some cases, a second AI model can be deployed to the same environment as the first AI model or to a different environment from the first model based on the operations parameters observed from the deployment of the first model. For example, if the first model was deployed to an on-premise system and the on-premise system is nearing its computing capacity, the second model can be deployed to a cloud environment. In other cases, the second AI model is a second instance of the first model that is deployed to another location. For example, if an entity deploys a first AI model to a first cloud environment in which the entity is approaching a certain computing cost threshold, a second instance of the first model can be deployed automatically to a second cloud environment to reduce the computing costs within the first environment. In still other cases, the computer system may determine that the first AI model should be moved from one deployment location to another. For example, if the privacy policy of a first cloud provider changes after the first model has been deployed to the first provider's environment, the computer system can move the first model from the first provider's environment to another cloud provider's environment.

The process 1900 can be iterated as additional models are deployed by the computer system. The computer system can therefore iteratively improve its knowledge about how well models perform in different environments, the cost to deploy models to these environments, and how well the environments comply with governance or policy considerations. Leveraging this iteratively improved knowledge, the computer system can improve its ability to efficiently deploy AI models automatically.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A computer-implemented method, comprising:
   receiving, at a computer system, a first natural language input from a user that includes a set of phrases and an instruction to analyze data associated with the set of phrases using an artificial intelligence (AI) model;
   in response to the first natural language input, accessing a metadata graph to determine a node corresponding to the set of phrases,
      wherein the metadata graph comprises (i) a set of nodes comprising (a) metadata indicating internal data objects stored in data silos and (b) location identifiers of the data silos, and (ii) edges indicating data lineages of the set of nodes;
   processing one or more internal data objects indicated by the determined node to generate a first set of application data;
   applying the AI model to the first set of application data to generate one or more first outputs;
      wherein the one or more first outputs comprise a classification of data items in the first set of application data or one or more predictions made based on the first set of application data;
   transmitting, for display to the user, a representation of the one or more first outputs;
   receiving a second natural language input from the user, wherein the second natural language input includes an instruction to modify the first set of application data;
   generating, by the computer system, a second set of application data based on the received second natural language input; and
   applying the AI model to the second set of application data to generate one or more second outputs.

2. The method of claim 1, wherein processing the internal data objects to generate the first set of application data comprises removing personally identifiable or private information from the internal data objects.

3. The method of claim 1, wherein processing the internal data objects to generate the first set of application data comprises:
   applying a set of data modification operators to the internal data objects to generate a set of modified data based on the internal data objects,
      wherein the first set of application data includes one or more modified data items from the set of modified data.

4. The method of claim 1, wherein processing the internal data objects to generate the first set of application data comprises:
   removing an inaccurate data item from the internal data object.

5. The method of claim 1, further comprising, prior to receiving the first natural language input:
   receiving a third natural language input that includes an instruction to generate the AI model;
   accessing the metadata graph to determine a node corresponding to the third natural language input;
   processing internal data objects associated with the node corresponding to the third natural language input to generate a set of training data; and
   training the AI model using the set of training data to generate a trained AI model;
      wherein applying the AI model to the first set of application data comprises applying the trained AI model to the first set of application data.

6. The method of claim 5, wherein training the AI model comprises:
   accessing values of one or more model metrics associated with each of a plurality of model types;
   selecting, by the computer system, a model type for the trained AI model from among the plurality of model types based on the accessed values of the one or more model metrics; and
   training the selected model type.

7. The method of claim 5, wherein training the AI model comprises receiving a user selection of a model type for the AI model and training the selected model type.

8. The method of claim 1, further comprising:
   generating, by the computer system, a chat interface for display to the user;
   wherein the first natural language input is received via the chat interface; and
   wherein sending the representation of the one or more outputs for display to the user comprises displaying the one or more outputs via the chat interface.

9. The method of claim 1, wherein generating the second set of application data based on the second natural language input comprises:
   adding a data item to the first set of application data;
   removing a data item from the first set of application data; or
   applying a data modification operator to a value of a data item in the first set of application data to modify the value.

10. A system, comprising:
   one or more processors; and
   one or more non-transitory computer-readable storage media storing executable instructions, the instructions when executed by the one or more processors causing the system to:
      receive a first natural language input from a user that includes a set of phrases and an instruction to analyze data associated with the set of phrases using an artificial intelligence (AI) model;
      in response to the first natural language input, access a metadata graph to determine a node corresponding to the set of phrases,
         wherein the metadata graph comprises (i) a set of nodes comprising (a) metadata indicating internal data objects stored in data silos and (b) location identifiers of the data silos, and (ii) edges indicating data lineages of the set of nodes;
      process one or more internal data objects indicated by the determined node to generate a first set of application data;
      apply the AI model to the first set of application data to generate one or more first outputs;

transmit, for display to the user, a representation of the one or more first outputs;
receiving a second natural language input from the user, wherein the second natural language input includes an instruction to modify the first set of application data;
generate a second set of application data based on the received second natural language input; and
apply the AI model to the second set of application data to generate one or more second outputs.

11. The system of claim 10, wherein processing the internal data objects to generate the first set of application data comprises removing personally identifiable or private information from the internal data objects.

12. The system of claim 10, wherein processing the internal data objects to generate the first set of application data comprises:
applying a set of data modification operators to the internal data objects to generate a set of modified data based on the internal data objects;
wherein the first set of application data includes one or more modified data items from the set of modified data.

13. The system of claim 10, wherein processing the internal data objects to generate the first set of application data comprises:
removing an inaccurate data item from the internal data object.

14. The system of claim 10, wherein the instructions when executed by the one or more processors further cause the system to, prior to receiving the first natural language input:
receive a third natural language input that includes an instruction to generate the AI model;
access the metadata graph to determine a node corresponding to the third natural language input;
process internal data objects associated with the node corresponding to the third natural language input to generate a set of training data; and
train the AI model using the set of training data to generate a trained AI model;
wherein applying the AI model to the first set of application data comprises applying the trained AI model to the first set of application data.

15. The system of claim 10, wherein the instructions when executed by the one or more processors further cause the system to:
generate a chat interface for display to the user;
wherein the first natural language input is received via the chat interface; and
wherein sending the representation of the one or more outputs for display to the user comprises displaying the one or more outputs via the chat interface.

16. The system of claim 10, wherein generating the second set of application data based on the second natural language input comprises:
adding a data item to the first set of application data;
removing a data item from the first set of application data; or
applying a data modification operator to a value of a data item in the first set of application data to modify the value.

17. A non-transitory computer-readable storage medium storing executable instructions, the instructions when executed by one or more processors of a system causing the system to:
receive a first natural language input from a user that includes a set of phrases and an instruction to analyze data associated with the set of phrases using an artificial intelligence (AI) model;
in response to the first natural language input, access a metadata graph to determine a node corresponding to the set of phrases,
wherein the metadata graph comprises (i) a set of nodes comprising (a) metadata indicating internal data objects stored in data silos and (b) location identifiers of the data silos, and (ii) edges indicating data lineages of the set of nodes;
process one or more internal data objects indicated by the determined node to generate a first set of application data;
apply the AI model to the first set of application data to generate one or more first outputs;
transmit, for display to the user, a representation of the one or more first outputs;
receiving a second natural language input from the user, wherein the second natural language input includes an instruction to modify the first set of application data;
generate a second set of application data based on the received second natural language input; and
apply the AI model to the second set of application data to generate one or more second outputs.

18. The non-transitory computer-readable storage medium of claim 17, wherein processing the internal data objects to generate the first set of application data comprises:
applying a set of data modification operators to the internal data objects to generate a set of modified data based on the internal data objects;
wherein the first set of application data includes one or more modified data items from the set of modified data.

19. The non-transitory computer-readable storage medium of claim 17, wherein the instructions when executed by the one or more processors further cause the system to, prior to receiving the first natural language input:
receive a third natural language input that includes an instruction to generate the AI model;
access the metadata graph to determine a node corresponding to the third natural language input;
process internal data objects associated with the node corresponding to the third natural language input to generate a set of training data; and
train the AI model using the set of training data to generate a trained AI model;
wherein applying the AI model to the first set of application data comprises applying the trained AI model to the first set of application data.

20. The non-transitory computer-readable storage medium of claim 17, wherein the instructions when executed by the one or more processors further cause the system to:
generate a chat interface for display to the user;
wherein the first natural language input is received via the chat interface; and
wherein sending the representation of the one or more outputs for display to the user comprises displaying the one or more outputs via the chat interface.

* * * * *